US011503440B2

(12) United States Patent
Barzuza et al.

(10) Patent No.: US 11,503,440 B2
(45) Date of Patent: Nov. 15, 2022

(54) METHODS AND SYSTEMS FOR PROVIDING ENTERPRISE SERVICES TO WEARABLE AND MOBILE DEVICES

(71) Applicant: Avaya Management L.P., Durham, NC (US)

(72) Inventors: Tamar Barzuza, Tel Aviv (IL); Tzvika Goldenberg, Petach tikva (IL); Ronen Bar-Yoav, Geulim (IL); Yuval Cohen, Lezion (IL); Lee Chee Fai, Singapore (SG); Guy Gadnir, Herzliya (IL)

(73) Assignee: Avaya Management L.P., Durham, NC (US)

( * ) Notice: Subject to any disclaimer, the term of this patent is extended or adjusted under 35 U.S.C. 154(b) by 76 days.

(21) Appl. No.: 17/206,352

(22) Filed: Mar. 19, 2021

(65) Prior Publication Data

US 2021/0329424 A1 Oct. 21, 2021

Related U.S. Application Data

(60) Provisional application No. 63/010,960, filed on Apr. 16, 2020.

(51) Int. Cl.
*H04W 4/16* (2009.01)
*H04W 12/06* (2021.01)
(Continued)

(52) U.S. Cl.
CPC .............. *H04W 4/16* (2013.01); *G06F 1/163* (2013.01); *H04M 1/64* (2013.01); *H04M 1/66* (2013.01);
(Continued)

(58) Field of Classification Search
CPC ......... H04W 4/16; H04W 4/80; H04W 12/33; H04W 12/068; H04W 84/02; H04W 4/33;
(Continued)

(56) References Cited

U.S. PATENT DOCUMENTS

| 8,823,765 B2 | 9/2014 | Hubner et al. |
| 9,894,320 B2 | 2/2018 | Uchiyama et al. |

(Continued)

FOREIGN PATENT DOCUMENTS

| JP | 2001-197540 | 7/2001 |
| JP | 2003-163971 | 6/2003 |

(Continued)

OTHER PUBLICATIONS

Official Action with English Translation for Japan Patent Application No. 2021-068094, dated Aug. 23, 2022 9 pages.
(Continued)

*Primary Examiner* — Minjung Kim
(74) *Attorney, Agent, or Firm* — Sheridan Ross P.C.

(57) ABSTRACT

Methods and systems are provided for enhancing communications mobility in an enterprise using a distributed communication controller. The distributed communication controller identifies a user device, verifies the device and delivers enterprise communication services to the user via the user device without requiring the execution of an enterprise communication application by the wearable device. When the user device is a wearable device, a wireless message is sent from the wearable device in physical proximity to the distributed communication controller that contains identification information. Based on the identification information, user information associated with the user of the user device is retrieved and then used to determine whether enterprise communication services are available for the user. Next, the user is verified through an interaction with the user device and the distributed communication controller and the enterprise communication services are provided to the user by the distributed communication controller.

20 Claims, 16 Drawing Sheets

(51) Int. Cl.
*G06F 1/16* (2006.01)
*H04M 1/64* (2006.01)
*H04M 1/66* (2006.01)
*H04W 84/02* (2009.01)

(52) U.S. Cl.
CPC ......... *H04W 12/068* (2021.01); *H04W 84/02* (2013.01)

(58) Field of Classification Search
CPC ........... H04W 4/70; G06F 1/163; H04N 7/15; H04M 1/66; H04M 1/72457; H04M 2250/62
See application file for complete search history.

(56) References Cited

U.S. PATENT DOCUMENTS

| | | | |
|---|---|---|---|
| 10,158,443 | B1 | 12/2018 | Berger et al. |
| 10,692,128 | B2 | 6/2020 | Batra |
| 10,694,331 | B1 | 6/2020 | Brooks Powell et al. |
| 10,701,310 | B2 | 6/2020 | Pandey et al. |
| 2007/0004400 | A1 | 1/2007 | McClung |
| 2007/0071203 | A1 | 3/2007 | Boyer et al. |
| 2008/0045243 | A1 | 2/2008 | Billmaier et al. |
| 2008/0075295 | A1 | 3/2008 | Mayman et al. |
| 2008/0232568 | A1 | 9/2008 | Diethorn |
| 2012/0066722 | A1* | 3/2012 | Cheung .............. H04N 21/4788 725/62 |
| 2012/0099594 | A1 | 4/2012 | Lau et al. |
| 2013/0045680 | A1 | 2/2013 | Dua |
| 2013/0083149 | A1 | 4/2013 | Hubner et al. |
| 2013/0143529 | A1* | 6/2013 | Leppanen .............. H04M 1/006 455/411 |
| 2014/0273859 | A1 | 9/2014 | Luna et al. |
| 2014/0359709 | A1* | 12/2014 | Nassar .................. H04L 67/148 726/4 |
| 2016/0057191 | A1 | 2/2016 | Zhang et al. |
| 2016/0128043 | A1 | 5/2016 | Shuman et al. |
| 2016/0198322 | A1 | 7/2016 | Pitis |
| 2017/0026974 | A1 | 1/2017 | Dey et al. |
| 2017/0048385 | A1* | 2/2017 | Kashimba ............ H04B 1/3827 |
| 2017/0078616 | A1 | 3/2017 | Uchiyama et al. |
| 2017/0289329 | A1 | 5/2017 | Yim et al. |
| 2017/0161387 | A1* | 6/2017 | Schuchardt ............. G06F 1/163 |
| 2017/0228121 | A1 | 8/2017 | Wosk et al. |
| 2017/0237986 | A1 | 8/2017 | Choi et al. |
| 2017/0329937 | A1 | 11/2017 | Choi et al. |
| 2017/0346858 | A1 | 11/2017 | Vashi et al. |
| 2018/0097654 | A1* | 4/2018 | Suyama ............... H04L 12/2812 |
| 2018/0103080 | A1* | 4/2018 | Girish .................... H04L 65/80 |
| 2018/0124178 | A1 | 5/2018 | Alberth |
| 2018/0246640 | A1 | 8/2018 | Khajuria |
| 2018/0374146 | A1 | 12/2018 | Rawal |
| 2018/0376106 | A1 | 12/2018 | Pandey et al. |
| 2019/0098200 | A1 | 3/2019 | Boudreau et al. |
| 2019/0311401 | A1* | 10/2019 | Kim ...................... G06F 3/0481 |
| 2019/0326020 | A1 | 10/2019 | Woodward et al. |
| 2019/0375609 | A1 | 12/2019 | Hosokawa et al. |
| 2020/0233680 | A1 | 7/2020 | Ma et al. |
| 2020/0278717 | A1 | 9/2020 | Berardinelli |
| 2020/0279228 | A1 | 9/2020 | Vaananen |
| 2020/0360208 | A1* | 11/2020 | Burton ................... F16M 11/40 |
| 2021/0177349 | A1 | 6/2021 | Mohan et al. |
| 2021/0258353 | A1 | 8/2021 | Karuppiah et al. |
| 2021/0349611 | A1 | 11/2021 | Chen et al. |
| 2021/0399911 | A1 | 12/2021 | Jorasch et al. |
| 2021/0400427 | A1 | 12/2021 | Burowski et al. |

FOREIGN PATENT DOCUMENTS

| | | |
|---|---|---|
| JP | 2007-312053 | 11/2007 |
| JP | 2015-198384 | 11/2015 |
| JP | 2018-139358 | 9/2018 |
| JP | 2019-213141 | 12/2019 |

OTHER PUBLICATIONS

Notice of Allowance for U.S. Appl. No. 17/206,380, dated Jul. 1, 2022 12 pages.
Official Action for India Patent Application No. 202114016184, dated Mar. 24, 2022 6 pages.
Official Action for U.S. Appl. No. 17/206,370, dated Jun. 9, 2022 7 pages.

* cited by examiner

Fig. 7

| Device ID (704) | Device Type (708) | Hardware Capabilities (712) | User Association (716) | Enterprise Association (720) | Usage History (724) | Physical Location (728) | ••• (732) |

| User ID (804) | Extension Number (808) | Authentication Credentials (812) | Available Features (816) | Associated Devices (820) | Preferences (824) | Physical Location (828) | ••• (832) |

800

METHODS AND SYSTEMS FOR PROVIDING ENTERPRISE SERVICES TO WEARABLE AND MOBILE DEVICES

CROSS REFERENCE TO RELATED APPLICATION

The present application claims the benefit of and priority, under 35 U.S.C. § 119(e), to U.S. Provisional Application Ser. No. 63/010,960, filed Apr. 16, 2020, entitled "Providing Communication Features for Moving Users," the entire disclosure of which is hereby incorporated herein by reference, in its entirety, for all that it teaches and for all purposes.

BACKGROUND

The present disclosure is generally directed to telecommunications, in particular, toward hosting uninterrupted communication features for user devices in an enterprise facility and communications environment.

Users in an enterprise facility are generally allowed to make calls, participate in video conferences, and perform work-related communication tasks using a number of different communication devices. Such communication devices may include computers, telephones, hardware-based Internet Protocol ("IP") phones, softphones, smartphones, and tablets. Each of these communication devices are either programmed with application specific functionality or are required to run special applications that provide the enterprise call functionality.

In some cases, users may be allowed to bring their own personal devices to work and utilize such devices in performing work-related communications. A bring-your-own-device ("BYOD") policy, however, is not without a number of drawbacks. These drawbacks include business, privacy, security, and information technology support concerns/issues for the enterprise and a lack of separation between work and home lives for the users. Moreover, if an enterprise relies upon the personal devices of users while at work, the users may be required to carry their personal devices with them throughout the day. As can be appreciated, many of these personal devices, such as laptops, tablets, and even smartphones, may be bulky, heavy, or otherwise cumbersome for a user to transport when moving about the enterprise.

In addition to the shortcomings described above, mobile devices that include all of the necessary hardware and software to run communication applications for enterprise communications may have gaps in access to communications networks in an enterprise facility. These gaps in access may be attributed to the location of the mobile device falling outside of a range of a particular network (e.g., cellular or otherwise) or by a policy restriction that prevents communications in specific areas of an enterprise facility. In some cases, policy restrictions may be set to prevent unauthorized communications with, or interference provided by, mobile devices in specific areas, or locations, of an enterprise facility (e.g., via the use of shielded areas, Faraday cages, other blocking structures, rules, etc.). In either of these cases, there is no reliable way to connect with users and, more specifically, their mobile devices in areas where gaps in access to communications networks exist.

BRIEF DESCRIPTION OF THE DRAWINGS

FIG. 7 is a block diagram depicting a device information data structure used in accordance with embodiments of the present disclosure;

FIG. 8 is a block diagram depicting a user information data structure used in accordance with embodiments of the present disclosure;

DETAILED DESCRIPTION

Figure 1:
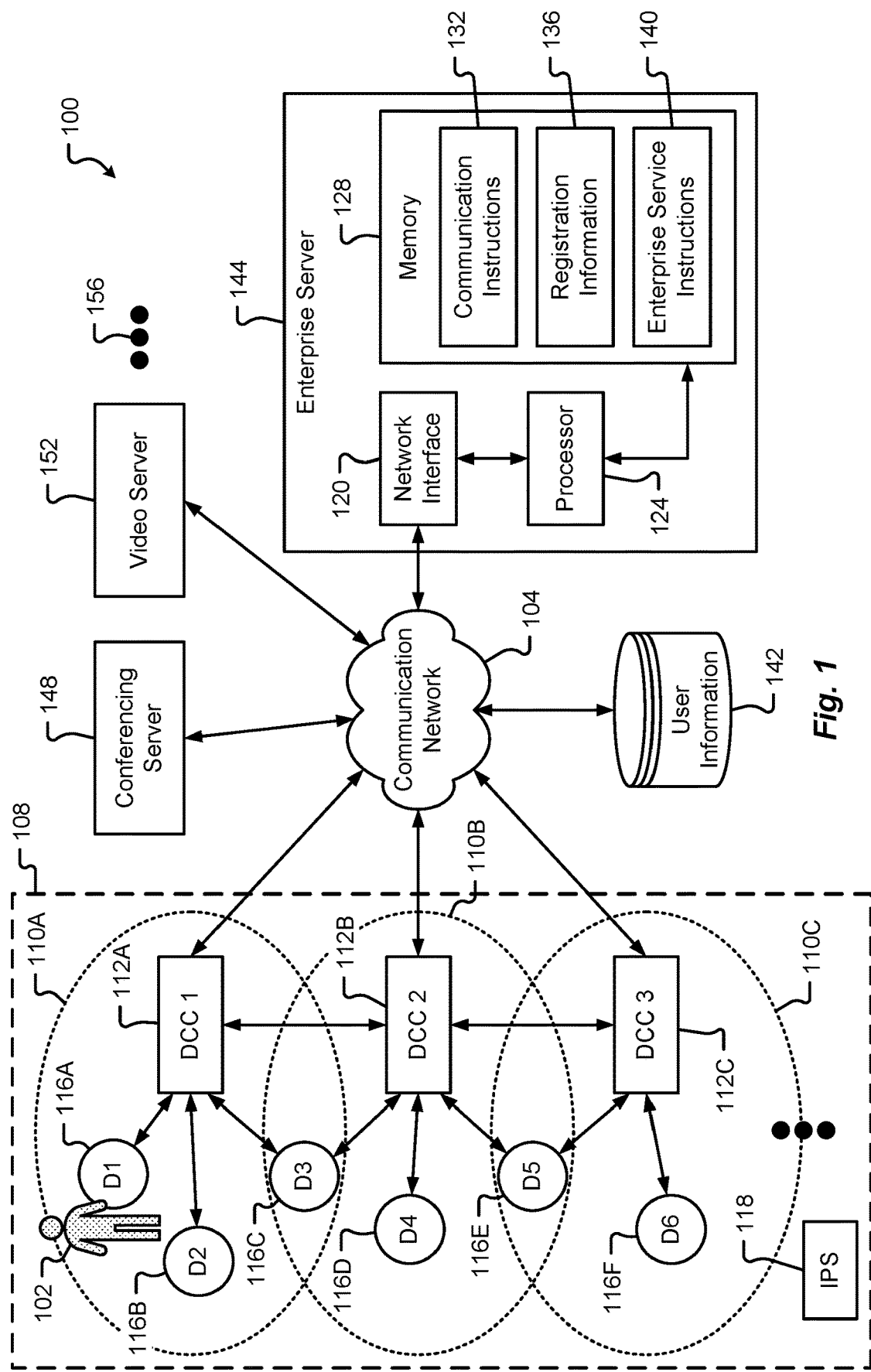
FIG. 1 depicts a block diagram of a communication system in accordance with at least some embodiments of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scope of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

Often, users within an enterprise are unaware of, or lack access to, available enterprise communication services. By not accessing these enterprise communication services, the usability of the enterprise system is reduced. As a result, the user may miss out on valuable and convenient tools that are available to the user in an enterprise facility. While conventional communication systems may detect devices to offer wireless fidelity ("Wi-Fi") access, or automatically reconnect previously connected devices with user content, these conventional communication systems do not detect devices in physical proximity, verify the devices detected, and offer a range of services (e.g., enterprise communication services, etc.) to the users of the devices based on the local proximity of the devices to the system.

As technology improves, users demand greater flexibility and mobility of all telecommunications features. Among other things, users want to be able to take communications throughout an enterprise and have access to and use of all equipment as they move through the enterprise.

One issue, for example with mobile phone calls, that has been observed is that the calls are started or ended at the phone itself. This requirement of the mobile phone (e.g., to run specific or specialized communication applications in range of a communication network, etc.) can cause problems when the user is located in an area of the enterprise facility without service (e.g., gaps in access to the communication network for the mobile phone, etc.).

Another issue in enterprise communications, is that users in an enterprise communication system demand the seamless integration between all communications technologies and their communication devices. Current scheduling applications and systems are limited in the features that are offered. For instance, in typical conference calls, the user device may indicate to a user that a conference call will start soon (e.g., in the form of a pop-up notification, or message). Once notified, it is usually the responsibility of the user to identify the correct location to begin a conference call as well as to use functioning equipment to connect to the conference call. This responsibility generally requires a manual approach in determining which rooms have specific resources (e.g., conferencing devices, etc.) that the conference meeting require and then attempt to reserve the rooms with a scheduler or conferencing service. In addition to requiring a cumbersome manual process, there is no additional information provided to the user in real time regarding the location of the determined rooms and/or resources.

As users move through an enterprise facility while conducting a call (e.g., audio, video, and/or combinations of audio and video), the network to which the user is connected may experience connectivity issues, which may lead to interrupted or dropped calls. Further, the enterprise may contain specific locations where the user may be allowed to conduct a call, with locations outside of these specific locations unable to support calls.

It is with respect to the above issues and other problems that the embodiments presented herein were contemplated. Among other things, the methods and systems provided herein allow a user to be mobile in a facility (e.g., building, etc.) without having to carry a device to provide significant compute and/or interface capabilities. The compute (e.g., independent computer processing) is provided, or given, by the brain (e.g., a distributed communication controller, etc.) and the interface is provided, or given, by the wearables and/or peripherals of a user. The compute provided by the distributed communication controller does not require that the wearable or peripheral have a browser, a client, or other application-running capability. Compared to client-server arrangements (e.g., where a client application is installed on a communication device and some processing is offloaded to a server, etc.), the processing provided by the distributed communication controller (e.g., brain, etc.), as described herein, allows users to leverage "dumb" wearable devices (e.g., headphones, headsets, etc.) and/or peripherals (e.g., that may have no capability of providing processing, running communications applications, interacting with servers in a communication system, and/or running other applications, etc.) to act as an interface to the distributed communication controller. Without requiring the wearable devices to provide processing, run browsers, and/or run applications, the distributed communication controller handles the processing between the wearable devices other communication devices and/or servers in a communication system.

It is an object of the present disclosure to identify devices within an enterprise domain using a brain device or multiple brain devices to identify a user device, verify the device, and deliver enterprise communication services to the user via the user device. The brain device may correspond to a distributed communication controller that is capable of detecting devices within physical proximity to the distributed communication controller, verify the device detected, and then offering services to the users of the devices based on the local proximity of the devices to the system. Rather than simply being directed to providing Internet connectivity "on the go," the distributed communication controller may grant mobile communication capabilities in a closed facility, where the distributed communication controllers (e.g., the access points, or brains) also perform the processing of the communication. In some embodiments, the distributed communication controllers may support enterprise communication services (e.g., execute application instructions on behalf of the detected and verified devices) including, but in no way limited to, enterprise voicemail, call recording, call logging, etc. In one embodiment, the distributed communication controller may detect a wearable or peripheral device within proximity of the communication range of the distributed communication controller and the distributed communication controller would deliver enterprise communication services to the user via their detected wearable or peripheral device. This process may include authentication of the device and/or the user. The authentication, in some embodiments, may serve to identify available enterprise communication services for the user and/or to determine whether the user is a part of the enterprise.

Additionally or alternatively, the methods described herein may be capable of processing incoming and outgoing calls using a system that includes a distributed communication controller or multiple distributed communication controllers and wearable/peripheral devices. These calls may range in type, and could be voice calls, video calls, or both. Typically, a call is directly sent to or received from a user communication device (e.g., a smartphone, softphone, hardware-enabled IP phone, etc. In some cases, a wearable device (e.g., a Bluetooth™ device) receives the call, or is forwarded the call from the user communication device. Currently, Bluetooth™ products (e.g., headsets, wireless headphones, watches, etc.) connect to a user communication device (e.g., smartphone, tablet, computer, etc.). Upon receiving a call, the user communication device may route the call to a connected Bluetooth™ product. However, the inherent mobility of users may result in the user moving to an area where the user communication device may be unable to connect to a communications network. Further, and as provided above, if the user is in an enterprise environment, there may be one or more locations that are devoid of connectivity capabilities. In this instance, the user's ability to connect may be limited and/or the user's ability to move out of certain areas of the enterprise may be limited. Moreover, if the user receives a call containing both audio and video signals at the user communication device, typically only the audio component of that call can be delivered to the connected Bluetooth™ product. In one embodiment, the present disclosure describes that the distributed communication controller may, for an incoming or an outgoing call, transmit audio and video to two separate devices. For example, the distributed communication controller knows to send the audio of a call to a wireless headset and send the video of a call to a nearby screen. The wireless headset and the nearby screen may be separate and apart from a user communication device of the user. The audio may be sent to a designated wearable device via a standard wireless transmission protocol (e.g., via Bluetooth™ protocol, etc.), while the video may be sent to a designated screen (e.g., display device) that outputs the video (e.g., with the user viewing the screen for a portion or an entirety of the video call) via a standard wireless transmission protocol (e.g., wireless high-definition multimedia interface ("WHDMI") protocol, etc.). For an incoming call, a distributed communication controller in proximity to a specific wearable device of a user may be identified and the identified distributed communication controller may invoke ringing at the wearable device. Stated another way, the distributed communication controller, or brain, provides the processing of the call. The ringing may be in the form of at least one of a ring tone and a conversational interface. The user of the wearable device may accept the call by, for example, pressing a button on the wearable device or via the conversational interface (e.g., providing a spoken output to connect and/or accept the call, etc.). Providing an output that denies the call may be made in a similar manner (e.g., via a button or audio signal/voice command received at the wearable device). Upon accepting the call, the distributed communication controller connects the call to the wearable device without requiring a user communication device to process the call. For an outgoing call, an interface to the wearable device may comprise a conversational interface/engine with virtual assistant functionalities. This conversational interface/engine may be a part of communication instructions of the distributed communication controller. In this example, the outgoing call may be invoked with a conversational interface. The invocation may be initiated by the user stating (e.g., via a spoken output) a specific keyword, or phrase, followed by one or more commands. For instance, the user may speak the keyword "DCC" and then issue the command "call my team lead." In response, the distributed communication controller may, on behalf of the user, establish a communication connection to an extension or number of the user's team lead. The call is then connected to the wearable device with the call processing being handled by the distributed communication controller. As can be appreciated, the use of distributed communication controllers within an enterprise communication system allows greater flexibility and mobility for users as they move through an enterprise facility. Additionally, any incoming or outgoing calls may be routed through the distributed communication controllers and sent to a user's wearable device, reducing the problems associated with connectivity. The use of the distributed communication controller within an enterprise setting allows for delivery of both audio and video signals in a call, for example to the user's wearable device and to a streaming device in the enterprise facility, respectively.

It is an aspect of the present disclosure to provide a network of distributed communication controllers capable of passing off call responsibilities (e.g., to one another) as a user navigates the enterprise facility, which may ensure full call coverage in an enterprise communication system. The distributed communication controllers allow the user to roam between different areas covered by different distributed communication controllers. For example, the user (e.g., and the user's wearable device, etc.) may move outside the communication range of a first distributed communication controller and into the communication range of a second distributed communication controller while on a call. The system of distributed communication controllers may be configured to transfer the call and all responsibilities associated with the call from the first distributed communication controller to the second distributed communication controller, allowing the user to continue the call without experiencing any interruption to the call processing. While some conventional systems may transfer calls to different endpoints upon determining that the user is losing connectivity or moving outside a geographical range of the currently used endpoint, these available solutions limit the user's ability to maintain a call while simultaneously having the freedom to move within an enterprise. Among other things, the collection of distributed communication controllers allow the user to navigate and move around the enterprise, unfettered, without compromising call features. In contrast to previous solutions, which fail to permit a user to roam between different areas of an enterprise while still maintaining a call, the distributed communication controllers described herein may act as access points and communication processors, and are in communication with other distributed communication controllers in the enterprise communication system or network. The result is the ability to hand off call responsibilities between distributed communication controllers as the user traverses the enterprise, allowing the user to maintain the call without being forced to remain near the original distributed communication controller that initiated the call.

It is an aspect of the present disclosure to provide the seamless integration of distributed communication controllers into conference calling. Specifically, the distributed communication controllers would be configured to integrate user devices (e.g., wearable devices, peripherals, etc.) and conference equipment, or conferencing devices, (e.g., display devices, etc.) in an enterprise facility. The distributed communication controllers may intelligently divide conference call content between wearable devices of users and other resources (e.g., conferencing devices, etc.) in the enterprise. In some embodiments, the distributed communication controllers may provide the user with directions within an enterprise to an appropriate location (e.g., of an identified resource, etc.) to conduct the conference call. While some conventional software systems integrate a user communication device into a database, allowing the system to identify the user and connect them to a conference call upon confirmation of the identity of the user, there are number of drawbacks to this conventional approach. For instance, the user communication device may not have information related to who else is joining the call, or any technical requirements for the call. Further, the user may be unaware of where to go in the enterprise to join the conference call that is part of a conference meeting, and the conventional systems do not provide such information. In some instances, such as when conference calls include a video component, a user on a wearable device may not be able to access the video content, and may end up missing valuable information. In some embodiments, the present disclosure describes supporting conference call capabilities using distributed communication controllers in an enterprise communication system. The distributed communication controllers described herein may integrate user devices (e.g., mobile communication devices, wearable devices, peripheral devices, etc.) and conference equipment (e.g., conferencing devices, display devices, etc.) and provide a user with physical geographical navigation instructions to an appropriate location (e.g., where one or more conference meeting resources are located, etc.) to join a conference call. In one embodiment, the enterprise communication system may be augmented via device management in an Internet of Things ("IoT") approach. For example, each device may identify itself with a specific capability set to the adjacent distributed communication controller/controllers. Capabilities may be general (e.g., a meeting room screen, or display device, has display capabilities for all users) or user oriented (e.g., a workstation has processing capabilities permitted for the local administrator, etc.). A network of adjacent devices with capability sets may be obtained on every distributed communication controller, and real-time navigation can be suggested to every user (for example, suggest to the user "go to meeting room number 5, it is closest, free, and has the permissions you need to take this incoming call"). The distributed communication controller can perform computations, while the wearable devices and/or peripheral devices can accept audio and/or video signals (e.g., via Bluetooth™) and WHDMI. In cases where heavy computation is required, the distributed communication controller can offload the processing to a processing station such as a video phone or a video appliance. In any event, proximity sensing between the wearable device and adjacent devices are related. If device sharing is enabled, every local device (e.g., a display device or screen) can function to receive video from the distributed communication controller, regardless of how the local device typically operates differently. This functionality can enable dynamic hot-desking for communication, without having to login to a workstation, computer, or other resource locally.

The term "extension," as used herein, may refer to a communications transmission channel that is associated with a user and that provides a connection for communications made to or from the user. The extension may correspond to a unique number associated with a user and that can be used to direct (e.g., via a communications server, a distributed communication controller, etc., and/or combinations thereof) communications received from one or more endpoints to a device associated with the user, enabling communications over the extension or a communication channel made available for the user.

Referring now to FIG. 1, a block diagram of an enterprise communication system 100 is shown in accordance with at least some embodiments of the present disclosure. The enterprise communication system 100 of FIG. 1 may be a distributed system and, in some embodiments, comprises a communication network 104 connecting one or more distributed communication controllers 112A-112C with communication devices 116A-116F in an enterprise facility 108. In some embodiments, the distributed communication controllers 112A-112C may provide call processing and other enterprise functionality to the communication devices 116A-116F that are in proximity in the enterprise facility 108. Each of the distributed communication controllers 112A-112C may exchange communications with each other, an enterprise server 144, a conferencing server 148, a video server 152, other servers 156, and more, via the communication network 104 or other communications channel.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an IP network consisting of many computers, computing networks, and other communication devices located all over the world, which are connected through many telephone systems and other means. Other examples of the communication network 104 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a Voice over IP ("VoIP") network, a Session Initiation Protocol ("SIP") network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

An enterprise facility 108 may correspond to a room, a series of rooms, a building, buildings, or a combination of other physical dedicated spaces for the enterprise communication system 100. In some embodiments, the enterprise facility 108 may correspond to a physical structure (e.g., building, etc.) that is associated with a company, or enterprise.

The distributed communication controllers 112A-112C may be physically located at different points (e.g., locations, positions, etc.) throughout the enterprise facility 108. For instance, the distributed communication controllers 112A-112C may be mounted to, within, or at least partially within walls, ceilings, floors, and/or other spaces in the enterprise facility 108. Each of the distributed communication controllers 112A-112C may have a respective communication range 110A-110C represented by the elliptical dashed lines shown in FIG. 1. The communication ranges 110A-110C may correspond to an effective communication and/or detection range of a respective distributed communication controller 112A-112C. When more than one distributed communication controller 112 is deployed in an enterprise facility 108, adjacent distributed communication controllers 112A-112C may have an overlapping region between their respective communication ranges 110A-110C.

In FIG. 1, the first communication device 116A, the second communication device 116B, and the third communication device 116C are all shown in physical proximity to the first distributed communication controller 112A. Stated another way, each of these communication devices 116A-116C are within the first communication range 110A of the first distributed communication controller 112A. The third communication device 116C is shown in a location of an overlapping communication range region between the first distributed communication controller 112A and the second distributed communication controller 112B. In this position, the third communication device 116C is within both the first communication range 110A and the second communication range 110B. In some embodiments, as a user 102 and a communication device 116A-116F moves within the enterprise facility 108, the processing functionality provided to the communication device 116A-116F may be transferred from one distributed communication controller 112A-112C to another, without interrupting service, processing, and/or calls. This transfer, or handoff, occurs in the overlapping regions of adjacent communication ranges 110A-110C.

The third communication device 116C, the fourth communication device 116D, and the fifth communication device 116E are all shown in proximity to the second distributed communication controller 112B in the enterprise facility 108. Stated another way, each of these communication devices 116C-116E are within the second communication range 110B of the second distributed communication controller 112B. The fifth communication device 116E is shown in an overlapping communication range region between the second distributed communication controller 112B and the third distributed communication controller 112C. In this position, the fifth communication device 116E is within both the second communication range 110B and the third communication range 110C.

The fifth communication device 116E and the sixth communication device 116F are both shown in proximity to the third distributed communication controller 112C in the enterprise facility 108. Stated another way, these two communication devices 116E-116F are within the third communication range 110C of the third distributed communication controller 112C.

Communications may be sent and/or received via one or more of the distributed communication controllers 112A-112C as a telephone call, a packet or collection of packets (e.g., IP packets transmitted over an IP network), an email message, an instant message ("IM"), a short message service ("SMS") message, a multimedia messaging service ("NMS") message, a chat, and/or combinations thereof. In some embodiments, the distributed communication controllers 112A-112C may communicate over an audio and/or a video channel over the communication network 104.

Although FIG. 1 shows three distributed communication controllers 112A-112C and communication ranges 110A-110C in the enterprise facility 108, it should be appreciated that more or fewer distributed communication controllers 112A-112C and associated communication ranges 110A-110C than illustrated may be disposed in the enterprise facility 108.

Any of the communication devices 116A-116F may be associated with a user 102. In one embodiment, the user 102 may be associated with one or more of the communication devices 116A-116F. The communication devices 116A-116F may correspond to wearable devices such as wireless headphones, headsets, watches. In some embodiments, the wearable devices may be incapable of running an application or interacting directly with the enterprise server 144, the conferencing server 148, the video server 152, and/or the other servers 156. In one embodiment, the communication devices 116A-116F may comprise a computing device, a personal communication device, a portable communication device, a laptop, a smartphone, a tablet, a personal computer, and/or any other device capable of running an operating system ("OS"), at least one communications application, a web browser, and/or the like. The communications application may be configured to exchange communications between a respective communication device 116A-116F and the enterprise server 144, the conferencing server 148, and/or the video server 152, etc. For instance, the communication devices 116A-116F may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication devices 116A-116F, may also have any of a variety of applications, including for example, web browser applications, chat applications, video applications, social media applications, calling applications, email applications, calendar applications, SIP applications, etc., and/or combinations thereof. In some embodiments, the communication devices 116A-116N may alternatively or additionally be any other electronic device, such as an Internet-enabled mobile telephone and/or a personal digital assistant, capable of communicating via the communication network 104.

In some embodiments, the enterprise facility 108 may include an indoor positioning system 118, or indoor navigation system. The indoor positioning system 118 may comprise a plurality of iBeacon, or Bluetooth™ Low Energy ("BLE"), devices distributed throughout the enterprise facility 108. Each of these BLE devices may broadcast an identifier and/or other information, which can be received by compatible communication devices (e.g., the communication devices 116A-116F, etc.) within a communication range of, or within proximity to, the BLE devices. This information may be used to determine a location of the communication devices 116A-116F in the enterprise facility 108. In some embodiments, the communication devices 116A-116F, upon receiving the broadcast signals, and associated information, from the BLE devices in the enterprise facility 108, may determine, record, and/or report their position to a distributed communication controller 112A-112C in proximity to the communication devices 116A-116F. In one embodiment, the broadcast signals emitted by the BLE devices of the indoor positioning system 118 may be received directly by the distributed communication controllers 112A-112C in the enterprise facility 108.

It is an aspect of the present disclosure that the distributed communication controllers 112A-112C may provide services to the communication devices 116A-116F without requiring the execution of an application by the communication devices 116A-116F. For example, the communication devices 116A-116F may correspond to simple wearable devices (e.g., wireless headphones, headsets, etc.) that have no ability to install or run applications for processing communications between the user 102 and the enterprise server 144, conferencing server 148, the video server 152, etc., over the communication network 104. In one embodiment, a simple wearable device may be any device that includes an application-specific integrated circuit, rather than a general purpose chip, as a processor that enables a basic functionality of the wearable device (e.g., Bluetooth™ functions, etc.). In some embodiments, the wearable devices may have no ability to run applications via a client application or browser application. Rather, a wearable device in proximity to a distributed communication controllers 112A-112C is able to receive calls, notifications, and other content that is handled, or processed, completely by the distributed communication controllers 112A-112C and not the wearable device. In this example, the wearable device becomes a receiver of content that is provided by the distributed communication controllers 112A-112C.

The enterprise server 144, or communications server, may include hardware and/or software resources that, among other things, provide communications and enterprise services for users 102 via the distributed communication controllers 112A-112C in the enterprise facility 108. Among other things, the enterprise server 144 may provide enterprise services, device registration functionality, and other communications over a communication channel, or extension, that is associated with a user 102. The enterprise server 144 may include a network interface 120, a processor 124, and a memory 128. The memory 128 may comprise communication instructions 132, registration information 136, enterprise service instructions 140, and/or the like.

The network interface 120 provides the enterprise server 144 with the ability to send and receive communication packets or the like over the communication network 104. The network interface 120 may be provided as a network interface card ("NIC"), a network port, a modem, drivers for the same, and the like. Communications between the components of the enterprise server 144 and other devices connected to the communication network 104 may flow through the network interface 120 of the enterprise server 144. In some embodiments, examples of a suitable network interface 120 include, without limitation, an antenna, a driver circuit, an Ethernet port, a modulator/demodulator, an NIC, an RJ-11 port, an RJ-45 port, an RS-232 port, a Universal Serial Bus ("USB") port, etc. The network interface 120 may include one or multiple different network interfaces depending upon whether the enterprise server 144 is connecting to a single communication network or multiple different types of communication networks. For instance, the enterprise server 144 may be provided with both a wired network interface and a wireless network interface without departing from the scope of the present disclosure. In some embodiments, the network interface 120 may include different communications ports that interconnect with various input/output lines.

In some embodiments, the processor 124 may correspond to one or more computer processing devices. For example, the processor 124 may be provided as silicon, an Application-Specific Integrated Circuit ("ASIC"), as a Field Programmable Gate Array ("FPGA"), any other type of Integrated Circuit ("IC") chip, a collection of IC chips, and/or the like. In some embodiments, the processor 124 may be provided as a Central Processing Unit ("CPU"), a microprocessor, or a plurality of microprocessors that are configured to execute the instructions sets stored in memory 128. Upon executing the instruction sets stored in memory 128, the processor 124 enables various communications, registration of communication devices 116A-116F, and/or enterprise service instructions of the enterprise server 144, and provides communications over an extension for the user 102 over the communication network 104.

The memory 128, or storage memory, may correspond to any type of non-transitory computer-readable medium. In some embodiments, the memory 128 may comprise volatile or non-volatile memory and a controller for the same. Non-limiting examples of the storage memory 128 that may be utilized in the enterprise server 144 may include Random Access Memory ("RAM"), Read Only Memory ("ROM"), buffer memory, flash memory, solid-state memory, or variants thereof. Any of these memory types may be considered non-transitory computer memory devices even though the data stored thereby can be changed one or more times. The memory 128 may be used to store information about devices, registrations, extensions, users, authentication, features, physical locations, preferences, usage history, and/or the like. In some embodiments, the memory 128 may be configured to store rules and/or the instruction sets depicted in addition to temporarily storing data for the processor 124 to execute various types of routines or functions. Although not depicted, the memory 128 may include instructions that enable the processor 124 to store data into a user information database 142 and retrieve information from the user information database 142. In some embodiments, the user information database 142 or data stored therein may be stored internal to the enterprise server 144 (e.g., within the memory 128 of the user information database 142 rather than in a separate database) or in a separate server.

The communication instructions 132, when executed by the processor 124, may provide the ability for the enterprise server 144 to send content associated with a received call to at least one of the distributed communication controllers 112A-112C. The communication instructions 132 may determine, based on an extension identified by the call, a user 102 associated with the extension. In some embodiments, the association between the user 102 and the extension is stored in the user information database 142 or other memory in the enterprise communication system 100. In accordance with embodiments of the present disclosure the communication instructions 132 may comprise instructions that, when executed by the processor 124, enable the enterprise server 144 to establish a communications connection (e.g., over a communication channel, etc.) with a particular distributed communication controller 112A-112C in the enterprise facility 108. The communications connection may be used to send content associated with the call to the particular distributed communication controller 112A-112C over the communication network 104. The particular distributed communication controller 112A-112C may be selected based on detecting a communication device 116A-116F associated with the user 102 that is in proximity to at least one of the distributed communication controllers 112A-112C. For instance, the user 102 in FIG. 1 is shown associated with the first communication device 116A, which is in the first communication range 110A of the first distributed communication controller 112A. In some embodiments, the first distributed communication controller 112A may send updated locations of users 102, based on the locations of the associated devices 116A-116F, to the enterprise server 144 over the communication network 104. In one embodiment, the communication instructions 132, when executed by the processor 124, may request location information of communication devices 116A-116F in the enterprise facility 108 from the distributed communication controllers 112A-112C. Once the communications connection is established between the enterprise server 144 and the first distributed communication controller 112A, the first distributed communication controller 112A may send content of the call to the first communication device 116A of the user (e.g., without requiring the first communication device 116A run a communications application, or otherwise interact directly with the enterprise server 144). Additionally or alternatively, the communication instructions 132 may integrate all distributed communication controllers 112A-112C in the enterprise facility 108 and may even use existing private branch exchange ("PBX") equipment, services, and/or infrastructure. The enterprise server 144 and the processor 124 executing the communication instructions 132 may enable communications and calling between the enterprise server 144 and the distributed communication controllers 112A-112C. Examples of other functions performed via the communication instructions 132, when executed by the processor 124, include, but are in no way limited to, normalizing disparate networks, providing centralized routing of calls and management of user data structures, device data structures, supporting converged voice and video bandwidth management, providing application sequencing capabilities, etc., and/or combinations thereof.

The enterprise server 144 may comprise registration information or data stored in the memory 128 and/or the user information database 142. In some embodiments, the registration information 136 may store information that links a user 102 to one or more communication devices 116A-116F in the enterprise communication system 100. The registration information 136 may comprise data that identifies devices 116A-116F, device types, hardware capabilities, user association, enterprise association, usage history, physical location of the devices 116A-116F detected over time, and the like. The data in the registration information 136 may be used by the communication instructions 132 and/or the enterprise service instructions 140 in determining one or more communication devices 116A-116F associated with a user and the location of the communication devices 116A-116F in the enterprise facility 108.

The enterprise service instructions 140 may define rules and instructions for providing enterprise communication services to a user 102 via distributed communication controller 112A-112C in proximity to the user 102. In some embodiments, the enterprise service instructions 140 may determine whether a user 102 in the enterprise facility 108 is authorized to receive enterprise communication services. The authorization may comprise receiving information provided by the user 102 and verifying the information with authorization information stored in memory. When the user 102 is authorized, the enterprise server 144 may provide the enterprise communication services to a distributed communication controller 112A-112C in proximity to the user 102, for example, allowing at least one of the communication devices 116A-116F associated with the user to activate or invoke the enterprise communication services. Examples of the enterprise communication services may comprise at least one of call recording, voicemail, call logging, audio calling, video calling, and meeting services to name a few.

The conferencing server 148 and the video server 152 may comprise resources required to enable conference call (e.g., multi-call) services and video streaming output, respectively. Details of the conferencing server 148 are described in greater detail in conjunction with FIG. 20.

Figure 2:
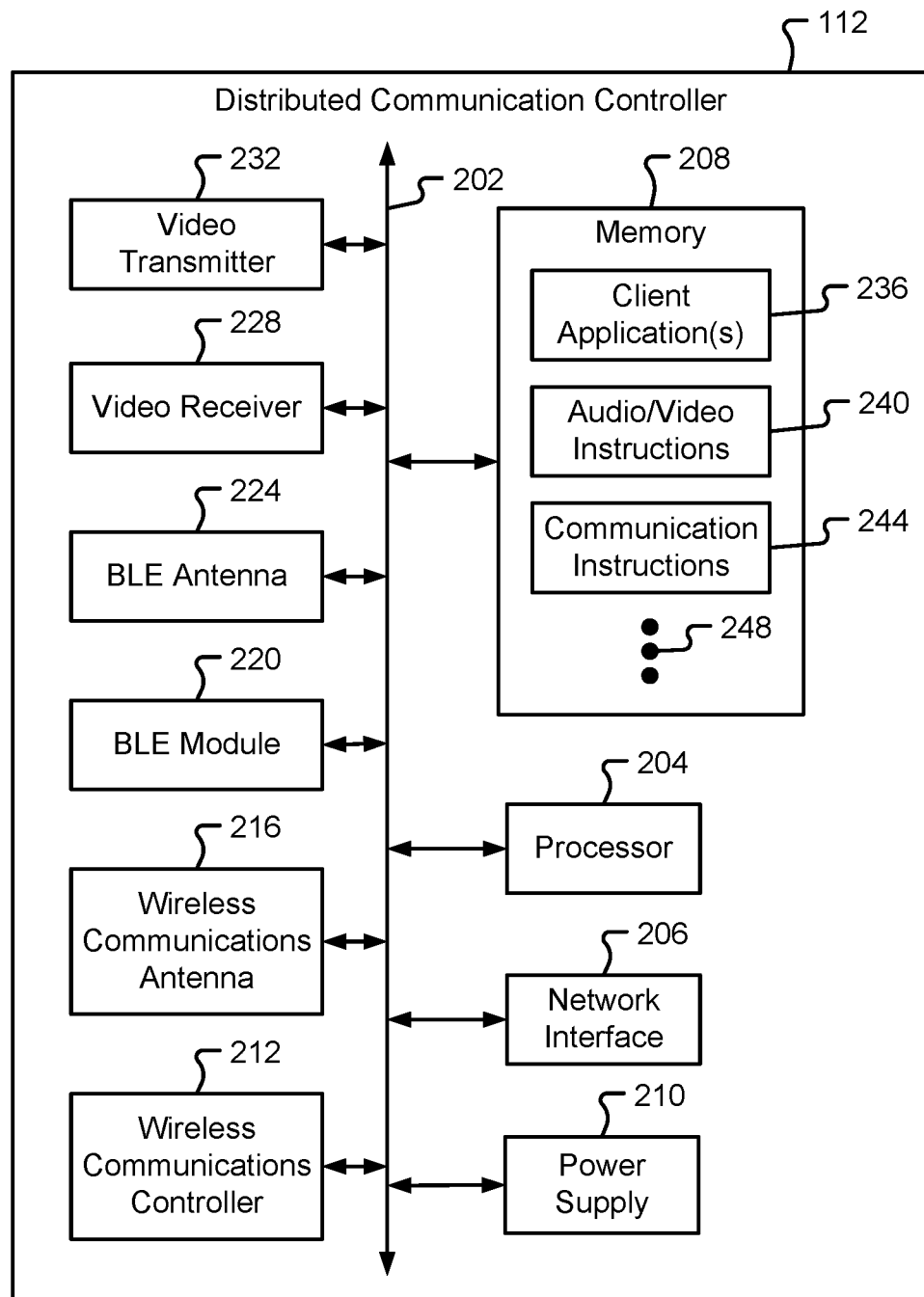
FIG. 2 is a block diagram depicting components of a distributed communication controller used in the communication system in accordance with at least some embodiments of the present disclosure.

FIG. 2 is a block diagram depicting components of a distributed communication controller 112 used in the enterprise communication system 100 in accordance with at least some embodiments of the present disclosure. The distributed communication controller 112 may correspond to any of the distributed communication controllers 112A-112C described in conjunction with FIG. 1, and vice versa. The distributed communication controller 112 is shown to include a computer memory 208 that stores one or more instruction sets, applications, rules, information, or modules. The distributed communication controller 112 may be configured as a computer, access point, router and controller, and/or the like. The distributed communication controller 112 is also shown to include one or more processors 204, a network interface 206 (e.g., a network communications interface, etc.), a power supply 210, wireless communications controller 212, wireless communications antenna 216, BLE module 220, BLE antenna 224, video receiver 228, and/or a video transmitter 232 that may all be connected to one another via a power and/or a communications bus 202.

The processor 204 may correspond to one or many computer processing devices. Non-limiting examples of a processor include a microprocessor, an IC chip, a General Processing Unit ("GPU"), a CPU, or the like. Examples of the processor 204 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture. The processor 204 may be a multipurpose, programmable device that accept digital data as input, processes the digital data according to instructions stored in its internal memory, and provides results as output. The processor 204 may implement sequential digital logic as it has internal memory. As with most microprocessors, the processor 204 may operate on numbers and symbols represented in the binary numeral system. The processor 204 may be similar, if not identical, to the processor 124 described in conjunction with FIG. 1, or vice versa.

The network interface 206 may comprise hardware that facilitates communications with other communication devices (e.g., the enterprise server 144, conferencing server 148, video server 152, and/or other servers 156, etc.) over the communication network 104. In some embodiments, the network interface 206 may include an Ethernet port, a Wi-Fi card, an NIC, a cellular interface (e.g., antenna, filters, and associated circuitry), or the like. The network interface 206 may be configured to facilitate a connection between the distributed communication controller 112 and the enterprise server 144 via the communication network 104 and may further be configured to encode and decode communications (e.g., packets, etc.) according to a protocol utilized by the communication network 104.

The memory 208 may correspond to any type of non-transitory computer-readable medium. In some embodiments, the memory 208 may comprise volatile or non-volatile memory and a controller for the same. Non-limiting examples of memory 208 that may be utilized in the distributed communication controller 112 may include RAM, ROM, buffer memory, flash memory, solid-state memory, and/or variants thereof. Any of these memory types may be considered non-transitory computer memory devices even though the data stored thereby can be changed one or more times. In some embodiments, the memory 208 may be configured to store rules and/or the instruction sets depicted in addition to temporarily storing data for the processor 204 to execute various types of routines or functions. The computer memory 208 may store the client application(s) 236, audio/video instructions 240, communication instructions 244, and/or more 248.

The client application(s) 236 stored in the computer memory 208 of the distributed communication controller 112 may correspond to any application program that provides communication functionality, conferencing functionality, video streaming functionality, and/or any other processing functionality that is provided to the communication devices 116A-116F in the enterprise communication system 100. In some embodiments, the client application(s) 236 may run a browser-based application on behalf of the communication devices 116A-116F. The browser-based application may run via the enterprise server 144, the conferencing server 148, and/or the video server 152 and interact with the distributed communication controller 112.

The audio/video instructions 240 stored in the computer memory 208 of the distributed communication controller 112, when executed by the processor 204, may provide the ability for the distributed communication controller 112 to receive audio and/or video content from at least one of the enterprise server 144, conferencing server 148, and the video server 152 across the communication network 104. In some embodiments, the audio/video instructions 240 may provide the content received to one or more of the communication devices 116A-116F in the enterprise communication system 100. In some cases, the audio/video instructions 240 may split signals received into audio content and video content. In this case, the distributed communication controller 112 may provide the audio content to one of the communication devices 116A-116F in the enterprise communication system 100 via a first communications channel and the video content to another of the communication devices 116A-116F in the enterprise communication system 100 via a second communications channel. The audio/video instructions 240 may provide the content from conference calls, enterprise communications, and/or audio/video communications to one or more communication devices 116A-116F in the enterprise facility 108.

The communication instructions 244, when executed by the processor 204, may receive audio and/or video content associated with one or more calls or communications between the distributed communication controller 112 and the enterprise server 144 or the conferencing server 148 and distribute the communications to one or more communication devices 116A-116F in proximity to the distributed communication controller 112. In some embodiments, the communication instructions 244, when executed by the processor 204, may enable communications from one distributed communication controller 112 to another distributed communication controller 112 in the enterprise facility 108. These communications may comprise transfer or handoff information, location information of communication devices 116A-116F in the enterprise facility 108, and/or information about a communications channel used between a distributed communication controller 112 and an enterprise server 144, conferencing server 148, video server 152, etc., over the communication network 104 for a particular call, device, etc. The communication instructions 244 may determine, based on information from a call received, one or more communication devices 116A-116F associated with a user 102 in proximity to the distributed communication controller 112 that is intended to receive and/or interact with the call. The communication instructions 244, when executed by the processor 204, allows the distributed communication controller 112 to enable VoIP calling, access to contact lists, access to voicemail, access to scheduled meetings (e.g., via a digital calendar), chat functionality, unified communications, and/or the like, via an extension associated with the user 102. In one embodiment, the distributed communication controller 112 may send and/or receive commands, instructions, messages, and/or the like to communication devices 116A-116F in proximity to the distributed communication controller 112 (e.g., in the communication range 110A-110C of a respective distributed communication controller 112A-112C). Additionally or alternatively, the distributed communication controller 112 may send and/or receive commands, instructions, messages, and/or the like across the communication network 104 to at least one of the enterprise server 144, conferencing server 148, video server 152, etc.

The power supply 210 may provide electric power to the components of the distributed communication controller 112. In some embodiments, the power supply 210 may include a transformer and/or other electronics that prevent overloading, condition power signals, and/or provide backup power to the distributed communication controller 112. In some embodiments, the power supply 210 may comprise a battery, a capacitor, an AC-to-DC converter, power control logic, and/or ports for interconnecting the distributed communication controller 112 to an external source of power.

The distributed communication controller 112 may provide certain communication functions or capabilities via one or more wireless communications controllers and modules 212, 220. The wireless communications controller 212 may comprise Code Division Multiple Access ("CDMA"), Frequency Division Multiple Access ("FDMA"), Global System for Mobile communications ("GSM"), Time Division Multiple Access ("TDMA"), and/or an analog cellular telephony transceiver capable of supporting voice, multimedia, and/or data transfers over a cellular network. Additionally or alternatively, the wireless communications controller 212 may comprise Wi-Fi, Worldwide Interoperability for Microwave Access ("WiMax"), infrared ("IR"), radio frequency ("RF"), or other wireless communications components, transceivers, etc. The wireless communications controller 212 may be associated with a shared or dedicated wireless communications antenna 216.

In some embodiments, the distributed communication controller 112 may comprise a BLE module 220. The BLE module 220 may comprise at least one of a BLE integrated circuit, a processor, and/or a controller that transmits and/or receives information from one BLE device, or BLE-enabled device, to another. This information may be used to from a mesh network between BLE devices in the enterprise facility 108. The BLE module 220 may be associated with the wireless communications antenna 216 and/or the BLE antenna 224 of the distributed communication controller 112.

The distributed communication controller 112 may comprise a video receiver 228 and video transmitter 232 that are configured to receive and transmit wireless video signals to one or more communication devices 116A-116F in the enterprise facility 108. In some embodiments, streaming video may be received from a server (e.g., the video server 152, etc.) of the enterprise communication system 100 over the communication network 104. The video receiver 228 and video transmitter 232 may operate over Wi-Fi (e.g., at 2.4 GHz, 5.0 GHz, etc.) and may utilize the wireless communications antenna 216 of the distributed communication controller 112 in sending and receiving signals. By way of example, the video receiver 228 may receive streaming video signal from the video server 152, via a communication sent across the communication network 104, and the video transmitter 232 of the distributed communication controller 112 may transmit the streaming video (e.g., via WHDMI, etc.) using the wireless communications antenna 216 to one or more communication devices 116A-116F in proximity to the distributed communication controller 112.

Figure 3:
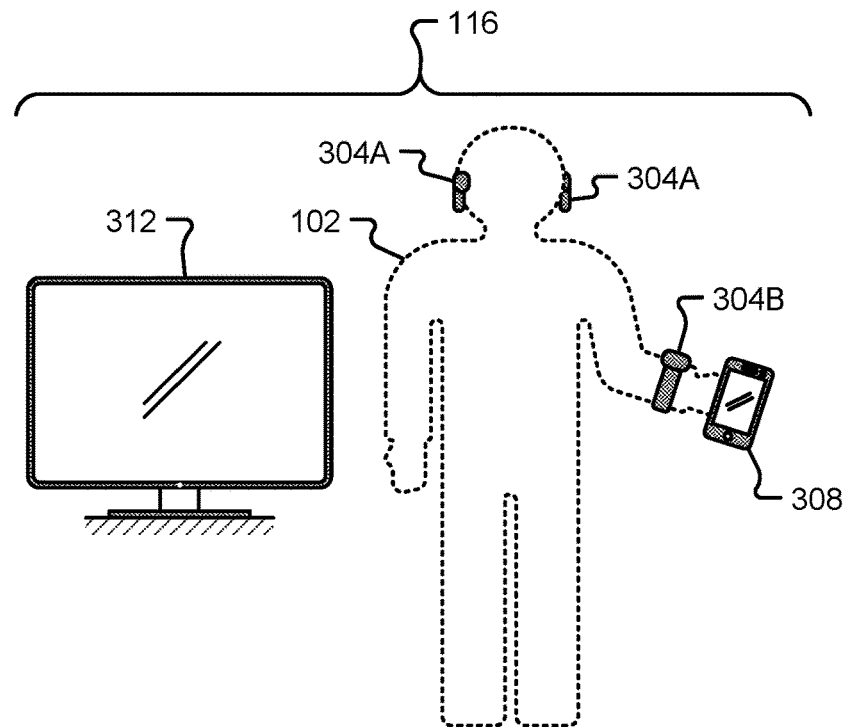
FIG. 3 is a block diagram depicting user communication devices and peripheral devices that are used in the communication system in accordance with embodiments of the present disclosure.

FIG. 3 is a block diagram showing various communication devices 116 used in the enterprise communication system 100. The communication devices 116 described in conjunction with FIG. 3 may correspond to any one or more of the communication devices 116A-116F described at least in conjunction with FIG. 1, or vice versa. Examples of communication devices 116 may include, but are in no way limited to, wearable devices 304A, 304B, communication devices 308, and display devices 312. The wearable devices 304A, 304B may correspond to electronic devices that are capable of being worn by a user 102. While the wearable devices 304A, 304B are shown in FIG. 3 as comprising a first wearable device 304A (e.g., wireless headset, earbuds, or headphones etc.) and a second wearable device 304B (e.g., smartwatch, health monitor, fitness tracker, etc.), other examples of wearable device 304A, 304B are contemplated. For instance, wearable devices 304A, 304B may comprise at least one of an electronic headband, smart-glasses, wearable speaker, wearable camera, virtual reality headset, etc., and/or combinations thereof.

The communication devices 308 may correspond to a computing device, a personal communication device, a portable communication device, a laptop, a smartphone, a tablet, a personal computer, and/or any other device capable of running an OS, at least one communication application, a web browser, or the like. The communication devices 308 may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication devices 308 may also have any of a variety of applications, including for example, an enterprise client, web browser application, chat application, video application, social media application, calling application, etc. installed thereon. In some embodiments, the communication devices 308 may alternatively or additionally be any other electronic device, such as a thin-client computer, an Internet-enabled mobile telephone, and/or a personal digital assistant, capable of communicating via the communication network 104 and/or displaying and navigating web pages or other types of electronic documents. When a communication device 308 is used as an audio or video output source, or is used without running any application (e.g., browser, client, enterprise communications, etc.), where content is provided to the communication device 308 without requiring any associated application to run on the communication device 308, then that communication device 308 may correspond to a wearable device 304 as described herein.

The display device 312 may correspond to one or more devices comprising at least one display screen that selectively activates pixels and/or display elements to render one or more applications, windows, controls, interactive elements, icons, characters, images, etc. In some embodiments, the display device 312 may correspond to a television, monitor, projector, or other hardware that includes a Liquid Crystal Display ("LCD"), a Light Emitting Diode ("LED") display, an Electroluminescent Display ("ELD"), an Organic LED ("OLED") display, an LCD light source, LED light source, and/or some other type of display or light source.

Figure 4:
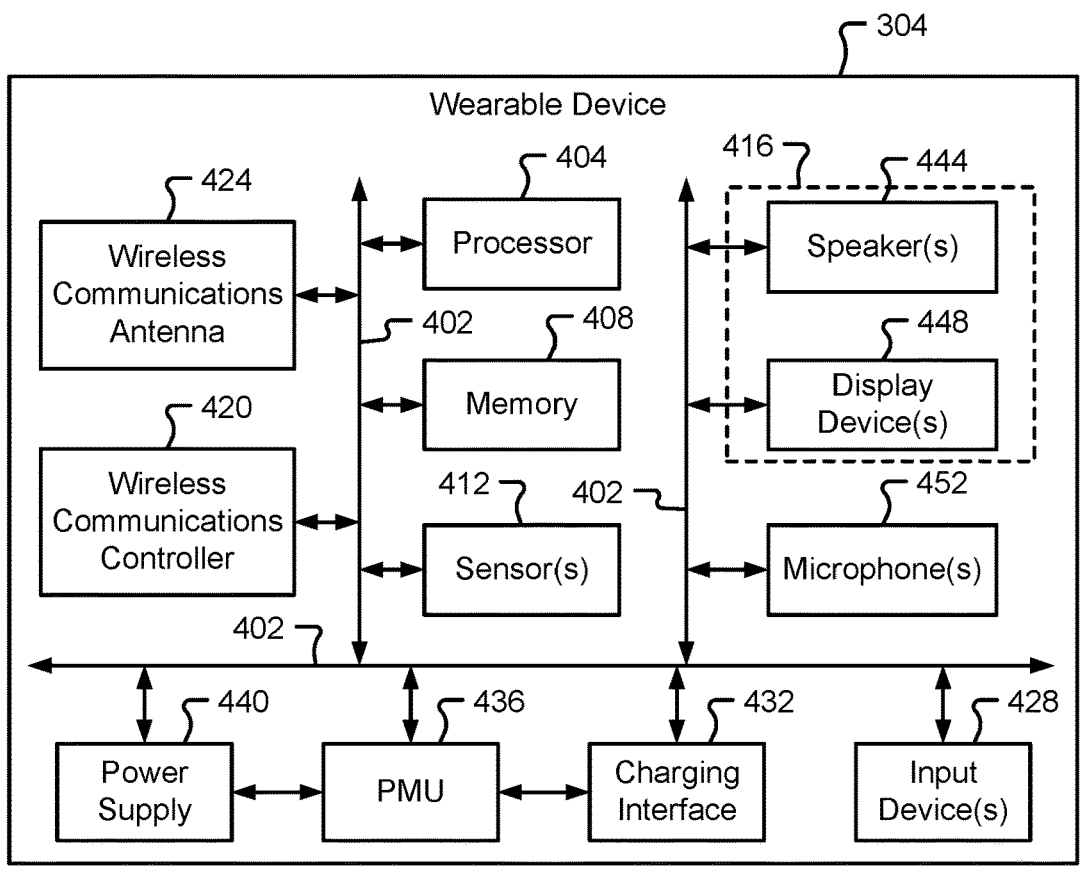
FIG. 4 is a block diagram depicting components of a wearable device used in the communication system in accordance with at least some embodiments of the present disclosure.
Figure 5:
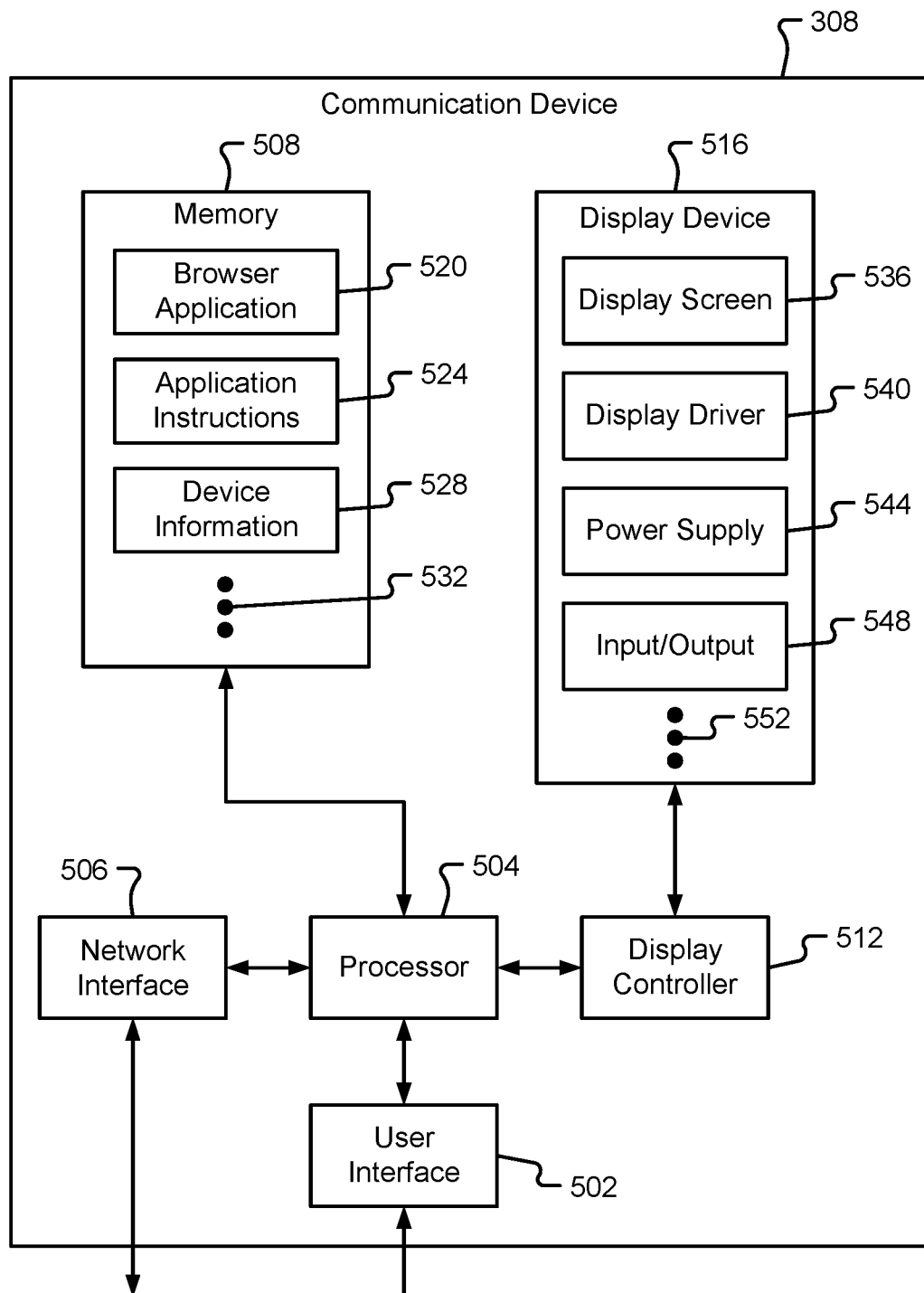
FIG. 5 is a block diagram depicting components of a communication device used in the communication system in accordance with at least some embodiments of the present disclosure.
Figure 6:
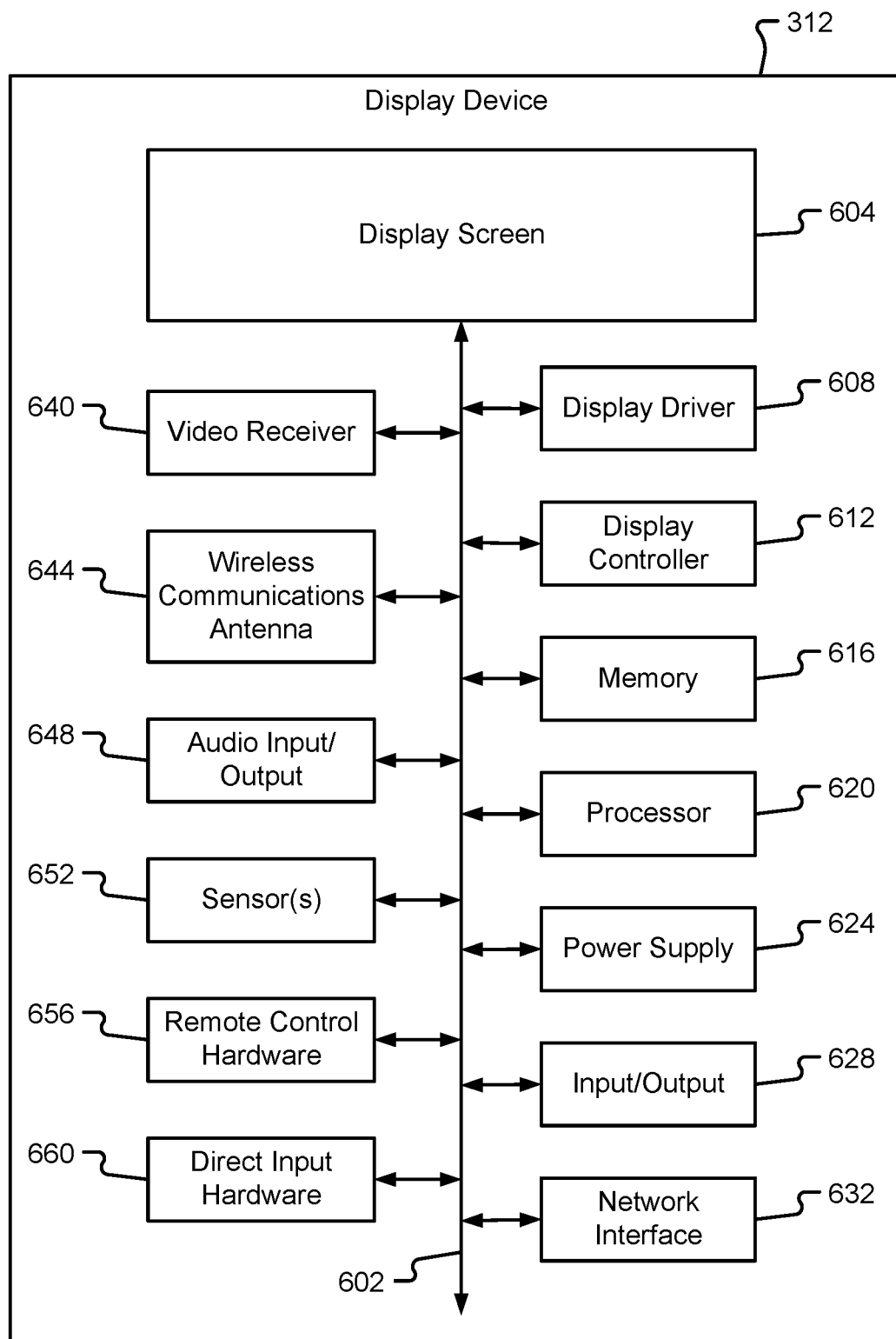
FIG. 6 is a block diagram depicting components of a display device used in the communication system in accordance with at least some embodiments of the present disclosure.

Additional details of these communication devices 116 are described in conjunction with FIGS. 4-6.

Referring not to FIG. 4, a block diagram depicting components of a wearable device 304 used in the enterprise communication system 100 is shown in accordance with at least some embodiments of the present disclosure. The wearable device 304 may correspond to one or more of the wearable devices 304A, 304B described in conjunction with FIG. 3. In some embodiments, the wearable device 304 may comprise a processor 404, memory 408, sensor(s) 412, output devices 416, wireless communications controller 420, wireless communications antenna 424, input device(s) 428, charging interface 432, Power Management Unit ("PMU") 436, and power supply 440 that may all be connected to one another via a power and/or a communications bus 402.

The processor 404 may correspond to one or many computer processing devices. Non-limiting examples of a processor include a microprocessor, an IC chip, a GPU, a CPU, or the like. Examples of the processor 404 as described herein may include, but are in no way limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture. The processor 404 may be a multipurpose, programmable device that accept digital data as input, processes the digital data according to instructions stored in its internal memory, and provides results as output. The processor 404 may implement sequential digital logic as it has internal memory. As with most microprocessors, the processor 404 may operate on numbers and symbols represented in the binary numeral system. The processor 404 may be similar, if not identical, to the processors 124, 204 described in conjunction with FIGS. 1-2, or vice versa.

The memory 408 may correspond to any type of non-transitory computer-readable medium. In some embodiments, the memory 408 may comprise volatile or nonvolatile memory and a controller for the same. Non-limiting examples of memory 408 that may be utilized in the wearable device 304 may include RAM, ROM, buffer memory, flash memory, solid-state memory, and/or variants thereof. Any of these memory types may be considered non-transitory computer memory devices even though the data stored thereby can be changed one or more times. In some embodiments, the memory 408 may be configured to store rules and/or the instruction sets depicted in addition to temporarily storing data for the processor 404 to execute various types of routines or functions. The memory 408 may store information and instructions that enable a functionality of the wearable device 304. In some embodiments, the memory 408 may comprise data about the wearable device 304 comprising an identification and/or type of the wearable device 304, an association of the wearable device 304 with a user 102 and/or the enterprise communication system 100, usage history, physical locations of the wearable device 304 over time, preferences, authentication information, and/or the like. In some embodiments, the memory 408 may include at least some of the data described in conjunction with the device information data structure 700 of FIG. 7 and/or the user information data structure 800 of FIG. 8.

The sensor(s) 412 of the wearable device 304 may comprise one or more blood oxygen sensors, contact sensors, gyroscopic sensors, heart rate sensor, IR sensors, input sensors, optical sensors, position sensors, pressure transducers, proximity sensors, RF sensors, strain gauges, temperature sensors, and/or any other desired sensor. In some embodiments, the sensor(s) 412 may provide a signal to the processor 404 indicating that the wearable device 304 is being worn by a user 102. For instance, the wearable device 304 may determine that the wearable device 304 is in an active state and being worn by a user 102 when an optical sensor detects a proximity of a portion of the user 102 relative to the wearable device 304. In some embodiments, the sensor(s) 412 may be used by the wearable device 304 in authenticating a user 102. For example, a blood oxygen sensor, heart rate sensor, and/or other sensor in the sensor(s) 412 may be used to determine a biometric identification of the user 102. As yet another example, the user 102 may provide input via the sensor(s) 412 detecting a tap, press, push entered via the wearable device 304 (e.g., via one or more of the pressure transducers, strain gauges, input sensors, etc.). In some embodiments, the sensor(s) 412 may be coupled with the input device(s) 428 to receive and interpret input provided by a user 102.

The output devices 416 may comprise one or more speaker(s) 444, display device(s) 452, and/or other audio/video output devices. The speaker(s) 444 may correspond to hardware device that outputs, or generates, sound for the wearable device 304. In some embodiments, the speaker(s) 444 may comprise at least one of a cone, iron coil, magnet, and housing, and upon receiving electrical input (e.g., from the processor 404, etc.) causes a vibration of the cone to output, or generate, sound waves from the speaker(s) 444. In some embodiments, the speaker(s) 444 may comprise an electrostatic or other type of speaker. In one embodiment, the speaker(s) 444 may output audio content that is received from a distributed communication controller 112 in the enterprise communication system 100. The display device(s) 448 may correspond to one or more devices comprising at least one display screen that selectively activates pixels and/or display elements to render one or more applications, windows, controls, interactive elements, icons, characters, images, etc. Examples of the display device(s) 448 of the wearable device 304 may include, but are in no way limited to, an LCD, an LED display, an ELD, an OLED display, etc., and/or the like. In some embodiments, the display device(s) 448 of the wearable device 304 may output video output (e.g., one or more still or moving images, etc.), in real time, as it is received from the distributed communication controller 112 in proximity to the wearable device 304.

The wireless communications controller 420 may correspond to a controller comprising at least one of a CDMA, FDMA, GSM, TDMA, and/or an analog cellular telephony transceiver capable of supporting voice, multimedia, and/or data transfers over a cellular network. In some embodiments, the wireless communications controller 420 may comprise Wi-Fi, WiMax, IR, RF, or other wireless communications components, transceivers, etc. Additionally or alternatively, the wireless communications controller 420 may transmit and receive wireless communications via Bluetooth™ protocol, BLE protocol, etc. In some embodiments, the wireless communications controller 420 may be associated with at least one shared or dedicated wireless communications antenna 424.

The input device(s) 428 may comprise one or more of the sensor(s) 412, hardware buttons, physical switches, touch-sensitive devices (e.g., capacitive touch, resistive touch, etc.), and or microphone(s) 452. The microphone(s) 452 may correspond to one or more instruments that convert sound waves, or vibrations, into electrical energy, acoustic-to-electric transducers, or other audio input sensors. The microphone(s) 452 may correspond to one of the input device(s) 428 configured to receive and convert sound waves from, for example, a user 102 into an equivalent analog or digital signal. Input from a user 102 may be provided by any one or more of the input device(s) 428.

The charging interface 432 may include a physical port and/or an inductive charging element for receiving power and charging the power supply 440. In one embodiment, the charging interface 432 may comprise inductive coils that receive power from a mating inductive power source. In some embodiments, data may be transferred to or from the wearable device 304 through the charging interface 432.

The PMU 436 may comprise an AC-to-DC converter, a controller, power control logic, and/or ports for interconnecting the charging interface 432 with the power supply 440. In some embodiments, the power supply 440 of the wearable device 304 may include a battery (e.g., alkaline, lithium, nickel-metal hydride, and/or the like) or a capacitive power source (e.g., a capacitive battery, etc.). The power supply 440 may be rechargeable by, for example, connecting the wearable device 304 to an external power source via the charging interface 432. In some embodiments, the power supply 440 may comprise a capacitive battery that provides for quick-charging of the wearable device 304.

FIG. 5 is a block diagram depicting components of a communication device 308 used in the enterprise communication system 100 in accordance with at least some embodiments of the present disclosure. The communication device 308 may comprise a user interface 502, processor 504, a network interface 506, a memory 508, a display controller 512, and a display device 516. The memory 508 may store one or more instruction sets, applications, rules, information, or modules. The communication device 308 may be configured as a desktop computer, smartphone, tablet, laptop, and/or the like.

The user interface 502 may correspond to any type of input and/or output device, or combination thereof, that enables a user 102 to interact with the communication device 308. As can be appreciated, the nature of the user interface 502 may depend upon the nature of the communication device 308. Examples of the user interface 502 may include, but are in no way limited to, user interface hardware and devices such as one or more touch-sensitive display elements, buttons, switches, keyboards, peripheral interface devices (e.g., mice, controllers, joysticks, etc.) as described herein. It is an aspect of the present disclosure that one or more devices in the user interface 502 may provide an input that is interpreted by the processor 504 in controlling one or more components of the communication device 308.

The processor 504 may correspond to one or many computer processing devices. Non-limiting examples of a processor include a microprocessor, an IC chip, a GPU, a CPU, or the like. The processor 504 may be a multipurpose, programmable device that accepts digital data as input, processes the digital data according to instructions stored in its internal memory, and provides results as output. The processor 504 may implement sequential digital logic as it has internal memory. As with most microprocessors, the processor 504 may operate on numbers and symbols represented in the binary numeral system. The processor 504 may be similar, if not identical, to the processors 124, 204, 404 previously described in conjunction with FIGS. 1, 2, and 4, or vice versa.

The network interface 506 may comprise hardware that facilitates communications with other communication devices (e.g., the distributed communication controller 112, other communication devices 308, the enterprise server 144, and/or other servers, etc.) directly or over the communication network 104. In some embodiments, the network interface 506 may include an Ethernet port, a Wi-Fi card, an NIC, a cellular interface (e.g., antenna, filters, and associated circuitry), or the like. The network interface 506 may be configured to facilitate a connection between the communication device 308 and the enterprise server 144 via the communication network 104 and may further be configured to encode and decode communications (e.g., packets, etc.) according to a protocol utilized by the communication network 104.

The memory 508 may correspond to any type of non-transitory computer-readable medium. In some embodiments, the memory 508 may comprise volatile or non-volatile memory and a controller for the same. Non-limiting examples of the memory 508 that may be utilized in the communication device 308 may include RAM, ROM, buffer memory, flash memory, solid-state memory, and/or variants thereof. Any of these memory types may be considered non-transitory computer memory devices even though the data stored thereby can be changed one or more times. In some embodiments, the memory 508 may be configured to store rules and/or the instruction sets depicted in addition to temporarily storing data for the processor 504 to execute various types of routines or functions. The computer-readable memory 508 may store the browser application 520, application instructions 524, device information 528, and/or more 532.

The browser application 520 stored in the memory 508 of the communication device 308 may correspond to any application program that provides access to network (e.g., LAN, Internet, World Wide Web, etc.) content. Examples of the browser application 220 may include, but are in no way limited to, Microsoft® Internet Explorer, Microsoft® Edge, Google® Chrome, Mozilla Firefox®, Apple® Safari, and/or the like. In some embodiments, the browser application 520 may run a browser-based application. The browser-based application may run via the enterprise server 144 and interact with the communication device 308.

The application instructions 524 stored in the memory 508 of the communication device 308 may correspond to one or more applications that, when installed on the communication device 308, allow the communication device 308 to run applications natively via the processor 504 of the communication device 308. In some embodiments, the application instructions 524 may comprise a communication application that enables and/or provides, for example, VoIP calling, access to contact lists, access to voicemail, access to scheduled meetings (e.g., via a digital calendar), chat functionality, unified communications, and/or the like. In some embodiments, the application instructions 524 may refer to an extension associated with the user 102 in providing access to communication functionality for the communication device 308.

The device information 528 may comprise data about the communication device 308 comprising an identification and/or type of the communication device 308, an association of the communication device 308 with a user 102 and/or the enterprise communication system 100, usage history, physical locations of the communication device 308 over time, preferences, authentication information, and/or the like. In some embodiments, the authentication information may comprise access credentials, passwords, biometric data, etc. Examples of the device information 528 may include, but is in no way limited to, the data described in conjunction with the device information data structure 700 of FIG. 7 and/or the user information data structure 800 of FIG. 8.

The communication device 308 may comprise at least one display device 516 that renders information, applications, windows, interactive elements, and/or other visual output to at least one display screen 536. The communication device 308 may include at least one display controller 512 that controls an operation of the display device 516. This operation may include the control of input (e.g., input provided by the user 102 via the user interface 502, command input via the instruction sets in memory 508, and/or combinations thereof, etc.), output (e.g., display, rendered images, window behavior, etc.) and/or other functions of the display device 516 and a display controller 512.

As described above, the display device 516 may comprise at least one display screen 536 that selectively activates pixels and/or display elements to render one or more applications, windows, controls, interactive elements, icons, characters, images, video content (e.g., streaming video), etc. Examples of the display screen 536 may include, but are in no way limited to, an LCD, an LED display, an ELD, an OLED display, and/or some other type of display. In some embodiments, the display device 516 may be configured to render information in one or more discrete areas (e.g., areas, backgrounds, portions, windows, zones, etc.) of the display screen 536 or superimposed in an area of the display screen 536.

The display device 516 may include a display driver 540, a power supply 544, an input/output 548, and/or other components 552 that enable operation of the display device 516. The display driver 540 may receive commands and/or other data provided by the processor 504 and one or more of the instruction sets in memory 508. In response to receiving the commands, the display driver 540 may generate the driving signals necessary to render the appropriate images to the display screen 536.

The power supply 544 may provide electric power to one or more components of the display device 516. In one embodiment, the power supply 544 may include a transformer and/or other electronics that prevent overloading, condition power signals, and/or provide backup power to the display device 516. The input/output 548 may correspond to one or more connections for receiving or exchanging information and/or video from components of the communication device 308 (e.g., the processor 504, etc.). The input/output 548 may comprise a high-definition multimedia interface ("HDMI") input, DisplayPort ("DP") input, Ethernet, composite video, component video, H.264, or some other video connection type.

FIG. 6 is a block diagram depicting components of a display device 312 used in the enterprise communication system 100 in accordance with at least some embodiments of the present disclosure. As provided above, the display device 312 may correspond to a device comprising a display screen 604 that selectively activates pixels and/or display elements to render one or more applications, windows, controls, interactive elements, icons, characters, images, etc. In some embodiments, the display device 312 may correspond to a television, monitor, projector, or other hardware that includes a Liquid Crystal Display ("LCD"), a Light Emitting Diode ("LED") display, an Electroluminescent Display ("ELD"), an Organic LED ("OLED") display, an LCD light source, LED light source, and/or some other type of display or light source.

The display device 312 may comprise a display driver 608, display controller 612, memory 616, processor 620, power supply 624, input/output 628, network interface 632, video receiver 640, wireless communications antenna 644, audio input/output 648, sensor(s) 652, remote control hardware 656, direct input hardware 660, that may all be connected to one another via a power and/or a communications bus 602.

The display screen 604 of the display device 312 may be similar, if not identical, to the display screen 536 described in conjunction with FIG. 5. Additionally or alternatively, the display driver 608 and the display controller 612 of the display device 312 may be similar, if not identical, to the display driver 540 and the display controller 512, respectively described in conjunction with FIG. 5.

The display device 312 may include a memory 616 for use in connection with the execution of application programming or instructions by the processor 620, and for the temporary or long term storage of program instructions and/or data. Examples of the memory 616 may include, but are in no way limited to, RAM, Dynamic RAM ("DRAM"), Synchronous DRAM ("SDRAM"), or other solid state memory. Additionally or alternatively, the memory 616 may comprise a hard disk drive and/or the like.

The processor 620 may comprise a general purpose programmable processor or controller for executing application programming or instructions of the display device 312. In some embodiments, the processor 620 may comprise multiple processor cores, and/or implement multiple virtual processors. In one embodiment, the processor 620 may include multiple physical processors. For example, the processor 620 may comprise a controller, a digital signal processor, a hardwired electronic or logic circuit, a programmable logic device or gate array, a specially configured ASIC or other IC, a special purpose computer, or the like. The processor 620 may run programming code or instructions (e.g., stored in the memory 616, etc.) implementing various functions of the display device 312.

Power may be supplied to the components of the display device 312 from a power supply 624. The power supply 624 may include, for example, a battery, an AC-to-DC converter, power control logic, and/or ports for interconnecting the display device 312 to an external power source (e.g., supplied via an electrical outlet, connection, etc.).

An input/output 628 and associated ports may be included to support communications over wired networks or links, for example, with other devices (e.g., communication devices 116), servers 144, 148, 152, and/or peripheral devices. Examples of an input/output 628 may comprise an Ethernet port, a Universal Serial Bus ("USB") port, Thunderbolt™ interface, Institute of Electrical and Electronics Engineers ("IEEE") 1394 port, or other interface.

The display device 312 may comprise a network interface 632. The network interface 632 may comprise one or more proprietary and/or universal ports that support interconnection of the display device 312 to a communication network 104. In some embodiments, the network interface 632 may provide the display device 312 with the ability to send and receive communication packets or the like over the communication network 104. The network interface 632 may be an NIC, a network port, a modem, drivers for the same, and the like. Communications between the components of the display device 312 and other devices in the enterprise communication system 100 may flow through the network interface 632 of the display device 312. Examples of a network interface 632 may include, without limitation, an antenna, a driver circuit, an Ethernet port, a modulator/demodulator, an NIC, an RJ-11 port, an RJ-45 port, an RS-232 port, a USB port, etc. The network interface 632 may include one or multiple different network interfaces depending upon whether the display device 312 is connecting to a single communication network or multiple different types of communication networks. The network interface 632 may include different communications ports that interconnect with various input/output lines.

The display device 312 may comprise a video receiver 640 configured to receive wireless video signals from one or more distributed communication controllers 112 in the enterprise facility 108. In some embodiments, streaming video may be received from a distributed communication controller 112 (e.g., originally from a video server 152, or other video streaming server in the enterprise communication system 100) that is in proximity (e.g., communication range) of the display device 312. The video receiver 640 may operate over Wi-Fi and may utilize the wireless communications antenna 644 of the display device 312 in receiving wireless signals. In one example, the video receiver 640 may receive streaming video signal that is forwarded by the distributed communication controller 112 from the video server 152. The streaming video signal may be received from the distributed communication controller 112 in a WHDMI format, etc.

In some embodiments, an audio input/output 648 may be included to provide analog or digital audio to an interconnected speaker or other device, and to receive analog audio input from a connected microphone or other device. As an example, the audio input/output 648 may comprise an associated amplifier and an analog-to-digital converter. In some embodiments, the audio input/output 648 of the display device 312 may include an integrated audio input/output device and/or an audio jack for interconnecting an external speaker or microphone. For instance, an integrated speaker and an integrated microphone may be provided, to support voice operations and/or speaker phone operations via the display device 312.

The display device 312 may comprise one or more sensor(s) 652 including, but in no way limited to, image sensors (e.g., cameras that are configured to capture still and/or video images), motion sensors, light sensors, IR sensors, RF sensors, etc. The sensor(s) 652, based on a condition detected or signal received, may send a signal to the processor 620 for controlling an aspect of the display device 312 (e.g., streaming video, adjusting brightness, switching inputs, cycling power, etc.).

The remote control hardware 656 may comprise one or more devices that receive remote or wireless signals to control a function of the display device 312. In some embodiments, the remote control hardware 656 may comprise IR and/or RF sensors that are configured to receive wireless signals and commands sent by a remote control device.

The display device 312 may comprise direct input hardware 660 for use in connection with specific control operation. This direct input hardware 660 may include, without limitation, power buttons, input buttons, volume buttons, menu buttons, channel buttons, and/or other navigational buttons or switches to control the display device 312 and/or menus displayed thereby.

Referring to FIG. 7, a block diagram depicting a device information data structure 700 will be described in accordance with at least some embodiments of the present disclosure. The device information data structure 700 may include a number of fields that may be used in the various communication flows, methods, and processes outlined herein. For instance, the device information data structure 700 shown may be associated with a particular communication device 116 associated with a user 102 and/or an extension of the user 102. In some embodiments, the device information data structure 700 may be stored in the user information database 142, the memory 128 of the enterprise server 144, and/or the memory 408, 508, 616 of a respective communication device 116. Information stored in the device information data structure 700 may be used by the distributed communication controller 112 to determine a particular communication device 116 associated with a user 102 and/or extension of the user 102 in providing services or communications as described herein. Examples of the device information data structure 700 data fields include, without limitation, a device identification field 704, a device type field 708, a hardware capabilities field 712, a user association field 716, an enterprise association field 720, a usage history field 724, a physical location field 728, and more 732.

The device identification field 704 may comprise data used to identify or describe a particular communication device 116 from communication devices 116A-116F in the enterprise communication system 100. This identification may be a name, phrase, word, symbol, number, character, and/or combinations thereof. The identification may include an Integrated Circuit Card Identification ("ICCID") number, International Mobile Equipment Identity ("IMEI"), International Mobile Subscriber Identity ("IMSI") number, IP address, Media Access Control ("MAC") address, etc., and/or any other data used to uniquely identify one communication device 116 from another in the communication devices 116A-116F associated with an extension of the user 102. In some embodiments, a wearable device 304 type of communication device 116 may send a device identification for the wearable device 304 as part of an advertising signal sent by the wearable device 304 (e.g., Bluetooth™ advertising packets, etc.). The advertising signal may be sent periodically, upon request (e.g., by a challenge signal received by the wearable device 304, etc.), and/or in response to activating the wearable device 304 (e.g., powering on, wearing, etc.).

The device type field 708 may comprise data that identifies a type of the communication device 116 or wearable device 304. For instance, information in the communication device 308 may define whether a wearable device 304 corresponds to a wireless headset or a set of wireless headphones, a smartwatch, a smartphone, electronic headband, smart glasses, or some other type of wearable device 304. In some embodiments, a user 102 may have a number of wearable devices 304 that are of similar or different types. For instance a first device of a user 102 may be a set of wireless (e.g., Bluetooth™, etc.) headphones and a second device of the user 102 may be a smartwatch. Each of these types of wearable device 304 may be associated with a user 102 and can be used independently or together in providing services, communications, and/or content (e.g., from the distributed communication controllers 112, etc.) as described herein.

The hardware capabilities field 712 may comprise data that identifies at least one capability of the communication device 116 or wearable device 304 identified in the device identification field 704. These hardware capabilities correspond to a functional capability of a wearable device 304 that is based on the wearable device 304 having specific hardware components. The hardware components may correspond to one or more of the components described in conjunction with the block diagram of FIG. 4. For instance, the wearable device 304 may include one or more speaker(s) 444, display device(s) 448, and microphone(s) 452. Examples of hardware capabilities may include, but are in no way limited to, the ability to provide audio output (e.g., via the speaker(s) 444), video output (e.g., via the display device(s) 448), computer processing (e.g., via a processor 404), communications via a specific protocol (e.g., via Bluetooth™, Wi-Fi, cellular, etc., via the wireless communications controller 420 and wireless communications antenna 424), and/or the like. Additionally or alternatively, the hardware capabilities may include, without limitation, the ability to receive voice input from a user 102 (e.g., via one or more microphone(s) 452), receive input from one or more input device(s) 428 (e.g., buttons, etc.), and/or the ability to receive input from one or more sensor(s) 412 of the wearable device 304. In some embodiments, the hardware capabilities field 712 may list the available hardware of the wearable device 304 and/or the specific capabilities offered by the hardware of the wearable device 304. As with any of the fields in the device information data structure 700, the hardware capabilities field 712 may be included in a message sent from the wearable device 304 (e.g., via advertising packets, broadcast communications, and/or other signals sent from the wearable device 304 to the distributed communication controller 112, etc.).

The user association field 716 may comprise data that identifies a particular user 102 that is associated with the communication device 116 or wearable device 304 identified in the device identification field 704. In some embodiments, the user association field 716 may comprise a link to the user information data structure 800 and/or a particular field (e.g., the user identification field 804, the extension number field 808, etc.) in the user information data structure 800, described in conjunction with FIG. 8, that identifies a user 102 who owns, wears, uses, or otherwise interacts with the wearable device 304. In some embodiments, the information stored in the user association field 716 may identify that a particular communication device 116 is registered to a user 102.

The enterprise association field 720 may comprise data that identifies a particular enterprise or enterprise facility 108 that is associated with the communication device 116 or wearable device 304 identified in the device identification field 704. In some embodiments, the information in the enterprise association field 720 may be used by an enterprise server 144, or other server 148, 152 in the enterprise communication system 100 to determine a number of communication devices 116 registered in an enterprise, whether a user 102 is visiting from another enterprise, whether enterprise services are available to the communication device 116 identified in the device identification field 704 for the user 102, etc. The enterprise association field 720 may comprise data that identifies whether a particular communication device 116 is owned by or used in a particular enterprise or enterprise facility 108.

The usage history field 724 may comprise data corresponding to times of use, times that signals have been received from the communication device 116, detections of the communication device 116 in an enterprise facility 108 (e.g., via data provided by one or more of the distributed communication controllers 112 in the enterprise facility 108), and/or communications sent and received by the communication device 116 identified in the device identification field 704. In some embodiments, registrations and/or terminations of registrations information may be stored in the usage history field 724 for the communication device 116 identified in the device identification field 704 of the device information data structure 700. In one embodiment, the usage history field 724 may be used to record a time of registration, a time of termination of registration, a frequency of register and/or unregister commands issued for a particular communication device 116, and/or the like. In some embodiments, the distributed communication controller 112 and/or the enterprise server 144 may determine a behavior of the communication device 116 based on the information stored in the usage history field 724. In one example, based on this behavior determined, the distributed communication controller 112 and/or the enterprise server 144 may determine predicted times that the communication device 116 will be present in an enterprise facility 108 and/or location in the enterprise facility 108.

The physical location field 728 may comprise data used to determine a location of the communication device 116 identified in the device identification field 704 over time. The location may correspond to a physical (e.g., geographical) location inside an enterprise facility 108. The physical location field 728 may include a current location of the communication device 116 and may even store historical location information for the identified communication device 116. In some embodiments, the physical location field 728 may be updated by the communication device 116 as the communication device 116 moves throughout the enterprise facility 108. In this manner, the physical location of the communication device 116 can be provided in real time (e.g., to the distributed communication controller 112 that is in proximity to the communication device 116). The physical location of the communication device 116 may be determined based on information exchanged with one or more iBeacons, an indoor positioning system 118, a Global Positioning System ("GPS") radio navigation system, and/or a distributed communication controller 112 in proximity to the identified communication device 116. The physical location may be provided in a message sent from the communication device 116 (e.g., a wearable device 304, etc.) via advertising packets, broadcast communications, and/or other signals sent from the communication device 116 to a distributed communication controller 112 in a communication range (e.g., in proximity to) of the communication device 116 identified in the device identification field 704.

FIG. 8 shows a block diagram depicting a user information data structure 800 in accordance with at least some embodiments of the present disclosure. The user information data structure 800 may include a number of fields that may be used in the various communication flows, methods, and processes outlined herein. For example, the user information data structure 800 shown may be associated with a particular user 102 of a communication device 116 in an enterprise. The user information data structure 800 may be stored in the user information database 142, the memory 128 of the enterprise server 144, and/or the memory 408, 508, 616 of a respective communication device 116. Information stored in the user information data structure 800 may be used by the distributed communication controller 112 to determine a particular user 102 associated with a communication device 116, for example, in providing one or more services or communications as described herein. Examples of the user information data structure 800 data fields may include, without limitation, a user identification field 804, an extension number field 808, an authentication credentials field 812, an available features field 816, an associated devices field 820, a preferences field 824, a physical location field 828, and more 832.

The user identification field 804 may comprise data about the user 102 associated with a particular communication device 116 in the enterprise communication system 100. This data may include a name, identifier, email address, employee number, alias, symbol, photo, icon, character, and/or some other string of characters to differentiate one user 102 from another in the enterprise communication system 100 and/or the enterprise facility 108. The distributed communication controller 112 and/or the enterprise server 144 may refer to the information stored in the user identification field 804 to determine associated registered communication devices 116, an extension number, etc., and provide various services to the user 102 based on the identification.

The extension number field 808 may comprise data used to identify or otherwise describe a particular extension of the user 102 identified in the user identification field 804. The extension number may be one or more numbers, characters, symbols, digits, etc., and/or combinations thereof. In some embodiments, the extension number may correspond to a typical phone extension number comprising a plurality of digits. As provided above, one or more communication devices 116 may be associated with the extension associated with a user 102. In some embodiments, the extension number may be used to uniquely identify the extension of one user 102 from another in the enterprise communication system 100. In some embodiments, the extension used by each communication device 116, that is associated with a user 102, may have the same extension number. As can be appreciated, different users may have different extensions, and different extension numbers, and each user 102 may have one or more communication devices 116 registered with their own extension in the enterprise communication system 100.

The authentication credentials field 812 may comprise data corresponding to stored credentials for the user 102, which are associated with the extension of the user 102 and/or at least one communication device 116 of the user

102. These credentials may include passwords, passcodes, keys (e.g., public keys, private keys, etc.), access tokens, and/or any other authentication information used in verifying a user 102 and/or a communication device 116 for a user 102, authorizing services (e.g., enterprise communication services, etc.) for a user 102, and/or for any other verification, access permission, and/or authorization in accordance with the embodiments disclosed herein.

The available features field 816 may comprise data corresponding to one or more communication features that are available for a user 102 identified in the user identification field 804. In some embodiments, the available features identified in the available features field 816 may only be made available when the user 102 is authorized via the information in the authentication credentials field 812. The available features may correspond to enterprise communication features such as audio calling, call logging, call recording, meeting services, video calling, voicemail, and/or the like. In some embodiments, these features may be associated with the user 102 and/or an extension of the user 102. The features may be available to specific users that are registered with an enterprise server 144 and/or some other communications server. The distributed communication controller 112 and/or the enterprise server 144 may refer to the information in the available features field 816 in determining which enterprise communication services to provide to a user 102 and, more specifically, communication device 116 of the user 102.

The associated devices field 820 may comprise data corresponding to one or more communication device 116 that are identified as being associated with a particular user 102. In some embodiments, the associated devices field 820 may comprise a link to the device information data structure 700 and/or a particular field (e.g., the device identification field 704, etc.) in the device information data structure 700, described in conjunction with FIG. 7, that, among other things, identifies a communication device 116 used by, owned by, worn by, or associated with a user 102. In some embodiments, the information stored in the associated devices field 820 may identify one or more communication devices 116 that are registered to a user 102 in the enterprise communication system 100.

The preferences field 824 may comprise data used in determining one or more preferences of the user 102. The preferences may be based on previous communications made, interactions conducted, or some other behavior of the user 102 over time. In some embodiments, the preferences may be based on one or more predetermined settings entered by the user 102. The preferences field 824 may comprise preferences and/or other information associated with each of the communication devices 116 in the associated devices field 820. The preferences may include contact preferences, preferred communication devices 116, privacy settings, command settings, preferred input devices, preferred output devices, preferred interactions, and/or the like. By way of example, the user 102 may prefer to receive a conversational interaction provided over a wireless headset (e.g., headphones, etc.) with communications received from the distributed communication controller 112. In this example, the preferred interaction would be the conversational type of interaction and the preferred device may be the wireless headset. In some embodiments, certain types of content may be associated, in the form of preferences stored in the preferences field 824, with specific communication devices 116 of the user 102. As another example, a user 102 may prefer to receive video content at a first communication device and audio content at a second, different, communication device.

The physical location field 828 may comprise data used to determine a location of the user 102 identified in the user identification field 804 over time. This location may correspond to a physical (e.g., geographical) location inside an enterprise facility 108. The location in the physical location field 828 may include current and/or historical location information for the user 102. This current and/or historical location information for the user 102 may be based on the location information of one or more of the communication devices 116 that are associated with the user 102 (e.g., as stored in the physical location field 728 of the device information data structure 700 described in conjunction with FIG. 7). The physical location field 828 may comprise location information from a plurality of the communication devices 116 that, when aggregated, can define a location of the user 102 at any time (e.g., current or historical). In some embodiments, the physical location field 828 may be updated by the communication device 116 as one or more of the communication devices 116 move throughout the enterprise facility 108. In this manner, the physical location of the user 102 may be provided in real time (e.g., to the distributed communication controller 112 that is in proximity to the one or more communication devices 116). As provided above, the physical location of the user 102 may be determined based on information exchanged between the one or more communication devices 116 with one or more iBeacons, an indoor positioning system 118, a GPS navigation system, and/or a distributed communication controller 112 that is in proximity to the identified communication device 116. The physical location may be provided in a message sent from the one or more communication devices 116 (e.g., wearable devices 304, etc.) via advertising packets, broadcast communications, and/or other signals sent from the one or more communication devices 116 to a distributed communication controller 112 that is in a communication range, or proximity, of the one or more communication devices 116 of the user 102.

Figure 9:
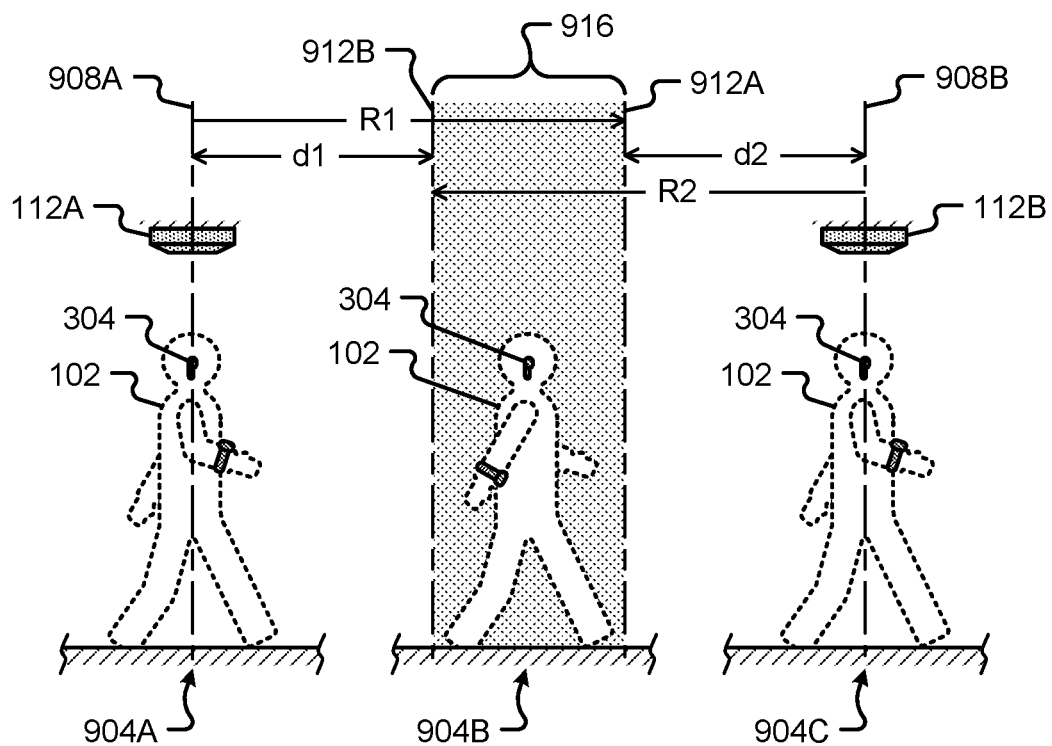
FIG. 9 is a diagram depicting a user with a wearable device moving from one location to another in the communication system in accordance with embodiments of the present disclosure.

FIG. 9 is a diagram depicting a user 102 with a wearable device 304 (e.g., a communication device 116) moving from one location to another in the enterprise communication system 100 in accordance with embodiments of the present disclosure. As illustrated in FIG. 9, the user 102 is moving from a first user location 904A to a second user location 904B, and then to a third user location 904C.

At the first user location 904A, a first distributed communication controller 112A is statically located (e.g., fixed) in a mounted position in a first physical location 908A in an enterprise facility 108. The first distributed communication controller 112A may be mounted to a ceiling, wall, or other part of the enterprise facility 108. The first distributed communication controller 112A is shown to have a first communication range limit 912A at a first range limit distance, R1, from the first physical location 908A. The first communication range limit 912A may correspond to the furthest point from the first distributed communication controller 112A at which communications can still be sent and/or received by the first distributed communication controller 112A. When the wearable device 304 of the user 102 is within first communication range limit 912A, the wearable device 304 may be defined as being in proximity to the first distributed communication controller 112A. In this zone, the wearable device 304 may be able to exchange communications with the first distributed communication controller 112A, and vice versa.

At the third user location 904C, a second distributed communication controller 112B is statically located (e.g., fixed) in a mounted position in a second physical location 908B in the enterprise facility 108. Similar to the first distributed communication controller 112A, the second distributed communication controller 112B may be mounted to a ceiling, wall, or other part of the enterprise facility 108. The second distributed communication controller 112A is shown to have a second communication range limit 912B at a second range limit distance, R2, from the second physical location 908B. The second communication range limit 912B may correspond to the furthest point from the second distributed communication controller 112B at which communications can still be sent and/or received by the second distributed communication controller 112B. When the wearable device 304 of the user 102 is within second communication range limit 912B, the wearable device 304 may be defined as being in proximity to the second distributed communication controller 112B. In this zone, the wearable device 304 may be able to exchange communications with the second distributed communication controller 112B, and vice versa.

The first distributed communication controller 112A and the second distributed communication controller 112B may at least one overlapping communication ranges. In some embodiments, this overlapping portion may correspond to the shaded handoff zone 916 where the first communication range limit 912A overlaps the second communication range limit 912B, or vice versa. For instance, the first distributed communication controller 112A may be statically located a fixed distance from the second distributed communication controller 112B. This distance may be defined as the first range limit distance, R1, plus a second distance, d2, measured from the first range limit distance, R1, to the second distributed communication controller 112B. Proceeding in the opposite direction, second distributed communication controller 112B may be statically located the fixed distance from the first distributed communication controller 112A. This distance may be defined as the second range limit distance, R2, plus a first distance, d1, measured from the second range limit distance, R2, to the first distributed communication controller 112A. In any event, the overlapping may correspond to the distance running from the first distance, d1, to the second distance, d2, as illustrated in FIG. 9. When the wearable device 304 of the user 102 is within handoff zone 916, the wearable device 304 may be defined as being in proximity to both the first distributed communication controller 112A and the second distributed communication controller 112B. In this handoff zone 916, when the user 102 is traveling from the first distributed communication controller 112A to the second distributed communication controller 112B, the first distributed communication controller 112A and/or the second distributed communication controller 112B may determine to transfer call processing, application execution, and/or the providing of enterprise communication services from the first distributed communication controller 112A to the second distributed communication controller 112B. This transfer may correspond to the first distributed communication controller 112A ceasing providing communication services to the wearable device 304 when a communication connection is established between the wearable device 304 and the second distributed communication controller 112B and the second distributed communication controller 112B executes application instructions continuing to provide the communication services to the wearable device 304 in the handoff zone 916.

Although shown as transferring responsibility for providing services to the wearable device 304 between the first distributed communication controller 112A and the second distributed communication controller 112B, the responsibility may be transferred back to the first distributed communication controller 112A or to another distributed communication controller 112 in the enterprise facility 108 as the user 102 moves throughout the enterprise facility 108.

Figure 10A:
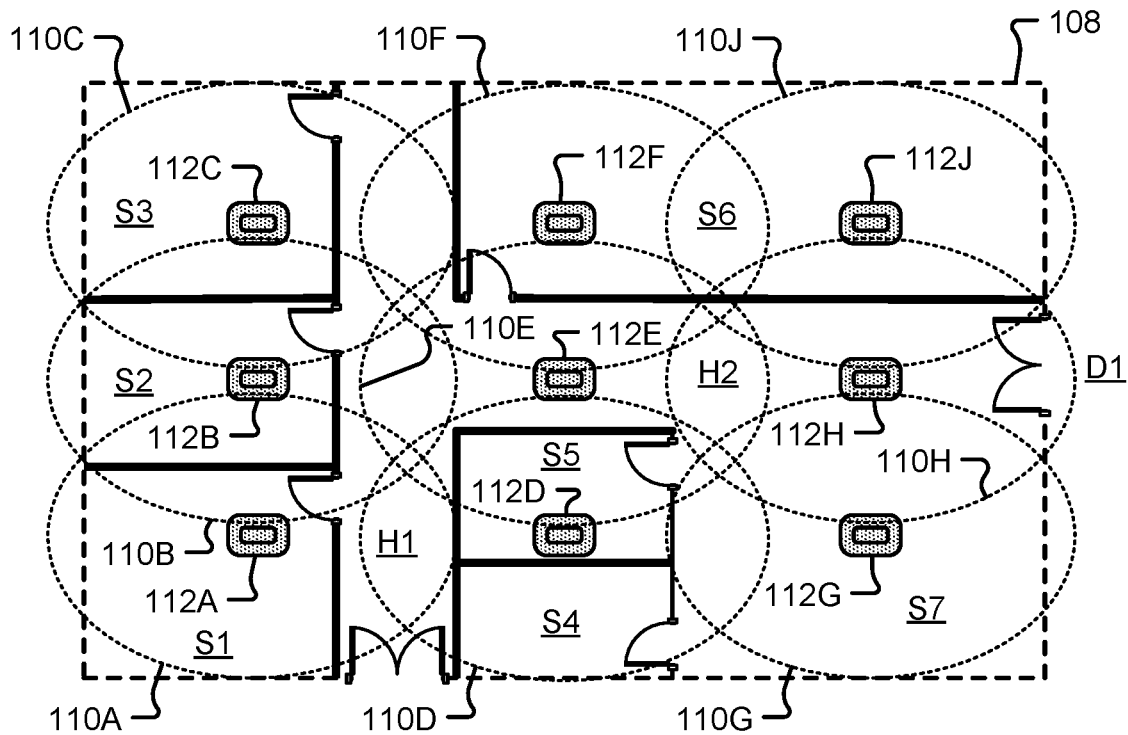
FIG. 10A is a schematic plan view of an enterprise facility depicting a plurality of distributed communication controllers associated with various locations in the communication system in accordance with embodiments of the present disclosure.
Figure 10B:
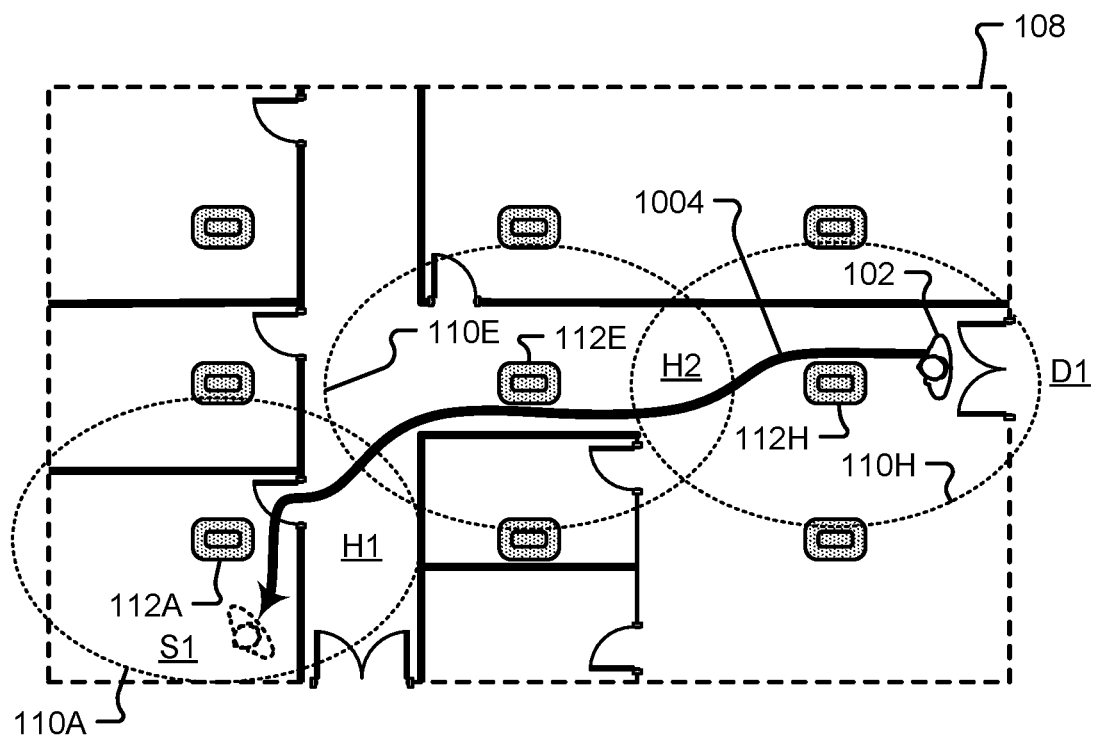
FIG. 10B is a schematic diagram depicting a movement path of a user in the in the enterprise facility shown in FIG. 10A in accordance with embodiments of the present disclosure.
Figure 10C:
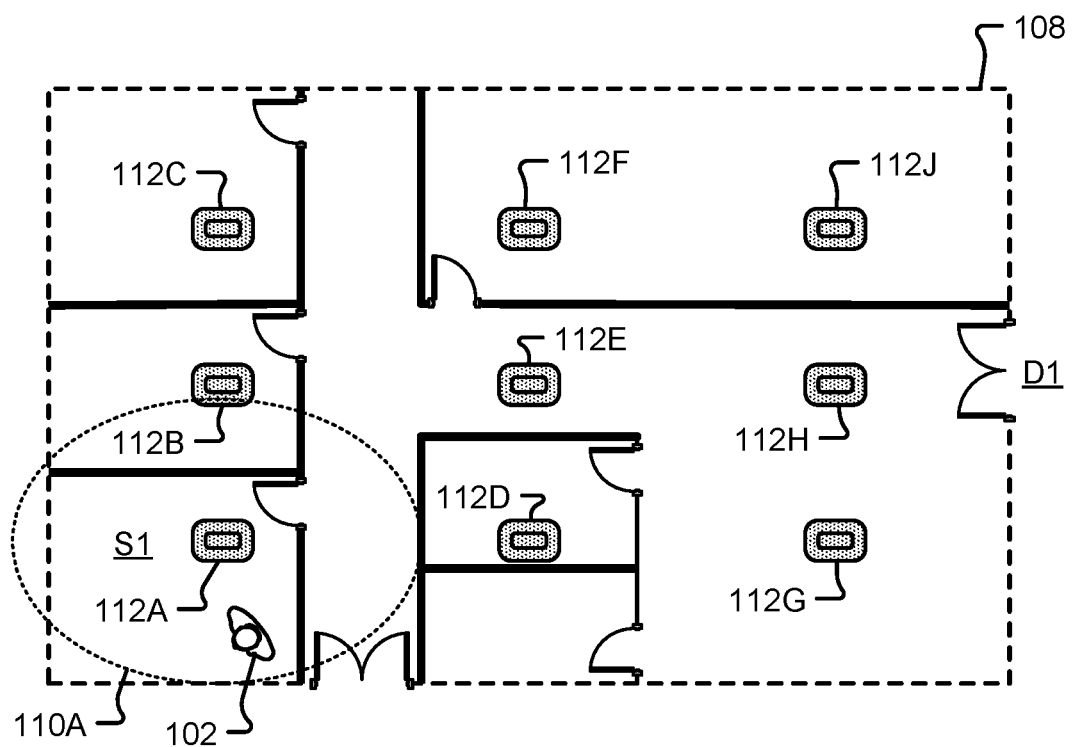
FIG. 10C is a schematic diagram depicting a location of the user in the enterprise facility after moving along the movement path shown in FIG. 10B in accordance with embodiments of the present disclosure.

FIGS. 10A-10C show various schematic plan views of an example enterprise facility 108 comprising a plurality of distributed communication controllers 112A-112J distributed and/or arranged in various fixed locations in the enterprise facility 108. The enterprise facility 108 is shown to include a number of different spaces, S1-S7, H1, H2, that may be serviced by one or more of the distributed communication controllers 112A-112J. For example, the first space, S1, is serviced by the first distributed communication controller 112A having the first communication range 110A, the second space, S2, is serviced by the second distributed communication controller 112B having the second communication range 110B, the third space, S3, is serviced by the third distributed communication controller 112C having the third communication range 110C, the fourth and fifth spaces, S4, S5, are serviced by the fourth distributed communication controller 112D having the fourth communication range 110D, the sixth space, S6, is serviced by both the sixth distributed communication controller 112F and the ninth distributed communication controller 112J having the sixth communication range 110F and the ninth communication range 110J, respectively, and the seventh space, S7, is serviced by the seventh distributed communication controller 112G having the seventh communication range 110G.

As illustrated in FIG. 10A, the area along the first hallway, H1 (e.g., running vertically from the illustrated bottom doors to the upper limit of the enterprise facility 108 shown in plan view) may be serviced by one or more of the distributed communication controllers 112A-112F. The area along the second hallway, H2 (e.g., running horizontally from the illustrated entrance doorway, D1, doors to the first hallway, H1, shown in plan view) may be serviced by one or more of the distributed communication controllers 112H, 112E. Each of the distributed communication controllers 112A-112J shown in FIG. 10A comprises a respective communication range 110A-110J. Further, adjacent pairs or sets of distributed communication controllers 112A-112J may have overlapping regions between their respective communication ranges 110A-110J. These overlapping regions may correspond to handoff zones 916 as described in conjunction with FIG. 9. Among other things, the overlapping, or handoff zones 916, allow communications (e.g., enterprise communication services, messaging, etc.) between distributed communication controllers 112A-112J and a communication device 116 (e.g., wearable device 304, etc.) to remain uninterrupted while the communication device 116 moves moving throughout the enterprise facility 108.

Referring to FIG. 10B, a schematic diagram depicting a movement path 1004 of a user 102 in the in the enterprise facility 108 is shown in accordance with embodiments of the present disclosure. In FIG. 10B, a user 102 has entered the enterprise facility 108 (e.g., via the entrance doorway, D1) and is about to travel to the first space, S1, of the enterprise facility 108. As the user 102 moves along the movement path 1004, the user 102 and, more specifically, at least one communication device 116 (not shown for sake of clarity) of the user 102, will move from the eighth communication range 110H provided by the eighth distributed communication controller 112H, to the fifth communication range 110E provided by the fifth distributed communication controller 112E, and then into the first communication range 110A provided by the first distributed communication controller 112A. In the event that the user 102 is being provided services via the distributed communication controllers 112 of the enterprise facility 108, these services would remain uninterrupted to the communication device 116 of the user as the user 102 moves along the movement path 1004 from one distributed communication controller 112 to another. By way of example, the user 102 may be provided with enterprise communication services via the eighth distributed communication controller 112H, communicating with a wearable device 304 of the user 102 as the user 102 enters the enterprise facility 108. Continuing this example, when the user 102 moves along the movement path 1004 in the second hallway, H2, toward the first hallway, H1, the wearable device 304 may enter the fifth communication range 110E of the fifth distributed communication controller 112E. The enterprise communication services provided by the eighth distributed communication controller 112H are then transferred to being provided by the fifth distributed communication controller 112E. When the user 102 moves into the first hallway, H1, to an area outside of the first space, S1, the wearable device 304 may enter the first communication range 110A of the first distributed communication controller 112A. The enterprise communication services now provided by the fifth distributed communication controller 112E are then transferred to being provided by the first distributed communication controller 112A.

In some embodiments, the movement path 1004 may be determined based on a current physical location of the user 102 and/or the wearable device 304 of the user 102. The physical location may correspond to the physical location stored in the physical location field 728 of the device information data structure 700 and/or the physical location field 828 of the user information data structure 800. In any event, the wearable device 304 may provide this physical location to one or more of the distributed communication controllers 112A-112J in the enterprise facility 108 that are in proximity to the wearable device 304. In one embodiment, the movement path 1004 may be predicted for a user 102 based on historical physical locations of the user 102, and/or historical movement paths tracked or recorded over time. For instance, the user 102 may, upon entering the entrance doorway, D1, of the enterprise facility 108, travel down the second hallway, H2, in a direction toward the first hallway, H1, and then to the first space, S1. This behavior may be associated with a particular day, month, year, season, and/or time of day, etc. Upon determining the user 102 is traveling along a predicted movement path 1004, the eighth distributed communication controller 112H may communicate with the fifth distributed communication controller 112E in advance of the wearable device 304 of the user 102 and/or the user 102 reaching the fifth communication range 110E to begin the transfer of responsibilities for the wearable device 304. Additionally or alternatively, the fifth distributed communication controller 112E may communicate with the first distributed communication controller 112A in advance of the wearable device 304 of the user 102 and/or the user 102 reaching the fifth communication range 110E or the first communication range 110A to begin or plan for the transfer of responsibilities for the wearable device 304.

FIG. 10C shows a schematic diagram depicting a physical location of the user 120 in the enterprise facility 108 after the user 102 has moved long the movement path 1004 shown in FIG. 10B. In particular, the user 102 in FIG. 10B is located in the first space, S1, and is in the first communication range 110A of the first distributed communication controller 112A of the enterprise facility 108. While the user 102 remains in the first communication range 110A, the first distributed communication controller 112A may provide services to one or more of the communication devices 116 (e.g., wearable devices 304, etc.) as described herein.

Figure 11:
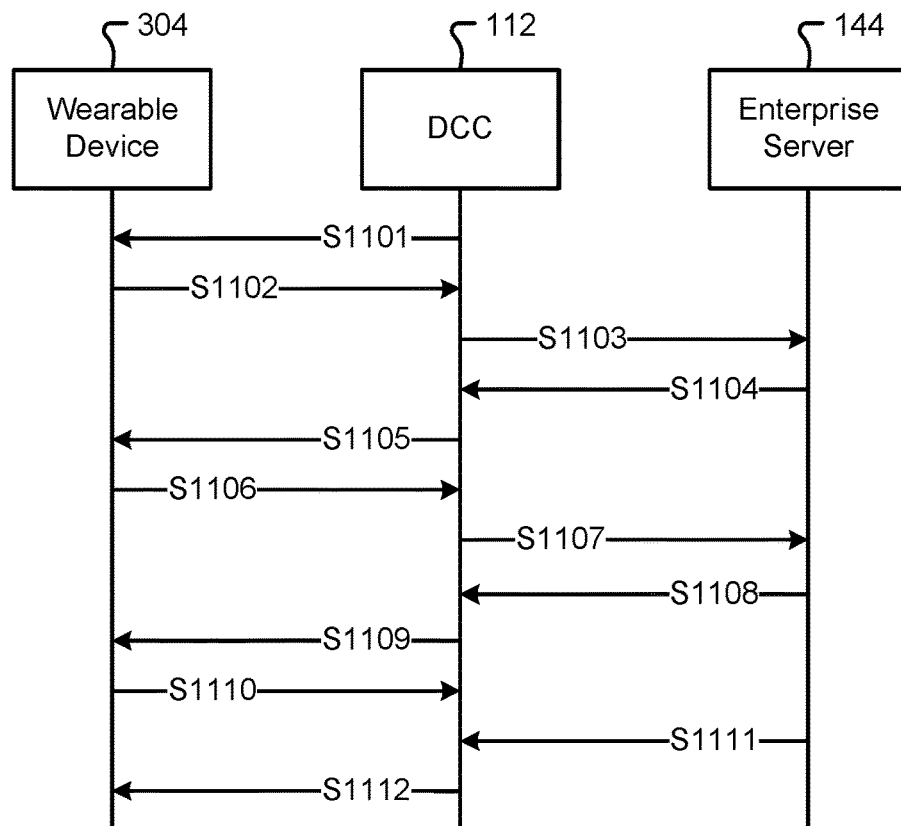
FIG. 11 is a diagram depicting a set of communication flows for interacting with a device of a user in proximity to a distributed communication controller in accordance with at least some embodiments of the present disclosure.

With reference now to FIG. 11, a set of communication flows for interacting with a wearable device 304 (or any communication device 116) of a user 102 in proximity to a distributed communication controller 112 will be described in accordance with at least some embodiments of the present disclosure. In some embodiments, the communication flows of FIG. 11 may correspond to communications in providing enterprise communication services to the wearable device 304 of the user 102 (e.g., via a distributed communication controller 112 that is in proximity to the wearable device 304). The communication flows begin when a distributed communication controller 112 sends a message to the wearable device 304 requesting user information for an associated user 102 (step S1101). In response, the wearable device 304 may send the user information comprising information from one or more of the device information data structure 700 and/or user information data structure 800 to the distributed communication controller 112 (step S1102). When the user information is received by the distributed communication controller 112, the distributed communication controller 112 may communicate with the enterprise server 144 via sending an enterprise services message across the communication network 104 to, among other things, determine whether enterprise communication services are available for the user 102 (step S1103). The enterprise server 144 may reply by sending a message to the distributed communication controller 112 regarding whether enterprise communication services are available for the user 102 (step S1104).

When enterprise communication services exist, or are otherwise available, for the user 102 of the wearable device 304, the distributed communication controller 112 may send an enterprise services message to the wearable device 304 for confirmation (step S1105). This enterprise services message may be sent as a conversational message, or audio output, that is caused to play via one or more of the speaker(s) 444 of the wearable device 304. The enterprise services message may indicate to the user 102, via a conversational output, that one or more enterprise communication services are available for the user 102.

The user 102 may provide a confirmation message that indicates that the user 102 wishes the distributed communication controller 112 to provide the enterprise communication services to the wearable device 304. The confirmation message may be provided by the user 102 speaking, or providing voice commands, via one or more of the microphone(s) 452 of the wearable device 304. The confirmation message is then sent from the wearable device 304 to the distributed communication controller 112 in proximity to the wearable device 304 (step S1106).

On behalf of the wearable device 304, the distributed communication controller 112 may then send a user confirmation message to the enterprise server 144 (step S1107). This user confirmation message may comprise information from the confirmation message. In some embodiments, the user confirmation message may correspond to a converted message that indicates the user requested enterprise communication services. During the communication flows described in conjunction with FIG. 11, the wearable device 304 may be unable to directly communicate with the enterprise server 144 and the distributed communication controller 112 is responsible for the interactions and processing of communications with the enterprise server 144 (e.g., in lieu of the wearable device 304). In one embodiment, the wearable device 304 may be incapable of running an application, browser, client, and/or otherwise perform the processing that is completely handled by the distributed communication controller 112.

The enterprise server 144 may, after receiving the user confirmation message from the distributed communication controller 112, send a message to the distributed communication controller 112 comprising authentication information required for the enterprise communication services to be provided to the user 102 (step S1108). In some embodiments, this message may include a public key, a portion of authentication credentials, and/or some other information the distributed communication controller 112 may use in authorizing the user 102 and the wearable device 304 to receive the enterprise communication services. In response, the user 102 may provide authentication credentials via the wearable device 304. In one embodiment, the authentication credentials may comprise a spoken code, a personal identification number ("PIN"), a portion of a private or public key, and/or some other form of authorization, that is provided via the wearable device 304. Similar to the confirmation message provided by the user 102, the authentication credentials may be provided by speaking in a detection range of one or more of the microphone(s) 452 of the wearable device 304. This authentication message is then sent from the wearable device 304 to the distributed communication controller 112 in proximity to the wearable device 304 (step S1110). In some embodiments, the distributed communication controller 112 may determine whether the authentication credentials match authentication information previously received from the enterprise server 144 validating the user 102 to receive enterprise communication services. In one embodiment, the distributed communication controller 112 may send the authentication credentials to the enterprise server 144 for validation. In any event, once the user is validated, the enterprise server 144 may provide enterprise communication services to the distributed communication controller 112 (step S1111) and the enterprise communication services are provided by the distributed communication controller 112 in proximity to the wearable device 304 (step S1112).

Figure 12:
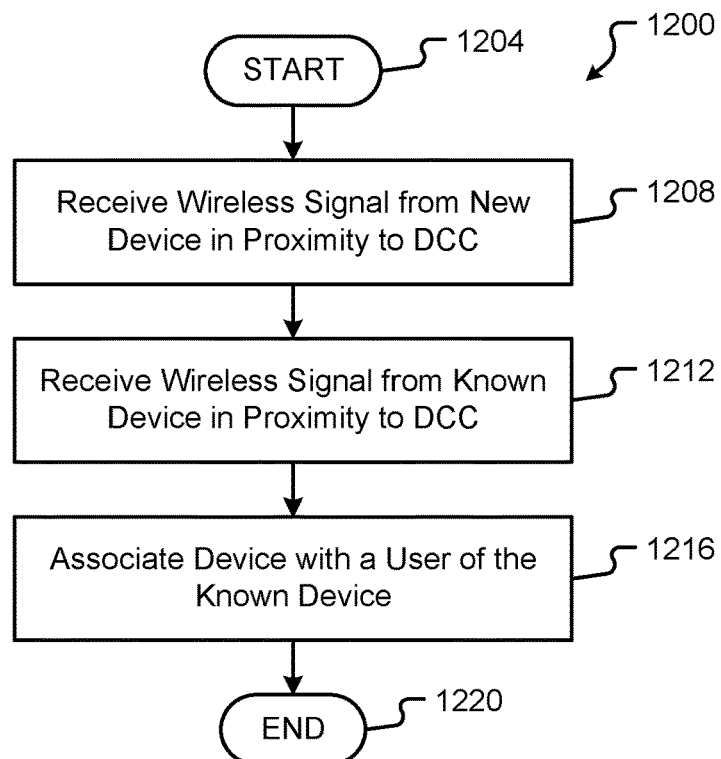
FIG. 12 is a flow diagram depicting a method of detecting and associating a device with a user in accordance with at least some embodiments of the present disclosure.

FIG. 12 is a flow diagram depicting a method 1200 of detecting and associating a communication device 116 (e.g., wearable device 304, etc.) with a user 102 in accordance with at least some embodiments of the present disclosure. The method 1200 can be executed as a set of computer-executable instructions (e.g., communication instructions 244, etc.) executed by a computer system (e.g., distributed communication controller 112, etc.) and encoded or stored on a computer-readable medium (e.g., memory 208, etc.). Hereinafter, the method 1200 shall be explained with reference to the systems, components, modules, applications, software, data structures, communications, etc. described in conjunction with FIGS. 1-11.

The method 1200 begins at step 1204 and proceeds by receiving a first wireless signal from an unknown communication device 116 by a distributed communication controller 112 in proximity to the communication device 116 (step 1208). In some embodiments, the first wireless signal received from the unknown communication device 116 may correspond to advertising packets broadcast by the unknown communication device 116. In one embodiment, the advertising packets may be sent via Bluetooth™ protocol and may comprise information that, among other things, identifies the unknown communication device 116 from others in the enterprise communication system 100. Upon receiving the first wireless signal, the distributed communication controller 112 may determine that no records of the identified, but unknown, communication device 116 exist with the distributed communication controller 112 and/or the enterprise communication system 100. Next, the distributed communication controller 112 may receive a second wireless signal from another, different, known communication device 116 that is in proximity to distributed communication controller 112 (step 1212). In some embodiments, the first wireless signal from the unknown communication device 116 may be received by the distributed communication controller 112 at substantially the same time as the second wireless signal from the other known communication device 116 is received by the distributed communication controller 112. In this instance, the term "at substantially the same time" may correspond to an amount of time that is within a predetermined range or value. The predetermined range may be 0.001 seconds to 5.0 seconds, 0.001 seconds to 1.0 second, 0.001 seconds to 0.500 seconds, 0.001 to 0.300 seconds, and/or any range therebetween. Next, and based on at least one of the first wireless signal being received at substantially the same time as the second wireless signal and a location of the unknown communication device 116 and the known communication device 116, the method 1200 may proceed by associating the unknown communication device 116 with a user 102 of the known communication device 116 (step 1216). In some embodiments, this association may be determined automatically and without human input. Stated another way, the user 102 may not need to register the unknown communication device 116 with the distributed communication controller 112 because, based on the location and/or signaling information, the distributed communication controller 112 can automatically determine that the unknown communication device 116 must be with, or worn by, the user 102 of the known communication device 116. In some embodiments, the distributed communication controller 112 may update the user association field 716 of the device information data structure 700 and/or the associated devices field 820 of the user information data structure 800 stored in memory. The method 1200 ends at step 1220.

Figure 13:
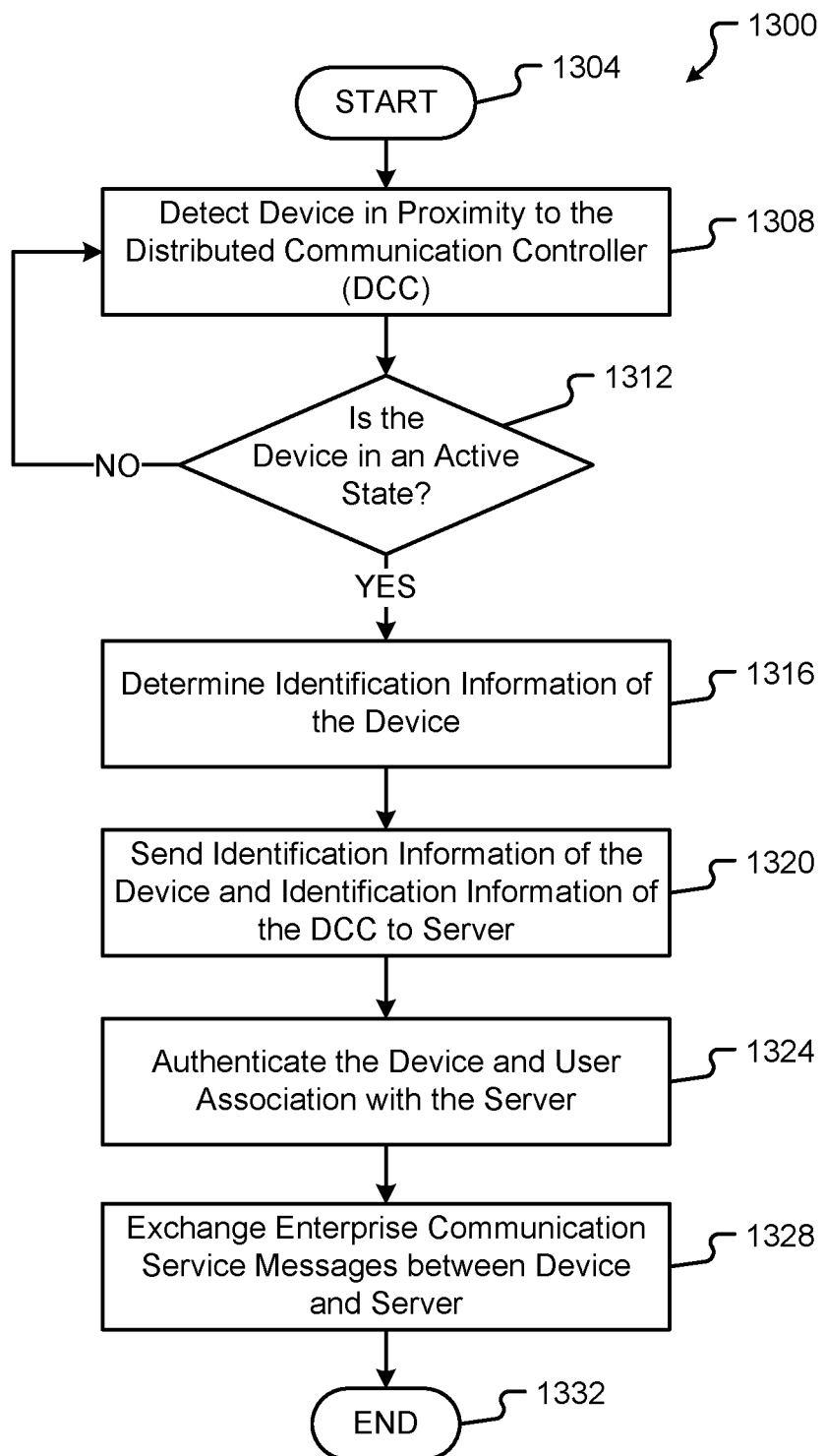
FIG. 13 is a flow diagram depicting a method of communicating with a device of a user detected in proximity to a distributed communication controller in accordance with at least some embodiments of the present disclosure.

FIG. 13 is a flow diagram depicting a method 1300 of communicating with a communication device 116 (e.g., wearable device 304) of a user 102 detected in proximity to a distributed communication controller 112 in accordance with at least some embodiments of the present disclosure. The method 1300 can be executed as a set of computer-executable instructions (e.g., communication instructions 244, etc.) executed by a computer system (e.g., distributed communication controller 112, etc.) and encoded or stored on a computer-readable medium (e.g., memory 208, etc.). Hereinafter, the method 1300 shall be explained with reference to the systems, components, modules, applications, software, data structures, communications, methods, etc. described in conjunction with FIGS. 1-12.

The method 1300 begins at step 1304 and proceeds by detecting a communication device 116 in proximity to the distributed communication controller 112 (step 1308). In some embodiments, the distributed communication controller 112 may detect the communication device 116 based on a wireless message sent from the communication device 116. The wireless message may correspond to advertising packets that are broadcast by the communication device 116 (e.g., via Bluetooth™ protocol, Wi-Fi, etc.). The advertising packets may comprise information that identifies the communication device 116. In some embodiments, the wireless message may be sent as a response to a query message sent by the distributed communication controller 112. One such query message may correspond to a ping message sent from the distributed communication controller 112 to determine communication devices 116 that are in proximity to the distributed communication controller 112.

Next, the method 1300 may continue by determining whether the communication device 116 is in an active or inactive state (step 1312). When the communication device 116 is a wearable device 304, the active state may correspond to when the device is powered on and being worn by the user 102. This information may be determined by the distributed communication controller 112 retrieving, or requesting, information from one or more sensor(s) 412 of the wearable device 304. For instance, in the case of where the wearable device 304 is a set of wireless headphones, the wearable device 304 may comprise sensors 412 to determine whether the wireless headphones are fitted in or to at least one ear of the user 102. These sensors 412 may be optical sensors, infrared sensors, and/or some other proximity or contact sensors. In some embodiments, where the communication device 116 is a communication device 308, the active state may correspond to when the device is powered on and being carried by the user 102.

In any event, when the communication device 116 is determined to be in an active state, the method 1300 may proceed by determining identification information of the communication device 116 (step 1316). The identification information may correspond to the device identification stored in the device identification field 704 of the device information data structure 700 described in conjunction with FIG. 7. In some embodiments, this identification information may be received as part of the wireless message received from the communication device 116 in step 1308.

The method 1300 continues by the distributed communication controller 112 sending the identification information of the communication device 116 along with an identification of the distributed communication controller 112 to the enterprise server 144 (step 1320). The identification of the distributed communication controller 112 may correspond to a unique identifier that may be used by the enterprise server 144 to determine a location and/or an identity of the distributed communication controller 112 in the enterprise facility 108. Additionally or alternatively, the identification of the distributed communication controller 112 may comprise location information for the distributed communication controller 112. The location information may correspond to a location in the enterprise facility 108, geographical coordinates, a room number, a floor number, a GPS location, a direction from a known location, and/or other location-related information. Together, the identification information of the communication device 116 and the distributed communication controller 112 may indicate at least one of a location of the user 102 of the communication device 116, a location of the communication device 116 relative to the distributed communication controller 112, an identity of the user 102 associated with the communication device 116, an identity of the communication device 116, and the like.

Once the identification information has been received, the distributed communication controller 112 may proceed to authenticate the communication device 116 and the associated user 102 with the enterprise server 144 (step 1324). In some embodiments, the user 102 of the communication device 116 may provide authentication credentials (e.g., in the form of a PIN, code, etc.) via at least one input device of the communication device 116. These authentication credentials may be provided in the form described in conjunction with the set of communication flows of FIG. 11. In one embodiment, the authentication may correspond to a first level of authentication that determines whether and enterprise communication services are available for the user 102 (e.g., determining whether the user 102 is registered with an enterprise communication system 100, the enterprise server 144, etc.). The method 1300 proceeds when the user 102 and the communication device 116 has been authorized by the distributed communication controller 112 and/or the enterprise server 144, by exchanging enterprise communication service messages between the communication device 116 and the enterprise server 144 (step 1328). These enterprise communication service messages may correspond to input provided at the communication device 116 that requests enterprise communication services from the distributed communication controller 112 and the distributed communication controller 112 communicating with the enterprise server 144 to provide the enterprise communication services requested. Rather than receive enterprise communication services directly from the enterprise server 144, the communication device 116 receives the enterprise communication services as provided by the distributed communication controller 112. In this manner, the communication device 116 is not required to execute any application directed to enterprise communications and the processing, or execution, of applications is handled by the distributed communication controllers 112 in the enterprise facility 108. At least one benefit to this method includes the ability to conserve battery power of the communication device 116, utilize communication devices 116 without the capability of running programs or clients, and increase availability of communications and services offered to users 102 in an enterprise facility 108. Even when the communication device 116 is a simple wearable device (e.g., wireless headphones, wireless headset, etc.), the method 1300 allows the distributed communication controllers 112 to handle all of the processing required to enable communications with, present information to, receive input from, and/or the like for the communication device 116. The method 1300 ends at step 1332.

Figure 14:
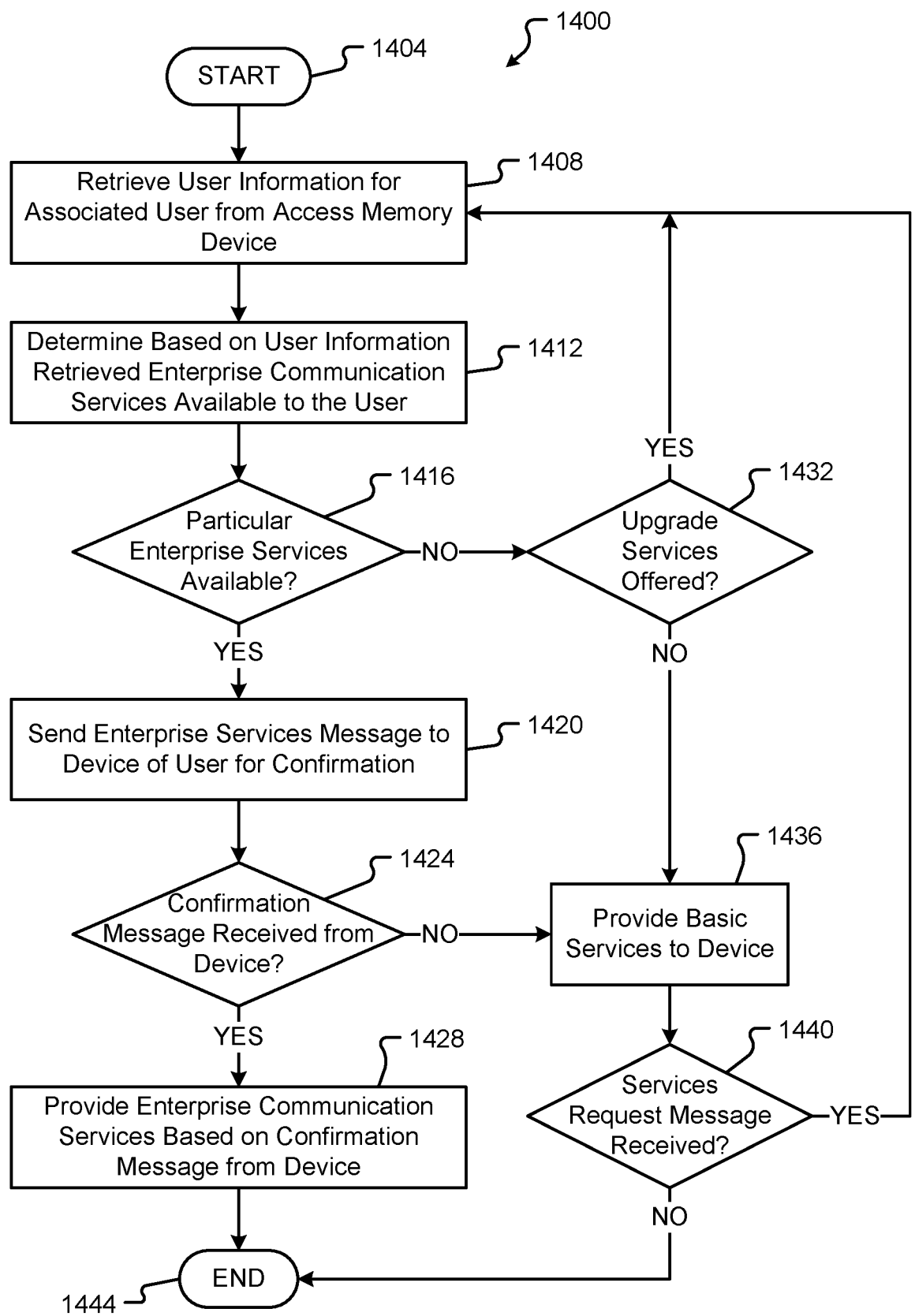
FIG. 14 is a flow diagram depicting a method of providing enterprise communication services to a device of a user in accordance with at least some embodiments of the present disclosure.

FIG. 14 is a flow diagram depicting a method 1400 of providing enterprise communication services to a communication device 116 (e.g., wearable device 304, etc.) of a user 102 in accordance with at least some embodiments of the present disclosure. The method 1400 can be executed as a set of computer-executable instructions (e.g., communication instructions 244, etc.) executed by a computer system (e.g., distributed communication controller 112, etc.) and encoded or stored on a computer-readable medium (e.g., memory 208, etc.). Hereinafter, the method 1400 shall be explained with reference to the systems, components, modules, applications, software, data structures, communications, methods, etc. described in conjunction with FIGS. 1-13.

The method 1400 begins at step 1404 and proceeds by retrieving, from memory, user information for a user 102 associated with a communication device 116 (step 1408). In some embodiments, after a communication device 116 has been detected by a distributed communication controller 112, the distributed communication controller 112 may retrieve user information for an associated user 102 based on identification information of the communication device 116. For example, a wearable device 304 may provide this type of identification information when sending advertising packets, or signals, either directly or broadcast to one or more of the distributed communication controller 112 in proximity to the wearable device 304. Using the identification information of the communication device 116, the distributed communication controller 112 may access the user information database 142 and/or the registration information 136, and/or some other memory that maintains a list, database, or other organized arrangement of data that links the identification information of the communication device 116 to user information for an associated user 102 of the communication device 116. In some embodiments, this information may be maintained in one or more data structures 700, 800. The information may be stored on a computer-readable memory of the communication device 116 or in some other memory of the enterprise communication system 100. In one embodiment, the user information may correspond to an identity of the user 102 stored in the user identification field 804 of the user information data structure 800.

Next, the method 1400 may proceed by the distributed communication controller 112 determining, based on the user information retrieved, enterprise communication services that are available to the user 102 (step 1412). This determination may be made by accessing one or more of the data structures 700, 800 described above and/or by exchanging messages between the distributed communication controller 112 and an enterprise server 144 as described above.

The method 1400 may then determine whether particular enterprise services are available (step 1416). The particular enterprise services may include a number of enterprise communication services that are determined to be available above a basic level. These enterprise communication services that are above a basic level may only be available to a certain user 102 (e.g., registered user 102, known user 102, and/or authorized user 102, etc.) or in a certain enterprise facility 108. In some embodiments, basic level enterprise communication services may include basic calling functionality but may not include enterprise communication services such as voicemail, call logging, and the like. If, however, the particular enterprise services are determined not to be available, the method 1400 may proceed to step 1432, where the user 102 may be offered an opportunity to upgrade the enterprise communication services available to the user 102. If the services are upgraded, the method 1400 may return to step 1408. However, if the services are not upgraded, the method 1400 proceeds to step 1436.

In response to determining that the particular enterprise services are available, the method 1400 may proceed by sending an enterprise services message to the communication device 116 (step 1420). The enterprise services message may comprise information about the enterprise communication services that are available indicate to the user 102 of the communication device 116. The enterprise services message may be caused to play as an audio output to one or more speakers of the communication device 116. The user 102 may confirm and/or request authorization for the enterprise communication services to be provided by the distributed communication controller 112 to the communication device 116. If confirmed, the user 102 sends a confirmation message from the communication device 116. The confirmation message may be provided in the form of a voice command, spoken output from the user 102, and/or some input provided at the communication device 116.

The method 1400 proceeds by the distributed communication controller 112 determining whether a confirmation message is received from the communication device 116 (step 1424). If the confirmation is received, the method 1400 proceeds by the distributed communication controller 112 providing the particular enterprise communication services based on information in the confirmation message received (step 1428). For example, the confirmation message provided by the user 102 may indicate that the user 102 wishes to have audio calling and call logging enabled for communications. In this example, the distributed communication controller 112 provides the audio calling and call logging for the communication device 116 while the communication device 116 moves about the enterprise facility 108 (e.g., at least in a communication range of the distributed communication controller 112). If a confirmation message is not received at step 1424, the method 1400 may proceed to step 1436 where the distributed communication controller 112 may provide basic enterprise communication services to the communication device 116. While the basic services are provided, the distributed communication controller 112 may determine whether a request message is received from the communication device 116 to enable or invoke enterprise communication services (step 1440). If so, the method 1400 returns to step 1440. The method 1400 may end at step 1444.

Figure 15:
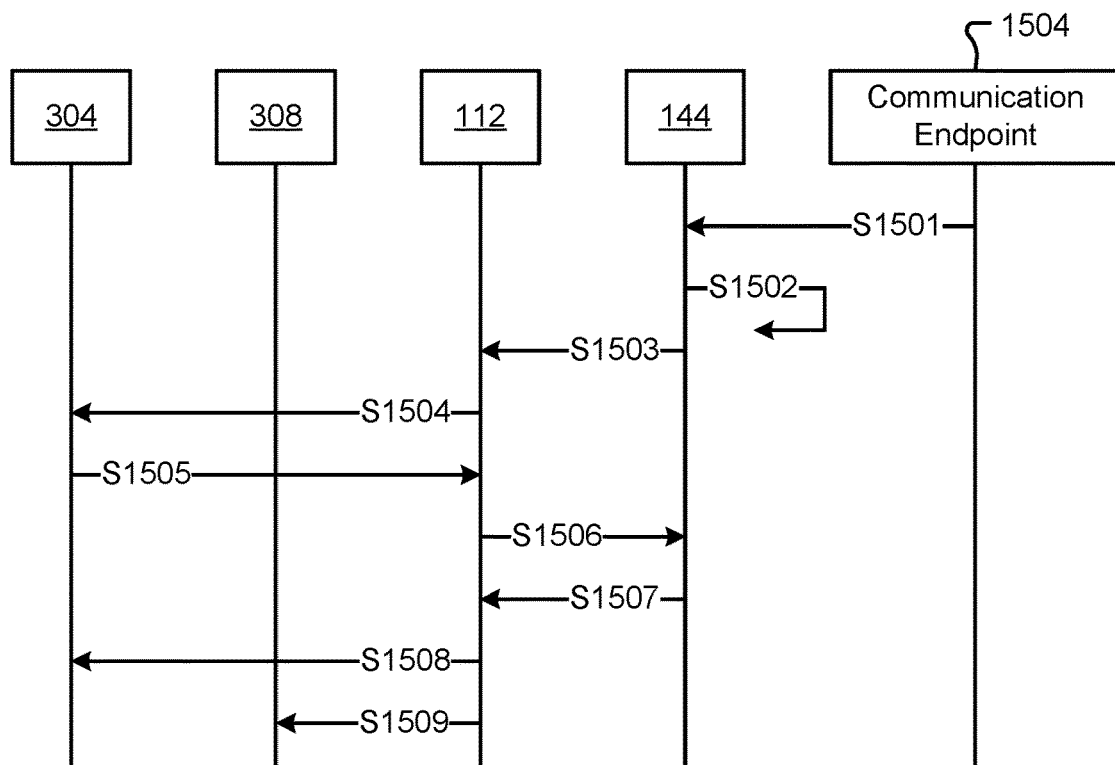
FIG. 15 is a diagram depicting a set of communication flows for providing an incoming call to a device in the communication system in accordance with at least some embodiments of the present disclosure.

Referring now to FIG. 15, a set of communication flows for providing an incoming call to a communication device 116 in the enterprise communication system 100 in accordance with at least some embodiments of the present disclosure. The set of communication flows described in conjunction with FIG. 15 may correspond to communications in routing content from calls to one or more communication devices 116. For example, the distributed communication controller 112 may split call content into audio content (e.g., audio signals and output) and video content (e.g., streaming video signals output, etc.) and provide the audio content to a wearable device 304 of a user 102 (e.g., where the wearable device 304 is in proximity to a distributed communication controller 112). In some embodiments, the video content may be provided by the distributed communication controller 112 to a communication device 308, or display device 312, etc. (e.g., where the communication device 308 is in proximity to the distributed communication controller 112).

The communication flows begin when a communication endpoint 1504 initiates a call to an enterprise server 144. In some embodiments, the enterprise server 144 may correspond to a communications server and/or vice versa. (step S1501). For instance, the enterprise server 144 may comprise an Electronic Private Automatic Branch Exchange ("EPABX"), an enterprise IP electronic PBX ("IP-EPBX"), a Computer Telephony Interface ("CTI") server, and/or the like. The communication endpoint 1504 may correspond to a communication device such as a computer, telephone, hardware-based IP-phone, softphone, smartphone, tablet, and/or any other mechanical and/or electronic device that is capable of initiating a call on at least one communication network 104.

Upon receiving the incoming call, or call signal, from the communication endpoint 1504, the enterprise server 144 may determine an extension of a user 102 for the incoming call (step S1502). Information about the extension of the user 102 may be included in the incoming call. In this case, the enterprise server 144 may refer to the information in determining the extension of the user 102 from the call signal comprising the incoming call. In some embodiments, the enterprise server 144 may refer to the user information database 142 in determining a user 102 associated with the extension. In any event, the enterprise server 144 may determine one or more communication devices 116 that are associated with the user 102, communication preferences, and/or the like. This determination may be based on information stored in the device information data structure 700 and/or the user information data structure 800, as described above.

In some embodiments, step S1502 may include the enterprise server 144 determining, based on the extension of the user 102, a location of the user 102 in the enterprise facility 108. More specifically, the enterprise server 144 may determine a location of one or more communication devices 116 associated with the user 102 in the enterprise facility 108. While a user 102 may have multiple communication devices 116, the enterprise server 144 may determine the location of the user 102 as corresponding to the location where one or more of the communication devices 116 are moving and/or are in an active state in the enterprise facility 108. In some embodiments, the communication device 116 of the user 102 may communicate with one or more distributed communication controllers 112 in the enterprise facility 108 to report a presence in a particular location relative to a particular distributed communication controller 112 in the enterprise facility 108. This communication may include the communication devices 116 sending advertising packets or other signals that can be received via at least one listening distributed communication controller 112 that is in physical proximity to the communication devices 116. The position, or location, of the communication devices 116 in the enterprise facility 108 may be reported by the distributed communication controller 112 to the enterprise server 144 and/or stored in the user information database 142 or other memory.

Next, the enterprise server 144 may send, or forward, the incoming call to the distributed communication controller 112 that is determined to be in proximity to the location of the user 102 in the enterprise facility 108 (step S1503). In some embodiments, the incoming call may be transferred to the distributed communication controller 112 for further processing and/or handling. In one embodiment, after transferring the incoming call to the distributed communication controller 112 in proximity to the user 102, the enterprise server 144 may no longer process or be included in the handling of the incoming call.

Upon receiving the incoming call, the distributed communication controller 112 in proximity to the user 102 and the communication devices 116 associated with the user 102, may send a call notification message to a wearable device 304 that is associated with the user 102 and that is in physical proximity to the distributed communication controller 112 (step S1504). The call notification message may comprise an auditory signal that is caused to play through one or more speaker(s) 444 of the wearable device 304. The auditory signal may be played as a ringing tone, a conversational audio output, and/or combinations thereof. For instance, the conversational audio output may state "incoming call for extension ABC," and may even prompt the user 102 with an option to accept, ignore, or deny the incoming call.

The user 102 may accept the call by providing a call acceptance input at the wearable device 304, which is then sent by the wearable device 304 to the distributed communication controller 112 (step S1505). The call acceptance input may correspond to at least one of a push button signal provided via one or more of the input device(s) 428 and/or sensor(s) 412 of the wearable device 304. In some embodiments, the call acceptance input may correspond to a spoken output of the user 102 recorded by one or more of the microphone(s) 452 of the wearable device 304.

In response to receiving the call acceptance input from the wearable device 304 (in whatever form the input has been provided), the distributed communication controller 112 may send a message to the enterprise server 144 indicating that the call has been accepted by the user 102 (step S1506). In some embodiments, this message may optionally request that the enterprise server 144 transfer responsibility for handling the incoming call to the distributed communication controller 112 (if not already transferred to the distributed communication controller 112). In one embodiment, the message may be sent to the enterprise server 144 allowing the enterprise server 144 to update records associated with the processing of the incoming call. The enterprise server 144 may respond with an acknowledgment message indicating that the message from the distributed communication controller 112 has been received (step S1507). If the incoming call was not already transferred to the distributed communication controller 112, the enterprise server 144 may, as part of the acknowledgment message, transfer responsibility for handling the incoming call to the distributed communication controller 112.

In some embodiments, the distributed communication controller 112 may determine that the incoming call comprises audio content and video content. In this instance, the distributed communication controller 112 may determine to split the incoming call into audio content and video content. The distributed communication controller 112 may then send the audio content of the incoming call over a first communications connection established between the distributed communication controller 112 and the wearable device 304 (step S1508). If the wearable device 304 is unable to receive the video content (e.g., where the wearable device 304 is a set of wireless headphones, a headset, etc.), the distributed communication controller 112 may select a different communication device 116 associated with the user 102 to receive the video content of the incoming call. The distributed communication controller 112 may send the video content to the selected different communication device 116, or alternative device, which may correspond to a communication device 308, etc. (step S1509). The video content may be sent by the distributed communication controller 112 over a second communications connection while the audio content is being sent to the wearable device 304 over the first communications connection. In some embodiments, steps S1508 and S1509 may be performed simultaneously, or at substantially the same time. The term "at substantially the same time," as used above, may correspond to an amount of time that occurs in a predetermined range or value while the incoming call is in progress.

Figure 16:
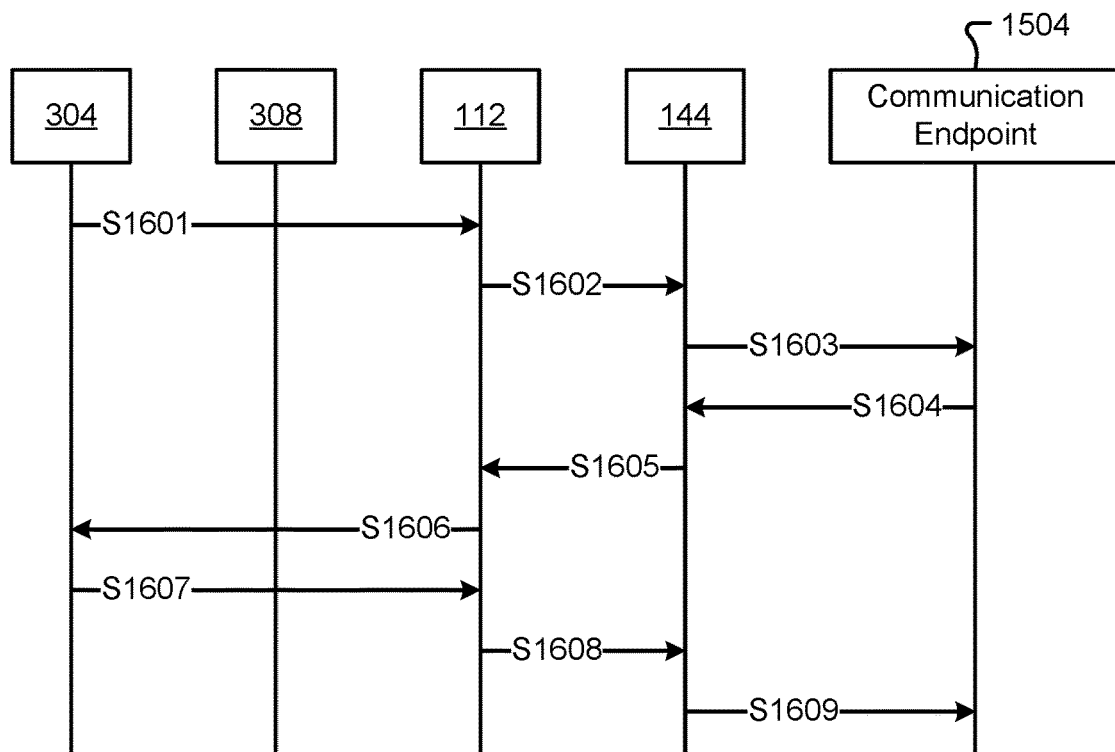
FIG. 16 is a diagram depicting a set of communication flows for enabling an outgoing call from a device in the communication system in accordance with at least some embodiments of the present disclosure.

FIG. 16 is a diagram depicting a set of communication flows for enabling an outgoing call from a communication device 116 (e.g., from a wearable device 304, etc.) in the enterprise communication system 100 in accordance with at least some embodiments of the present disclosure. The set of communication flows described in conjunction with FIG. 16 may correspond to enabling communications through distributed communication controllers 112 that are initiated by wearable devices 304 associated with users 102 in an enterprise facility 108.

The communication flows begin when a wearable device 304 in the enterprise facility 108 initiates an outgoing call with a distributed communication controller 112 (step S1601). In some embodiments, the user 102 of the wearable device 304 may initiation the outgoing call with a conversational, or spoken, output that is received by one or more of the speaker(s) 444 of the wearable device 304. In one embodiment, the call may be initiated by the user 102 providing a physical contact, touch, or other input at the wearable device 304. For instance, the sensor(s) 412 and/or the input device(s) 428 of the wearable device 304 may receive a physical button press, tap, touch, or other non-spoken input provided by the user 102 at the wearable device 304.

In some embodiments, the distributed communication controller 112 may send an outgoing call message to the enterprise server 144 to initiate and/or route the outgoing call with a communication endpoint 1504 (step S1602). As with the set of communication flows described in conjunction with FIG. 15, the communication endpoint 1504 may be internal to an enterprise or external to an enterprise. In some cases, where the communication endpoint 1504 is external to the enterprise, the enterprise server 144 may be required to handle at least a portion of the call processing described in the communication flows of FIGS. 15 and 16. In response to receiving the outgoing call message from the distributed communication controller 112, the enterprise server 144 may send the call to the communication endpoint 1504 (e.g., over a communication network 104, etc.) (step S1603). The communication endpoint 1504 may pick up, or accept, the call and the acceptance of the call is sent to the enterprise server 144 (step S1604).

The enterprise server 144 may route the call, or establish a communications connection between the communication endpoint 1504 and the distributed communication controller 112 that is in proximity to the wearable device 304 (step S1605). In response, the distributed communication controller 112 becomes responsible for sending content of the call to the wearable device 304 of the user 102 (step S1606) and receiving content (e.g., spoken words, etc.) recorded by the wearable device 304 (step S1607). The content received from the wearable device 304 may then be forwarded to the enterprise server 144 (step S1608) and the enterprise server 144 may send the content to the communication endpoint 1504 (step S1609).

Figure 17:
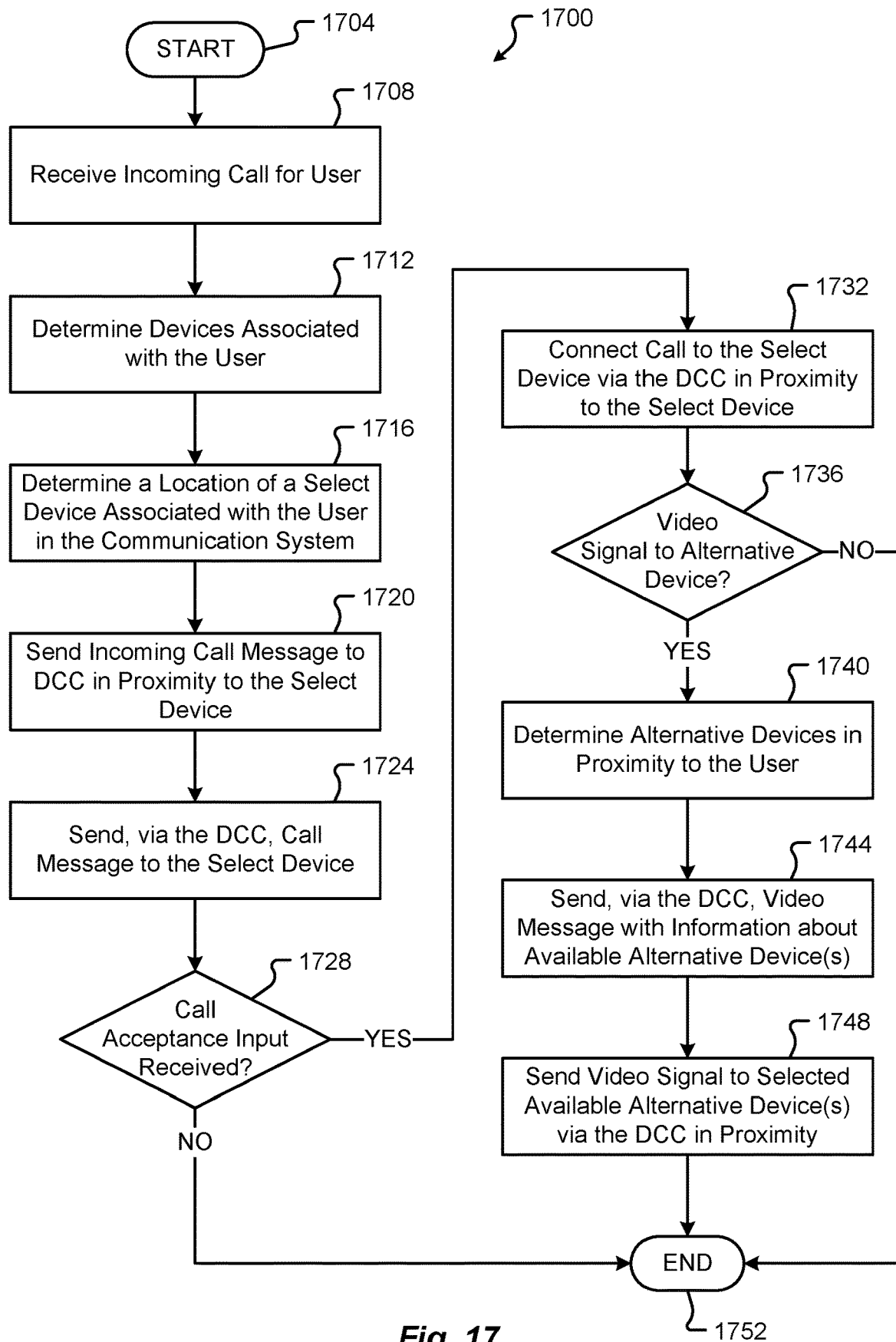
FIG. 17 is a flow diagram depicting a method of processing call content to a determined device of a user in the communication system in accordance with at least some embodiments of the present disclosure.

FIG. 17 is a flow diagram depicting a method 1700 of processing call content to a determined communication device 116 of a user 102 in the enterprise communication system 100 in accordance with at least some embodiments of the present disclosure. The method 1700 can be executed as a set of computer-executable instructions (e.g., communication instructions 132, 244, etc.) executed by a computer system (e.g., enterprise server 144, distributed communication controller 112, etc.) and encoded or stored on a computer-readable medium (e.g., memory 128, memory 208, etc.). Hereinafter, the method 1700 shall be explained with reference to the systems, components, modules, applications, software, data structures, communications, methods, etc. described in conjunction with FIGS. 1-16.

The method 1700 may comprise, and/or further describe, at least some of the communication flows provided in conjunction with FIG. 15 above. The method 1700 begins at step 1704 and proceeds when the enterprise server 144, or communications server, receives an incoming call for a user 102 in the enterprise facility 108 (step 1708). The incoming call may correspond to a communication signal sent from a computer, telephone, hardware-based IP-phone, softphone, smartphone, tablet, and/or any other mechanical and/or electronic device that is capable of initiating a call over a communication network 104.

Based at least partially on information in the incoming call, the enterprise server 144 may determine one or more communication device 116 that are associated with the user 102 for whom the incoming call is intended (step 1712). This determination may be based on the extension of the user 102, which may be included in the incoming call. The enterprise server 144 may then retrieve from one or more data structures 700, 800 information about the user 102. This information about the user 102 may include retrieving information about one or more communication devices 116 that are included in the associated devices field 820 of the user information data structure 800 for the user 102.

Next, the enterprise server 144 may determine a location of at least one of the communication devices 116 associated with the user 102 in the enterprise facility 108 and/or enterprise communication system 100 (step 1716). As provided above, the communication devices 116 of the user 102 may periodically, or continually, report a location inside the enterprise facility 108 to one or more distributed communication controller 112 that are in proximity to the communication devices 116 of the user 102. This reporting may include providing a presence in a particular location relative to a particular distributed communication controller 112 in the enterprise facility 108. The reporting may comprise the communication devices 116 sending advertising packets (e.g., via Bluetooth™, Wi-Fi, etc.) or other signals that can be received via at least one listening distributed communication controller 112 that is in physical proximity to the communication devices 116. The position, or location, of the communication devices 116 in the enterprise facility 108 may be reported by a distributed communication controller 112 in proximity to the reporting communication devices 116 to the enterprise server 144. Additionally or alternatively, this location information may be updated (e.g., periodically and/or continually) in the physical location field 728 of the device information data structure 700 and/or the physical location field 828 of the user information data structure 800 stored in the user information database 142 or other memory of the enterprise communication system 100.

Once a particular communication device 116 and location of the particular communication device 116 (corresponding to the location of the user 102 in the enterprise facility 108) is determined, the method 1700 may continue by sending an incoming call message to the distributed communication controller 112 that is in proximity to the particular communication device 116 (step 1720). In some embodiments, the incoming call may be transferred to this distributed communication controller 112 for further processing and/or handling. In one embodiment, after transferring the incoming call to the distributed communication controller 112 in proximity to the user 102 and particular communication device 116, the enterprise server 144 may no longer process or be included in the handling of the incoming call.

Next, the distributed communication controller 112 sends a call notification message to the particular communication device 116 (e.g., wearable device 304) that is associated with the user and is in physical proximity to the distributed communication controller 112 (step 1724). When the particular communication device 116 is a wearable device 304, the call notification message may comprise an auditory signal that is caused to play through one or more speaker(s) 444 of the wearable device 304. The auditory signal may be played as a ringing tone, a conversational audio output, and/or combinations thereof. For example, the conversational audio output may state "you have received an incoming call, please accept, ignore, or deny this call."

The method 1700 may determine whether a call acceptance input is received from the particular communication device 116 (e.g., the wearable device 304) (step 1728). Continuing the example above, when the particular communication device 116 is a wearable device 304, the call acceptance input may correspond to at least one of a push button signal provided via one or more of the input device(s) 428 and/or sensor(s) 412 of the wearable device 304. In some embodiments, the call acceptance input may correspond to a spoken output of the user 102 recorded by one or more of the microphone(s) 452 of the wearable device 304. If no call acceptance input is received in step 1728, the method 1700 may end at step 1752. In this instance, no content associated with the call is provided to the particular communication device 116 and the call is deemed to be "ignored." However, if the distributed communication controller 112 receives a call acceptance input from the communication device 116 of the user 102, the method 1700 may proceed to step 1732.

In step 1732, the distributed communication controller 112 may connect the call to the particular communication device 116 of the user 102. In some embodiments, the distributed communication controller 112 may send the audio content of the incoming call over a first communications connection established between the distributed communication controller 112 and the particular communication device 116 (e.g., wearable device 304) (step 1732).

The method 1700 may continue by determining whether to send video content associated with the call to an communication device 116 other than the particular communication device 116 receiving audio content of the call from the distributed communication controller 112 (step 1736). In some embodiments, the call may only include audio content. In this case, the method 1700 may end at step 1752. Additionally or alternatively, the particular communication device 116 may be incapable of receiving video content of the call. In step 1736, the distributed communication controller 112 may determine capabilities of the particular communication device 116 in making the determination as to whether the particular communication device 116 is capable of receiving video content. By way of example, the distributed communication controller 112 may access the hardware capabilities field 712 of the device information data structure 700 for the particular communication device 116. In the event that the hardware capabilities field 712 does not list any type of display hardware, the distributed communication controller 112 may determine that the communication device 116 is incapable of receiving the video content of the call.

In response to determining that the particular communication device 116 is incapable of receiving the video content, the method 1700 may proceed by the distributed communication controller 112 determining alternative devices that are capable of receiving the video content of the call (step 1740). In some embodiments, the distributed communication controller 112 may access the associated devices field 820 of the user information data structure 800 for the user 102 to determine the alternative devices that are capable of receiving and rendering video content of the call. Upon determining one or more alternative devices, the distributed communication controller 112 may then access the hardware capabilities field 712 of the device information data structure 700 for each of the one or more alternative devices to determine a suitable alternative communication device 116 that has video hardware (e.g., a display, screen, etc.). In some embodiments, the distributed communication controller 112 may determine that there are no communication devices 116 associated with the user 102 capable of receiving the video content. In this case, the distributed communication controller 112 may determine other communication devices 116 that are in proximity to the user 102 (e.g., based on the location of the particular communication device 116) and that are capable of receiving video content. In one embodiment, the other communication devices 116 may comprise a display device 312 such as a computer monitor, television, and/or the like.

In some embodiments, the method 1700 may continue by the distributed communication controller 112 sending a message to the particular communication device 116 comprising information about one or more alternative communication devices 116 that are capable of receiving the video content of the call (step 1744). The message may include a conversational output providing options of alternative communication devices 116 from which the user 102 may select (e.g., via an input provided at the particular communication device 116), instructing the user 102 to a location of the alternative communication device 116, and/or informing the user 102 that the particular communication device 116 is incapable of receiving the video content of the call and other options are available. In some embodiments, the user 102 may select an alternative communication device 116 and/or be assigned an alternative communication device 116 that is automatically selected by the distributed communication controller 112. The automatic selection may be made based on preferences associated with the user 102 (e.g., stored in the preferences field 824 of the user information data structure 800).

The method 1700 continues by the distributed communication controller 112 sending the video content to the selected alternative communication device 116 (step 1748). The video content may be sent by the distributed communication controller 112 over a second, different, communications connection to the selected alternative communication device 116 while the audio content is being sent to the particular communication device 116 over the first communications connection. The audio content and the video content may be sent by the distributed communication controller 112 simultaneously, or at the same time, while the call is in progress.

Figure 18:
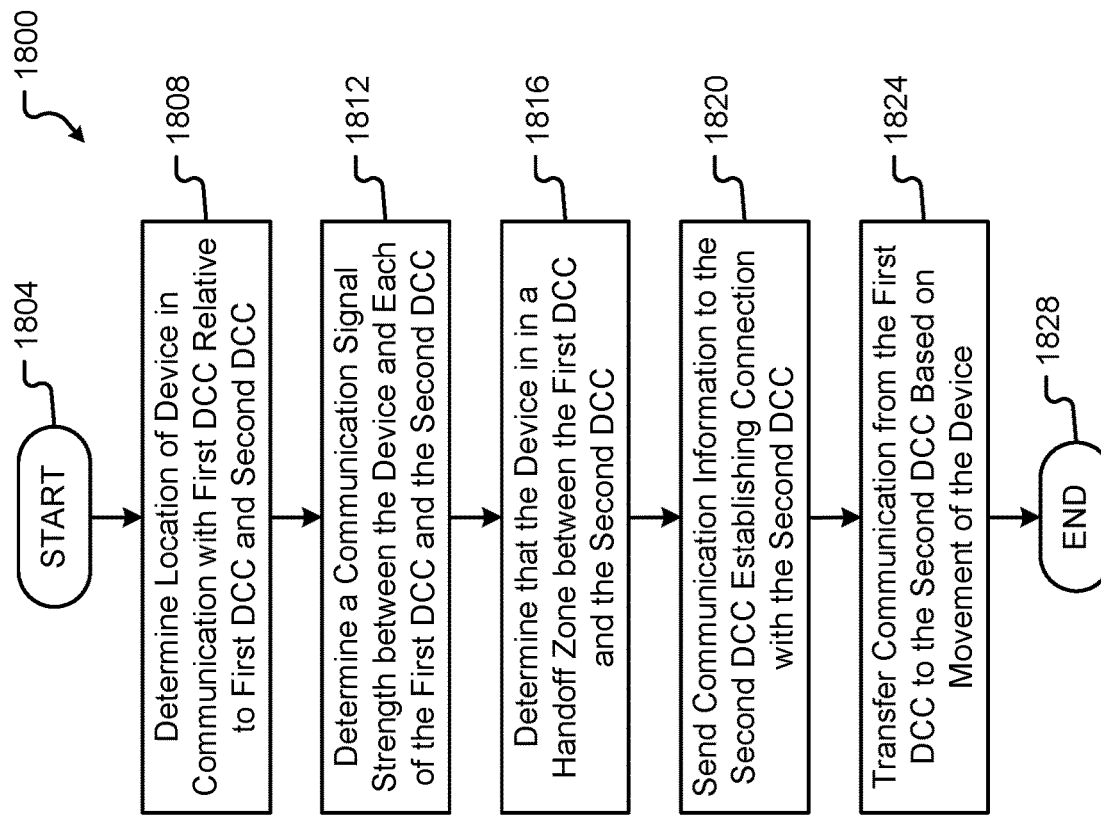
FIG. 18 is a flow diagram depicting a method of enabling user mobility in the communication system in accordance with at least some embodiments of the present disclosure.

FIG. 18 is a flow diagram depicting a method 1800 of enabling user 102 mobility in the enterprise communication system 100 in accordance with at least some embodiments of the present disclosure. The method 1800 can be executed as a set of computer-executable instructions (e.g., communication instructions 132, 244, etc.) executed by a computer system (e.g., enterprise server 144, distributed communication controller 112, etc.) and encoded or stored on a computer-readable medium (e.g., memory 128, memory 208, etc.). Hereinafter, the method 1800 shall be explained with reference to the systems, components, modules, applications, software, data structures, communications, methods, etc. described in conjunction with FIGS. 1-17.

The method 1800 may further describe details surrounding the handoff of processing responsibility from one distributed communication controller 112 to another distributed communication controller 112 in the enterprise facility 108 as described in conjunction with FIG. 9. The method 1800 begins at step 1804 and proceeds by determining a location of a communication device 116 (e.g., a wearable device 304 of the user 102) in communication with a first distributed communication controller 112A relative to the first distributed communication controller 112A and a second, adjacent, distributed communication controller 112B in the enterprise facility 108 (step 1808). In some embodiments, this step may be performed when the communication device 116 is in the handoff zone 916 of overlapping communication range limits 912A, 912B of the first and second distributed communication controllers 112A, 112B. In one embodiment, the distributed communication controller 112 may determine a location of the wearable device relative to the distributed communication controller 112 and an adjacent distributed communication controller, for example, where the communications ranges of the distributed communication controller 112 and the adjacent distributed communication controller 112 overlap. This determination may be made by the distributed communication controller 112 based on communications exchanged between the distributed communication controller 112 and the adjacent distributed communication controller 112. Because pairs of adjacent distributed communication controllers 112 in the enterprise facility 108 have overlapping communication ranges, the distributed communication controllers 112 in the enterprise facility 108 may form a mesh network of communicating distributed communication controllers 112.

Next, the method 1800 may proceed by determining a communication signal strength between the communication device 116 and the first distributed communication controller 112A compared to a communication signal strength between the communication device 116 and the second distributed communication controller 112B (step 1812). The communication signal strength may be based on a number of signal strength measurement methods including, but in no way limited to, time-of-flight ("TOF"), time-of-arrival ("TOA"), radio signal levels measured between the communication device 116 and the distributed communication controllers 112A, 112B, for example, in decibels ("dB"), combinations thereof, and/or the like.

In some embodiments, the comparative signal strength may be used by the first distributed communication controller 112A in determining that the communication device 116 is in at a particular point (e.g., in the handoff zone 916) between the first and second distributed communication controllers 112A, 112B. When the communication device 116 is located between the first distributed communication controller 112A and the second distributed communication controller 112B, and still in the communication range of each distributed communication controller 112A, 112B, the communication device 116 is in the handoff zone 916.

The method 1800 proceeds by the first distributed communication controller 112A sending communication information for communication services provided to the communication device 116 and/or information about the communication device 116 to the adjacent second distributed communication controller 112B (step 1820). This communication information and information about the communication device 116 may be used to transfer call processing, application execution, and/or the providing of enterprise communication services from the first distributed communication controller 112A to the adjacent second distributed communication controller 112B. The communication information may comprise an identification of the communication device 116 and an address of a communication channel used by the first distributed communication controller 112A in providing communication services to the communication device 116.

The method 1800 continues by the first distributed communication controller 112A ceasing providing communication services to the communication device 116 when a communication connection is established between the second distributed communication controller 112B and the communication device 116 (step 1824). More specifically, when the second distributed communication controller 112B executes application instructions continuing to provide the communication services to the communication device 116, the transfer of responsibility is made. Among other things, this transfer allows the distributed communication controllers 112 in an enterprise facility 108 to provide the communication services to the communication device 116 of a user 102, uninterrupted, as the user 102 moves throughout the enterprise facility 108. The method 1800 ends at step 1828.

Figure 19:
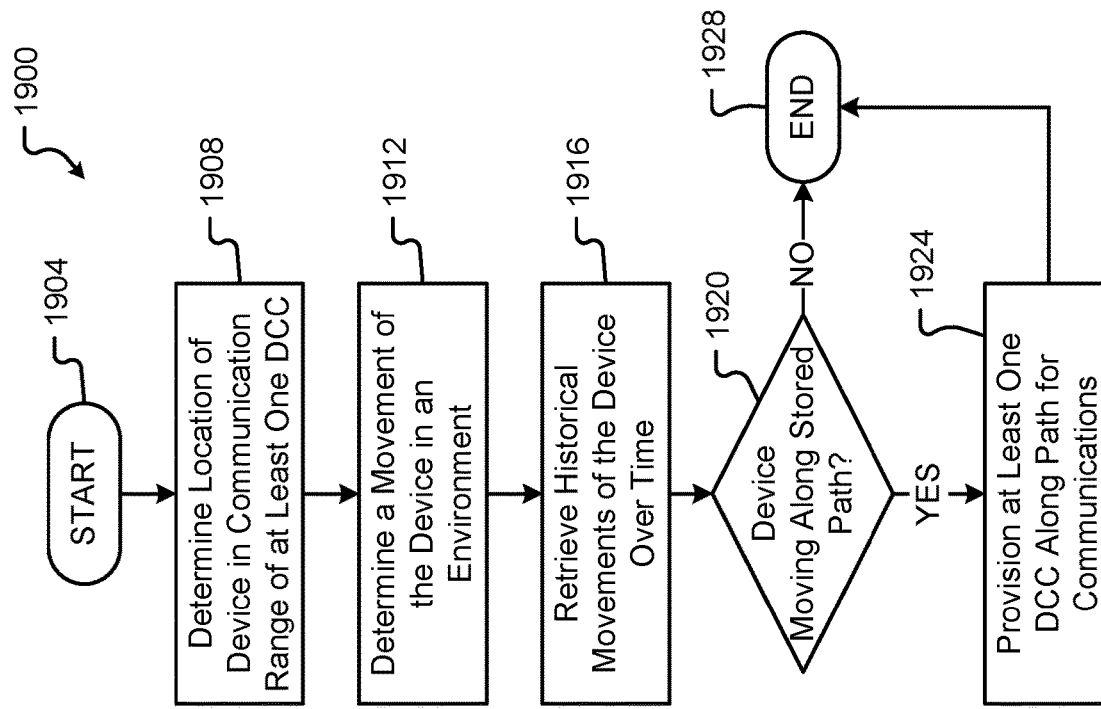
FIG. 19 is a flow diagram depicting a method of provisioning distributed communication controllers along a movement path of a user in the communication system in accordance with embodiments of the present disclosure.

FIG. 19 is a flow diagram depicting a method 1900 of provisioning distributed communication controllers 112 along a movement path 1004 of a user 102 in the enterprise communication system 100 in accordance with embodiments of the present disclosure. The method 1900 can be executed as a set of computer-executable instructions (e.g., communication instructions 132, 244, etc.) executed by a computer system (e.g., enterprise server 144, distributed communication controller 112, etc.) and encoded or stored on a computer-readable medium (e.g., memory 128, memory 208, etc.). Hereinafter, the method 1900 shall be explained with reference to the systems, components, modules, applications, software, data structures, communications, methods, etc. described in conjunction with FIGS. 1-19.

The method 1900 may further describe details surrounding the movement of a user 102 throughout an enterprise facility 108 as described in conjunction with FIGS. 10A-10C. The method 1900 begins at step 1904 and proceeds by determining a location of a communication device 116 (e.g., wearable device 304) within a communication range of at least one distributed communication controller 112 in the enterprise facility 108 (step 1908). The location of the communication device 116 may be determined by any method of location determination described herein. In some embodiments, the location of the communication device 116 may be based on information associated with wireless signals sent by the communication device 116 that are received by specific distributed communication controllers 112 in the enterprise facility 108. In accordance with embodiments of the present disclosure, the location of a communication device 116 and/or an associated user 102 may be provided in real time, or as the location changes.

Next, the method 1900 proceeds by determining a movement of the communication device 116 in the enterprise facility 108 (step 1912). In some embodiments, the movement may be based on whether the communication device 116 is detected by one or more distributed communication controllers 112 in the enterprise facility 108. Each distributed communication controller 112 in an enterprise facility 108 may have a fixed and known physical location. When a communication device 116 is detected by a particular distributed communication controller 112, the known location of the distributed communication controller 112 may be used to determine a location of the communication device 116. As the communication device 116 moves, for example, from a communication range of a first distributed communication controller 112A to a communication range of a second distributed communication controller 112B, the communication device 116 may be determined to be moving in the enterprise facility 108.

In some embodiments, the method 1900 may proceed by retrieving historical movements of the communication device 116 over time (step 1916). The historical movements may comprise aggregated physical locations of the communication device 116 recorded over time. These physical locations, historical movements, and/or historical movement paths taken by the communication device 116 and/or user 102 may be stored in the physical location field 728 of the device information data structure 700 and/or in the physical location field 828 of the user information data structure 800.

Next, the method 1900 determines whether the communication device 116 is currently moving along the historical movement path stored (step 1920). In some embodiments, this determination may be made by the distributed communication controller 112 comparing points along the movement path 1004 to points along a historical movement path for the user 102. Additionally or alternatively, the determination may be based at least partially on other information such as the day, month, year, season, and/or time of day, etc., that a movement is being made and when past movements were made. In some embodiments, the points and/or information may not overlap exactly, but as long as the sets of points and information is within a predetermined acceptable threshold range or value, the data may be used to determine, or predict, that a user 102 and/or the communication device 116 is moving along the historical movement path.

When the communication device 116 and/or user 102 is determined to be moving along a stored movement path (e.g., a historical movement path, etc.), the method 1900 may proceed by provisioning one or more distributed communication controllers 112 along the stored movement path (step 1924). Provisioning distributed communication controllers 112 along the stored movement path, also known as the predicted movement path for the user 102, may comprise one distributed communication controller 112 communicating with another next distributed communication controller 112 that lies along the stored movement path. The communication may comprise the one distributed communication controller 112 sending communication information for communication services provided to the communication device 116 and information about the communication device 116 to the next distributed communication controller 112, similar to step 1820 described in conjunction with the method 1800 of FIG. 18. This communication may be made between one or more distributed communication controllers 112 in advance of the communication device 116 and/or the user 102 reaching the communication range of the next distributed communication controller 112. Among other things, this early communication may begin the transfer of responsibilities between distributed communication controllers 112 for the communication device 116. In some embodiments, the next distributed communication controller 112 may communicate with yet another distributed communication controller 112 that lies along the stored movement path in advance of the communication device 116 of the user 102 and/or the user 102 reaching the communication range of the yet another distributed communication controller 112. This communication may allow any one or more of the subsequent distributed communication controllers 112 along the stored movement path to begin, or plan for, the transfer of responsibilities for the communication device 116. The method 1900 ends at step 1928.

Figure 20:
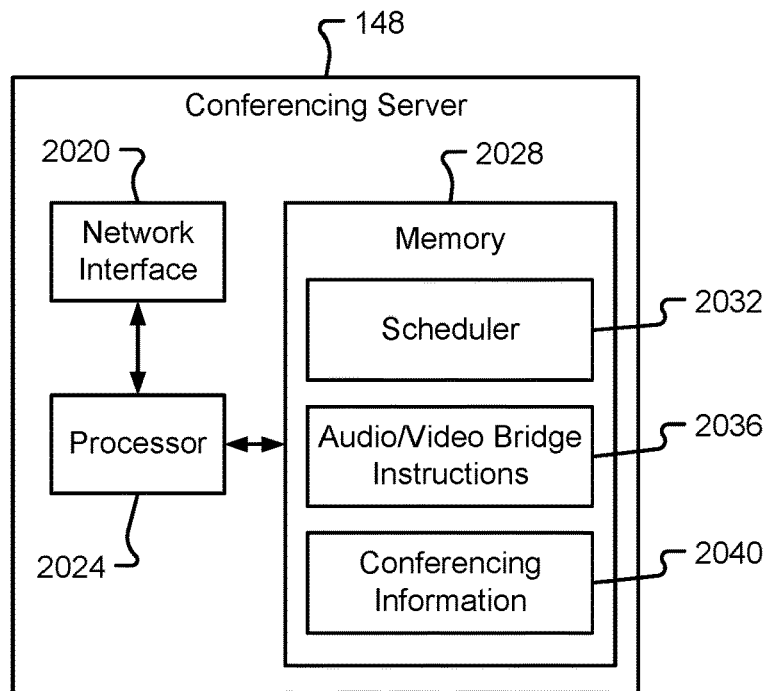
FIG. 20 is a block diagram depicting components of a conferencing server used in the communication system in accordance with at least some embodiments of the present disclosure.

Referring now to FIG. 20, a block diagram depicting components of a conferencing server 148 used in the enterprise communication system 100 are shown in accordance with at least some embodiments of the present disclosure. The conferencing server 148 is shown to include a network communications interface 2020 and one or more processors 2024 connected to one another via a bus. The bus may correspond to a power and/or a communications bus. The conferencing server 148 is also shown to include a memory 2028 that stores one or more instruction sets, applications, information, and/or modules. The conferencing server 148 may be configured as a server, or part of a server, that includes any or all of the components of the conferencing server 148 depicted in FIG. 20.

The network communications interface 2020 may comprise hardware that facilitates communications with other communication devices (e.g., the distributed communication controllers 112, enterprise server 144, conferencing server 148, and/or other devices and servers of the enterprise communication system 100, etc.) over the communication network 104. In some embodiments, the network communications interface 208 may include an Ethernet port, a Wi-Fi card, an NIC, a cellular interface (e.g., antenna, filters, and associated circuitry), or the like. The network communications interface 2020 may be configured to facilitate a connection between the conferencing server 148 and the communication network 104 and may further be configured to encode and decode communications (e.g., packets) according to a protocol utilized by the communication network 104.

The processor 2024 may correspond to one or many computer processing devices. Non-limiting examples of a processor include a microprocessor, an IC chip, a GPU, a CPU, or the like. The processor 2024 may be similar, if not identical, to the processors 124, 204 described in conjunction with FIGS. 1-2, or vice versa, and as such, the description of the processor 2024 may correspond to the description of one or more of the processor 124, 204 provided above.

The memory 2028 may correspond to any type of non-transitory computer-readable medium. In some embodiments, the memory 2028 may comprise volatile or non-volatile memory and a controller for the same. Non-limiting examples of the memory 2028 that may be utilized in the conferencing server 148 may include RAM, ROM, buffer memory, flash memory, solid-state memory, or variants thereof. Any of these memory types may be considered non-transitory computer memory devices even though the data stored thereby can be changed one or more times.

The scheduler 2032 may correspond to a built-in meeting scheduling service such as the meeting and appointment schedulers built into Microsoft Corp.'s Outlook® or Apple Corp.'s Calendar applications, etc. In some embodiments, a meeting organizer may setup a meeting by communicating with the scheduler 2032 over the communication network 104 via a communication device 308. The scheduler 2032 may comprise email instructions and scheduler instructions that, when executed by the processor 2024, allow the meeting organizer may schedule a day and time for a meeting and invite attendees (e.g., other participants in a conference call or conference meeting) via email. Once the conference meeting is setup, the moderator and/or the meeting scheduler 2032 may communicate with the other participants via email and/or through a calendar application to inform the other participants of the meeting details, obtain responses, and update attendance status, etc. In some embodiments, the scheduler 2032 may determine an availability of one or more of the participants prior to scheduling the conference meeting.

The audio/video bridge instructions 2036, when executed by the processor 2024, may allow two or more communication devices 116 to participate in a conference meeting. One example of a conference meeting includes, but is not limited to, a web-conference communication session established between two or more users/parties, webinars, meetings, and the like. Although some embodiments of the present disclosure are discussed in connection with conference meetings, embodiments of the present disclosure are not so limited. Specifically, the embodiments disclosed herein may be applied to one or more of audio, video, multimedia, conference calls, web-conferences, combinations thereof, other collaborative communication sessions, and/or the like. In some embodiments, the conference meeting may comprise audio content and video content.

The conferencing information 2040 may store data corresponding to details about conference meeting scheduled with the conferencing server 148. In some embodiments, the conferencing information 2040 may comprise the conference meeting data structure 2100 and/or the conference meeting data structure 2100 described in greater detail below.

The conferencing server 148 may include one or more resources such as conference mixers and other conferencing infrastructure. As can be appreciated, the resources of the conferencing server 148 may depend on the type of conference meeting or communications provided by the conferencing server 148. Among other things, the conferencing server 148 may be configured to provide conferencing of at least one media type between any number of participants. The conference mixer of the conferencing server 148 may be assigned to a particular communication session for a predetermined amount of time. In one embodiment, the conference mixer may be configured to negotiate codecs with each communication device 116 participating in the conference meeting. Additionally or alternatively, the conference mixer may be configured to receive inputs (at least including audio inputs) from each participating communication device 116 and mix the received inputs into a combined signal which can be monitored and/or analyzed by the conferencing server 148.

Figure 21:
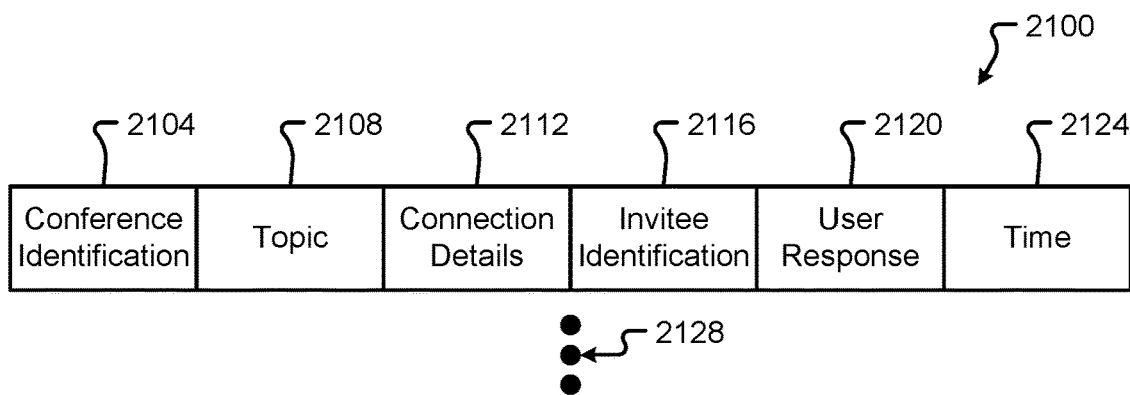
FIG. 21 is a block diagram depicting a conference meeting data structure used in accordance with embodiments of the present disclosure.

FIG. 21 is a block diagram depicting a conference meeting data structure 2100 used in accordance with embodiments of the present disclosure. The conference meeting data structure 2100 may correspond to an appointment record (e.g., for a conference meeting, etc.). The conference meeting data structure 2100 may include a number of fields that may be used in the various communication flows, methods, and processes outlined herein. For example, it is anticipated that the conference meeting data structure 2100 shown in FIG. 21 may be associated with a particular scheduled conference meeting that includes the user 102 as an invitee. The conference meeting data structure 2100 may be used by the distributed communication controller 112 in determining whether a user 102 should be joined with the conferencing server 148 via one or more of the communication devices 116. The conference meeting data structure 2100 may be stored in the memory 2028 of the conferencing server 148, the memory 208 of the distributed communication controller 112, the user information database 142, and/or in a calendar of the conferencing server 148 (e.g., in the memory 128, etc.). Examples of the data fields of the conference meeting data structure 2100 may include, without limitation, a conference identification field 2104, a topic field 2108, a connection details field 2112, an invitee identification field 2116, a user response field 2120, a time field 2124, and more 2128.

The conference identification field 2104 may comprise data used to identify or describe a particular conference meeting from other conference meetings. This identification may be a name, phrase, word, symbol, number, character, and/or combination thereof. The identification may include invitees, timestamps, etc., and/or any other data used to uniquely identify one conference meeting from another in the calendar of the user 102, in the scheduler 2032 of the conferencing server 148, etc.

The topic field 2108 may comprise data used to identify a subject, topic, or content of the conference meeting identified in the conference identification field 2104. The topic may include information that includes a word, phrase, agenda, code word, acronym, and/or the like. In some embodiments, the information in the topic field 2108 may identify a reason for holding the conference meeting identified in the conference identification field 2104.

The connection details field 2112 may comprise data to connect to the conference meeting. This data may include, but is in no way limited to, a phone number, a Uniform Resource Locator ("URL"), an access code or passcode, a PIN, or some other permission/authorization data that allows access to the conference meeting. For example, the conferencing server 148 may establish a phone number and an access code that must be used to dial into the conference meeting (e.g., via an audio/video bridge, etc.). In some embodiments, the distributed communication controller 112 may maintain at least a portion of this data in memory 208.

The invitee identification field 2116 may comprise data about one or more invitees to the scheduled conference meeting. This data may include a name, identifier, email address, employee number, alias, symbol, photo, icon, character, or other string of characters to differentiate one invitee from another in the scheduled conference meeting. The invitee identification field 2116 may comprise an identification of the user 102 that corresponds to data stored in the user identification field 804, the extension number field 808, and/or other fields of the user information data structure 800.

The user response field 2120 may comprise data corresponding to a response of the one or more invitees identified in the invitee identification field 2116. Examples of responses by the invitees may include, but are in no way limited to, "accept," "tentative," "no response," or "declined." In some embodiments, when a user 102 accepts the scheduled conference meeting invitation, the response stored in the user response field 2120 associated with that user 102 indicates the user 102 has accepted the invitation and is expected to attend, or participate in, the scheduled conference meeting. In any event, the indication of the response of the user 102 may be stored in the user response field 2120.

The time field 2124 may comprise data associated with a time of the scheduled conference meeting. For instance, the time field 2124 may include information such as a day, a time of day, and/or a duration of the scheduled conference meeting. This information may be used by the distributed communication controller 112 in determining whether a scheduled conference meeting that includes the user 102 as a listed attendee is about to begin. In some embodiments, a listed attendee may correspond to a user 102 that is invited (e.g., identified in the invitee identification field 316) and that has accepted, or in some cases not declined, the invitation (e.g., identified by the user response, in the user response field 2120).

Figure 22:
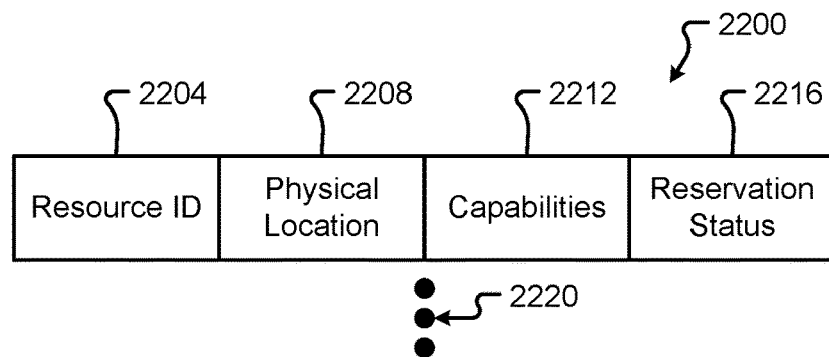
FIG. 22 is a is a block diagram depicting a resource information data structure used in accordance with embodiments of the present disclosure.

FIG. 22 is a is a block diagram depicting a resource information data structure 2200 used in accordance with embodiments of the present disclosure. The resource information data structure 2200 may include a number of fields that may be used in the various communication flows, methods, and processes outlined herein. For instance, the resource information data structure 2200 may be associated with a particular conferencing device, space, or room in the enterprise facility 108. A conferencing device may correspond to one or more of the communication devices 116 described herein. The resource information data structure 2200 may be used by the distributed communication controller 112 in determining rooms, spaces, and alternative devices in the enterprise facility 108 that may be required for use in a conference meeting or call. The resource information data structure 2200 may be stored in the memory 2028 of the conferencing server 148, the memory 208 of the distributed communication controller 112, the user information database 142, and/or in the memory 128 of the enterprise server 144. Examples of the data fields of the resource information data structure 2200 may include, without limitation, a resource identification field 2204, a physical location field 2208, a capabilities field 2212, a reservation status field 2216, and more 2220.

The resource identification field 2204 may comprise data used to identify or describe a particular space, room, or conferencing device (e.g., one of the communication devices 116) from other spaces, rooms, or communication devices 116 in an enterprise facility 108. This identification may be a name, phrase, word, symbol, number, character, and/or combinations thereof. When a device, the identification may include an ICCID number, IMEI, IMSI number, IP address, MAC address, etc., and/or any other data used to uniquely identify one communication device 116 from another in the enterprise facility 108. In some embodiments, a particular conferencing device may send a device identification for the particular conferencing device as part of an advertising signal sent by the conferencing device (e.g., Bluetooth™ advertising packets, etc.). The advertising signal may be sent periodically, upon request, and/or in response to the conferencing being in a powered state. When a space or room, the identification may correspond to a room number, a designated area in a building, and/or a relative position of the space or room to known objects or coordinates.

The physical location field 2208 may comprise data used to determine a location of the space, room, or conferencing device identified in the resource identification field 2204. The location may correspond to a fixed physical (e.g., geographical) location inside an enterprise facility 108. The physical location of a conferencing device may be determined based on information exchanged with one or more iBeacons, an indoor positioning system 118, a GPS radio navigation system, and/or a distributed communication controller 112 in proximity to the conferencing device. The physical location may be provided in a message sent from the conferencing device via advertising packets, broadcast communications, and/or other signals sent from the conferencing device to a distributed communication controller 112 in a communication range (e.g., in proximity to) of the conferencing device identified in the resource identification field 2204. The physical location of a space or room may be based on a known room number, designated area in the enterprise facility 108, and/or a relative position of the space or room to known objects or coordinates and coordinate systems.

The capabilities field 2212 may comprise data that identifies at least one capability of the space, room, or conferencing device identified in the resource identification field 2204. These capabilities may correspond to a functional capability of the space, room, or conferencing device having specific resources, hardware, and/or accommodations. The hardware may correspond to one or more of the components described in conjunction with the block diagram of FIG. 6. For instance, the conferencing device may include one or more display screens 604, input/output 628, and/or the like. Examples of capabilities may include, but are in no way limited to, the ability to provide audio output (e.g., via the speakers), video output (e.g., via the display devices 312), computer processing (e.g., via processors), communications via a specific protocol (e.g., via Bluetooth™, Wi-Fi, cellular, etc.), and/or the like. Additionally or alternatively, the capabilities may include, without limitation, the ability to receive input from a user 102. In some embodiments, the capabilities field 2212 may list the available hardware and/or devices in a space or room of the enterprise facility 108. As with any of the fields in the resource information data structure 2200, the capabilities field 2212 may be included in a message sent from the conferencing device (e.g., via advertising packets, broadcast communications, and/or other signals sent to the distributed communication controller 112, etc.) and/or stored in the memory 128 of the enterprise server 144. In some embodiments, the capabilities field 2212 may define a capacity of a room or space in the enterprise facility 108. The data in the capabilities field 2212 may be based on known devices, limits, and location associated with the room or space.

The reservation status field 2216 may comprise data that identifies whether a resource identified in the resource identification field 2204 is available, in use, reserved, or out-of-order. In some embodiments, the distributed communication controller 112 may update data stored in the reservation status field 2216 to reserve the resource (e.g., room, space, or conferencing device, etc.) for a period of time. In some embodiments, the resource may be reserved for a conference meeting or call with the user 102.

Figure 23:
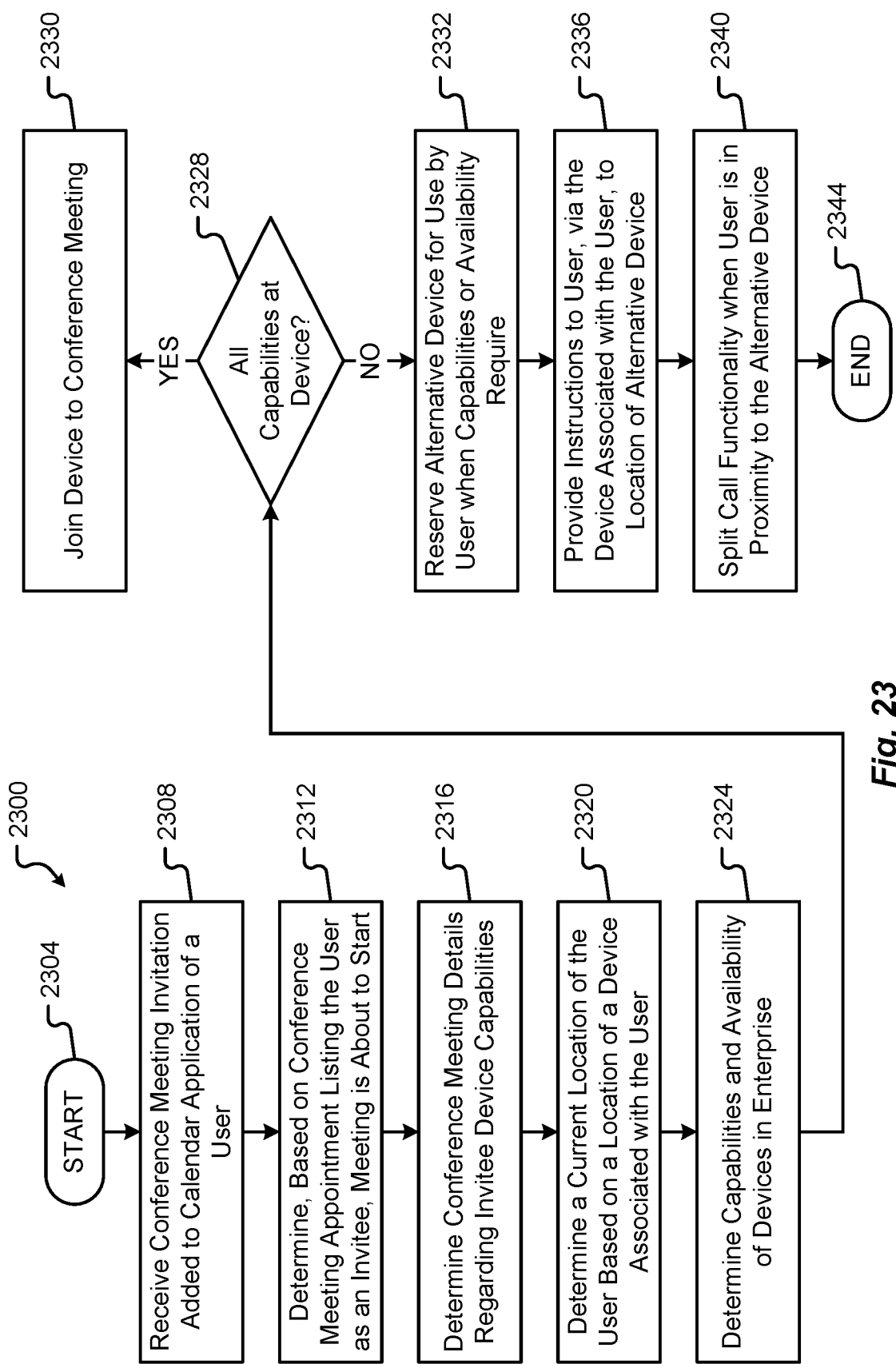
FIG. 23 is a flow diagram depicting a method of managing conferencing features using a distributed communication controller in accordance with embodiments of the present disclosure.

Referring now to FIG. 23, a flow diagram depicting a method 2300 of managing conferencing features using a distributed communication controller 112 is shown in accordance with embodiments of the present disclosure. The method 2300 can be executed as a set of computer-executable instructions (e.g., communication instructions 244, etc.) executed by a computer system (e.g., distributed communication controller 112, etc.) and encoded or stored on a computer-readable medium (e.g., memory 208, etc.). Hereinafter, the method 2300 shall be explained with reference to the systems, components, modules, applications, software, data structures, communications, methods, etc. described in conjunction with FIGS. 1-22.

The method 2300 begins at step 2304 and proceeds by receiving a conference meeting invitation that is added to a calendar a user 102 (step 2308). In some embodiments, the conference meeting invitation may be sent to the email address of a user 102 from a meeting organizer. The invitation may be an attachment to an email sent via at least one distributed communication controller 112 to the enterprise server 144 and/or the conferencing server 148 from any email address in the enterprise communication system 100. In one embodiment, the meeting invitation may be added to the calendar of the user 102 via a share, or group, access to the calendar of the user 102. In any event, once the user 102 accepts, or does not decline, the conference meeting invitation, the conference meeting, or active calendar invite, may be added as an event to the calendar of the user 102. This calendar may be part of the personal information manager of the user 102 such as Microsoft® Outlook, Apple® Calendar, Google® Calendar, etc.

Next, the method 2300 continues by determining, based on information stored in an appointment record (e.g., conference meeting data structure 2100, etc.) listing or including the user 102 as an invitee, that a conference meeting including the user 102 is about to begin (step 2312). In one embodiment, this determination may be made by the distributed communication controller 112 determining that a current time of day (e.g., from a computer clock, an atomic time, some other time source, or a time source obtained via the Network Time Protocol ("NTP"), etc.) is within a predetermined amount of time to the start time of the conference meeting. The start time of the conference meeting may be stored in the time field 2124 of the conference meeting data structure 2100.

Upon determining that the conference meeting is about to begin, the method 2300 may continue by the determining details regarding the conference meeting and expected capabilities (e.g., communication capabilities, etc.) for the conference meeting (step 2316). The conference meeting details may include at least some of the data stored in the conference meeting data structure 2100 described in conjunction with FIG. 21. For instance, the conference meeting details may include, but are in no way limited to, at least one of the conference identification (e.g., stored in the conference identification field 2104), the topic (e.g., stored in the topic field 2108), the connection details (e.g., stored in the connection details field 2112), an invitee to the conference meeting (e.g., stored in the invitee identification field 2116), a user response (e.g., stored in the user response field 2120), and a start time, end time, duration, and/or day of the conference meeting (e.g., stored in the time field 2124). In some embodiments, the distributed communication controller 112 may determine that the conference meeting requires specific capabilities based on the topic, connection details, and/or the invitees stored in the respective fields 2108, 2112, 2116 of the conference meeting data structure 2100. These capabilities may include communication capabilities comprising an audio output capability, a video output capability, and/or the like. For example, if the topic include information that the conference meeting will include a presentation or review of content requiring a display device, the invitee devices (e.g., communication device 116, etc.) that connect with the conference meeting may be expected to have a display device available. Additionally or alternatively, if the connection details include a video conference or streaming video link, the invitee devices that connect with the conference meeting may be expected to have a display device, a camera, and/or other hardware devices.

The method 2300 may determine the current location of a user 102 based on a location of a communication device 116 (e.g., wearable device 304) associated with the user 102 (step 2320). In some embodiments, the location may be determined based on a wireless message received from a wearable device 304 in physical proximity to the distributed communication controller 112. The wireless message may be sent by the wearable device 304 to a distributed communication controller 112 in proximity when the wearable device 304 is an active state. In some embodiments, the wearable device 304 of the user 102 may communicate with one or more distributed communication controllers 112 in the enterprise facility 108 to report a presence in a particular location relative to a particular distributed communication controller 112 in the enterprise facility 108. This communication may include the communication devices 116 sending advertising packets (e.g., Bluetooth™, Wi-Fi, etc.) or other signals that can be received via at least one listening distributed communication controller 112 that is in physical proximity to the wearable device 304. In one embodiment, the position, or location, of the wearable device 304 in the enterprise facility 108 may be reported by the distributed communication controller 112 to the enterprise server 144 and/or stored in the user information database 142 or other memory of the enterprise communication system 100.

The method 2300 may determine capabilities of communication devices 116 (e.g., wearable devices 304, communication devices 308, display devices 312, etc.) and/or spaces and rooms in the enterprise facility 108 (step 2324). This determination may include determining the capabilities of the wearable device 304 of the user 102 listed as an invitee in the appointment record for the conference meeting. In some embodiments, a particular wearable device 304 of the user 102 may be incompatible with all of the capabilities required for the conference meeting. For instance, when the wearable device 304 is a set of wireless headphones, the wearable device 304 may be incapable of receiving video content of the conference meeting, which might be a required capability for the conference meeting. The distributed communication controller 112 may determine capabilities of the wearable device 304 in making the determination as to whether the particular communication device 116 is compatible and includes all of the capabilities required for the conference meeting/call. In one embodiment, the distributed communication controller 112 may access the hardware capabilities field 712 of the device information data structure 700 for the wearable device 304 to determine whether the required capabilities are available at the wearable device 304 (step 2328). If available at the wearable device 304, the method 2300 may continue by the distributed communication controller 112 joining the wearable device 304 with the conference meeting (step 2330). However, continuing the example above, in the event that the hardware capabilities field 712 for the wearable device 304 does not list any type of display hardware, the distributed communication controller 112 may determine that the wearable device 304 is incapable of receiving the video content and is incompatible with the capabilities requirements of the conference meeting. In some embodiments, the distributed communication controller 112 may access the capabilities field 2212 of the resource information data structure 2200 for one or more resources (e.g., conferencing devices, rooms, and spaces, etc.) in the enterprise facility 108. In addition to capabilities, the distributed communication controller 112 may determine a location of each of the available devices in the enterprise facility 108.

When the required capabilities are not available at the wearable device 304, the method 2300 may proceed by reserving an alternative device (e.g., conferencing device/communication device 116, etc.) in the enterprise facility 108 that has the capabilities required, as determined in step 2324 (step 2332). The alternative device may be selected as the conferencing device from multiple conferencing devices, based at least partially on an availability status being available at the time of the conference meeting. Additionally or alternatively, the conferencing device may be selected based at least partially on a distance of the conferencing device from the location of the wearable device 304. In some embodiments, reserving the alternative device may comprise the distributed communication controller 112 updating an entry stored in the reservation status field 2216 of the resource information data structure 2200 for the conferencing device. Updating the entry may include changing a status of the conferencing device from "available" to "reserved." The conferencing device may be reserved for a specific time and/or duration. In some embodiments, the distributed communication controller 112 may determine, based on the location of the conferencing device, a room (e.g., a conference room, etc.) in which the conferencing device is located. The distributed communication controller 112 may then send a reservation message to a conferencing server 148 that causes the conferencing server 148 to reserve the room where the conferencing device is located for a time of the conference meeting (e.g., as stored in the time field 2124 of the conference meeting data structure 2100).

Next, the method 2300 may proceed by sending navigation instructions caused to be output by the wearable device 304 of the user 102 directing the user 102 from the location of the wearable device 304 to the location of the conferencing device in the enterprise facility 108 (step 2336). Since the location of the wearable device 304 may be continually updated as the wearable device 304 moves about the enterprise communication system 100, the navigation instructions may be provided to the wearable device 304 in real time. In some embodiments, the navigation instructions may be caused to play by one or more speaker(s) 444 of the wearable device 304. The instructions may be provided in a conversational format instructing the user 102 to "walk ahead thirty feet and take a left" and may state that "you have arrived at the location of the conferencing device" when the user 102 is in proximity of the conferencing device.

The method 2300 may continue by splitting the communication content associated with the conference meeting between the wearable device 304 and the conferencing device when the user 102 is in proximity to the conferencing device (step 2340). For instance, the distributed communication controller 112 may connect the wearable device 304 with an audio communication channel of the conference meeting and stream wireless video of the conference meeting that is caused to be output in real time by a display of the conferencing device (e.g., display device 312, etc.). In some embodiments, this splitting of conference meeting/call content into audio content (e.g., audio signals and output) and video content (e.g., streaming video signals output, etc.) and providing the audio content to the wearable device 304 and the video content to the alternative device, conferencing device, may be similar, if not identical to the process described in conjunction with the set of communication flows of FIG. 15. The method 2300 may end at step 2344.

Any of the steps, functions, and operations discussed herein can be performed continuously and automatically.

The exemplary systems and methods of this disclosure have been described in relation to communication devices, enterprise environments, and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. For instance, while described in conjunction with client-server networks (e.g., conferencing servers, client devices, etc.), it should be appreciated that the components, systems, and/or methods described herein may be employed as part of a peer-to-peer network or other network. As can be appreciated, in a peer-to-peer network, the various components or systems described in conjunction with the communication system 100 may be part of one or more endpoints, or computers, participating in the peer-to-peer network.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Any of the methods and systems described herein allow a user to be mobile (e.g., move freely, etc.) in an enterprise facility, or building, without requiring the user carry a device that is capable of providing compute and/or interface capabilities. The processing may be provided, or given, by one or more distributed communication controllers and the interface may be provided, or given, by one or more wearable devices of a user. The processing provided by the distributed communication controllers as described in conjunction with any embodiment disclosed herein do not require that the wearable device run, install, or even include a browser, a client, or some other application. Since the processing may be provided by one or more distributed communication controllers, the wearable device in proximity to at least one of the distributed communication controllers is not required to have any application-running capability at all. The processing provided by the distributed communication controllers described herein allow users to leverage "dumb" or "simple" wearable devices (e.g., wireless headphones, wireless headsets, etc.) that may have no capability of providing application processing, running communications applications, interacting with servers in a communication system, and/or running other applications, etc.) as the interface to one or more distributed communication controllers providing the processing. Not requiring the wearable devices to provide processing (e.g., associated with communications, running browsers, running applications, server interactions, and/or the like) allows the user to utilize simple devices that are typically available to a user as the user moves about a facility, space, or area. In some embodiments, the distributed communication controller handles all of the processing between the wearable devices and any other communication devices or server in the communication system.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a distributed communication controller, comprising: a communications interface; a processor coupled to the communications interface; and a memory coupled to and readable by the processor and storing therein instructions that, when executed by the processor, cause the processor to: receive, via the communications interface, a wireless message from a wearable device in physical proximity to the distributed communication controller; determine, based on data in the wireless message, identification information for the wearable device; retrieve, based on the identification information, user information for a user associated with the wearable device; determine, based on the user information retrieved, whether enterprise communication services are available for the user; send, via the communications interface when enterprise communication services are available for the user, an enterprise services message to the wearable device comprising information about the enterprise communication services available; receive, via the communications interface, a confirmation message from the wearable device instructing the distributed communication controller to provide the enterprise communication services; and execute application instructions that provide the enterprise communication services to the wearable device without requiring execution of an application by the wearable device.

Aspects of the above distributed communication controller include wherein providing the enterprise services comprises executing, via the processor, a client application stored in the memory, and wherein the enterprise communication services are provided to the wearable device in at least one of an audio format and a video format. Aspects of the above distributed communication controller include wherein, prior to sending the enterprise services message to the wearable device, the instructions, when executed by the processor, further cause the processor to: send, via the communications interface, an authentication request message to the wearable device; receive, via the communications interface, authentication information from the wearable device; and verify the authentication information with stored authentication credentials for the user. Aspects of the above distributed communication controller include wherein verifying the authentication information comprises instructions that, when executed by the processor, further cause the processor to: send, via the communications interface, the authentication information in a verification request message to an enterprise sever remotely located from the wearable device and the distributed communication controller; and receive, via the communications interface, a verification response message from the enterprise server indicating that the authentication information matches the stored authentication credentials for the user. Aspects of the above distributed communication controller include wherein the authentication request message is provided as part of an auditory message that is caused to play through a speaker of the wearable device, and wherein the authentication information is provided as part of a spoken output recorded via a microphone of the wearable device. Aspects of the above distributed communication controller include wherein the wireless message comprises advertising packets sent via a proximity-based communication protocol, and wherein the advertising packets comprise information about the wearable device. Aspects of the above distributed communication controller include wherein the wearable device corresponds to a wireless headset of the user. Aspects of the above distributed communication controller include wherein the enterprise communication services comprise at least one of call recording, voicemail, call logging, audio calling, video calling, and meeting services, and wherein the enterprise communication services are invoked based on a signal received from the wearable device. Aspects of the above distributed communication controller include wherein prior to executing the application instructions that provide the enterprise communication services to the wearable device, the instructions, when executed by the processor, further cause the processor to: extract a voice command from the signal received from the wearable device, the voice command identifying at least one of the enterprise communication services; and determine the at least one of the enterprise communication services identified in the voice command to be invoked. Aspects of the above distributed communication controller include wherein prior to receiving the signal from the wearable device, the instructions, when executed by the processor, further cause the processor to: prompt, via an auditory signal caused to play at the wearable device, the user for a selection of a particular enterprise communication service from the enterprise communication services.

Embodiments of the present disclosure include a method, comprising: receiving, via a processor of a distributed communication controller, a wireless message from a wearable device in physical proximity to the distributed communication controller; determining, via the processor based on data in the wireless message, identification information for the wearable device; retrieving, via the processor based on the identification information, user information for a user associated with the wearable device; determining, via the processor based on the user information retrieved, whether enterprise communication services are available for the user; sending, via the processor when enterprise communication services are available for the user, an enterprise services message across a wireless communication channel to the wearable device comprising information about the enterprise communication services available; receiving, via the processor, a confirmation message from the wearable device instructing the distributed communication controller to provide the enterprise communication services; and executing, via the processor, application instructions that provide the enterprise communication services to the wearable device without requiring the wearable device to execute an application.

Aspects of the above method include wherein providing the enterprise services comprises executing, via the processor, a client application stored in the memory, and wherein the enterprise communication services are provided to the wearable device in at least one of an audio format and a video format. Aspects of the above method include wherein, prior to sending the enterprise services message to the wearable device, the method further comprises: sending, via the processor, an authentication request message to the wearable device; receiving, via the processor, authentication information from the wearable device; and verifying, via the processor, the authentication information with stored authentication credentials for the user. Aspects of the above method include wherein verifying the authentication information further comprises: sending, via the processor, the authentication information in a verification request message to an enterprise sever remotely located from the wearable device and the distributed communication controller; and receiving, via the processor, a verification response message from the enterprise server indicating that the authentication information matches the stored authentication credentials for the user. Aspects of the above method include wherein the authentication request message is provided as part of an auditory message that is caused to play through a speaker of the wearable device, and wherein the authentication information is provided as part of a spoken output recorded via a microphone of the wearable device. Aspects of the above method include wherein the wireless message comprises advertising packets sent via a proximity-based communication protocol, wherein the advertising packets comprise information about the wearable device, and wherein the wearable device corresponds to wireless headphones of the user. Aspects of the above method include wherein the enterprise communication services comprise at least one of call recording, voicemail, call logging, audio calling, video calling, and meeting services, and wherein the enterprise communication services are invoked based on a signal received from the wearable device. Aspects of the above method include wherein prior to executing the application instructions that provide the enterprise communication services to the wearable device, the method further comprises: extracting, via the processor, a voice command from the signal received from the wearable device, the voice command identifying at least one of the enterprise communication services; and determining, via the processor, the at least one of the enterprise communication services identified in the voice command to be invoked. Aspects of the above method include wherein prior to receiving the signal from the wearable device, the method further comprises: sending, via the processor, a prompt message to the wearable device that causes the wearable device to play an auditory output instructing the user to select a particular enterprise communication service from the enterprise communication services.

Embodiments of the present disclosure include an enterprise communication system, comprising: an enterprise server; and a distributed communication controller located across a communication network apart from the enterprise server, the distributed communication controller, comprising: a communications interface; a processor coupled to the communications interface; and a memory coupled to and readable by the processor and storing therein instructions that, when executed by the processor, cause the processor to: determine, based on information received from a wearable device in proximity to the distributed communication controller, authentication information associated with a user of the wearable device; send, via the communications interface, an enterprise communication services inquiry message to the enterprise server on behalf of the wearable device comprising the authentication information; receive, via the communications interface, an enterprise communication response message from the enterprise server indicating that the wearable device is authenticated and that enterprise communication services are available; send, via the communications interface, an enterprise services message to the wearable device comprising information about the enterprise communication services available for the user; receive, via the communications interface, a confirmation message from the wearable device instructing the distributed communication controller to provide the enterprise communication services; and execute application instructions that provide the enterprise communication services to the wearable device in proximity to the distributed communication controller without running an associated application via the wearable device.

Methods and systems are provided for enhancing communications mobility in an enterprise using a distributed communication controller. At least one distributed communication controller processes incoming and outgoing calls from a user device such as wearable and peripheral devices. The calls range in type and include voice calls, video calls, and both voice and video calls. Upon receiving an incoming call for the user comprising audio and video content, the distributed communication controller sends a call notification message to the user device that is in proximity to the distributed communication controller. After receiving a call acceptance input from the user device, the distributed communication controller sends the audio content of the call over a first channel to the user device. While the audio content is being sent over the first channel, the distributed communication controller sends the video content to an alternative device over a different second channel.

Embodiments of the present disclosure include a distributed communication controller, comprising: a communications interface; a processor coupled to the communications interface; and a memory coupled to and readable by the processor and storing therein instructions that, when executed by the processor, cause the processor to: receive, via the communications interface, an incoming call for a user comprising audio content and video content; send, via the communications interface, a call notification message to a wearable device that is associated with the user and is in physical proximity to the distributed communication controller; receive, via the communications interface, a call acceptance input from the wearable device; send, via the communications interface in response to receiving the call acceptance input, the audio content of the incoming call over a first communications connection established between the distributed communication controller and the wearable device; determine whether the wearable device is capable of receiving the video content of the incoming call; select, when the wearable device is determined to be incapable of receiving the video content, an alternative device in proximity to the user that is capable of receiving the video content; and send, via the communications interface, the video content to the alternative device selected over a second communications connection while the audio content is being sent to the wearable device over the first communications connection.

Aspects of the above distributed communication controller include wherein prior to selecting the alternative device, the instructions, when executed by the processor, further cause the processor to: receive, via the communications interface, a wireless message from devices in physical proximity to the distributed communication controller; determine, based on information in the wireless message received, a subset of the devices that are capable of receiving the video content; and identify the alternative device from the subset of the devices. Aspects of the above distributed communication controller include wherein prior to selecting the alternative device, the instructions, when executed by the processor, further cause the processor to: retrieve, from a computer memory device based on a location of the distributed communication controller, a list of devices in physical proximity to the distributed communication controller that are capable of receiving the video content; and identify the alternative device from the list of devices. Aspects of the above distributed communication controller include wherein the wearable device corresponds to a wireless headset of the user that is incapable of receiving the video content, and wherein the alternative device corresponds to a display device separate and apart from the wireless headset. Aspects of the above distributed communication controller include wherein the audio content is sent to the wearable device via a first wireless communications protocol, and wherein the video content is sent to the alternative device via a second wireless communications protocol different from the first wireless communications protocol. Aspects of the above distributed communication controller include wherein determining whether the wearable device is capable of receiving the video content comprises instructions that, when executed by the processor, further cause the processor to: send, via the communications interface, a capabilities inquiry message to the wearable device; and receive, via the communications interface, a capabilities response message from the wearable device comprising information about available hardware of the wearable device. Aspects of the above distributed communication controller include wherein the wearable device is incapable of receiving the video content when the available hardware of the wearable device excludes a display device. Aspects of the above distributed communication controller include wherein the call notification message comprises an auditory signal caused to play through a speaker of the wearable device, and wherein the call acceptance input received from the wearable device corresponds to at least one of a push button signal and a spoken output recorded by a microphone of the wearable device. Aspects of the above distributed communication controller include wherein the incoming call is initiated by a communication device contacting a communications server, and wherein the incoming call is received at the distributed communication controller from a signal sent by the communications server. Aspects of the above distributed communication controller include wherein prior to sending the audio content of the incoming call over the first communications connection, the instructions, when executed by the processor, further cause the processor to: establish, via the communications interface, a communications channel between the communications server and the distributed communication controller, wherein the audio content and the video content of the incoming call is sent via the communications channel; and separate the incoming call into a first communication stream comprising the audio content and a second communication stream comprising the video content.

Embodiments of the present disclosure include a method, comprising: receiving, via a processor of a distributed communication controller, an incoming call for a user comprising audio content and video content; sending, via the processor, a call notification message to a wearable device that is associated with the user and is in physical proximity to the distributed communication controller; receiving, via the processor, a call acceptance input from the wearable device; sending, via the processor in response to receiving the call acceptance input, the audio content of the incoming call over a first communications connection established between the distributed communication controller and the wearable device; determining, via the processor, whether the wearable device is capable of receiving the video content of the incoming call; selecting, via the processor when the wearable device is determined to be incapable of receiving the video content, an alternative device in proximity to the user that is capable of receiving the video content; and sending, via the processor, the video content to the alternative device selected over a second communications connection while the audio content is being sent to the wearable device over the first communications connection.

Aspects of the above method include wherein prior to selecting the alternative device the method further comprises: receiving, via the processor, a wireless message from devices in physical proximity to the distributed communication controller; determining, via the processor based on information in the wireless message received, a subset of the devices that are capable of receiving the video content; and identifying, via the processor, the alternative device from the subset of the devices. Aspects of the above method include wherein prior to selecting the alternative device the method further comprises: retrieving, from a computer memory device based on a location of the distributed communication controller, a list of devices in physical proximity to the distributed communication controller that are capable of receiving the video content; and identifying, via the processor, the alternative device from the list of devices. Aspects of the above method include wherein the wearable device corresponds to a wireless headset of the user that is incapable of receiving the video content, and wherein the alternative device corresponds to a display device separate and apart from the wireless headset. Aspects of the above method include wherein the audio content is sent to the wearable device via a first wireless communications protocol, and wherein the video content is sent to the alternative device via a second wireless communications protocol different from the first wireless communications protocol. Aspects of the above method include wherein determining whether the wearable device is capable of receiving the video content further comprises: sending, via the processor, a capabilities inquiry message to the wearable device; and receiving, via the processor, a capabilities response message from the wearable device comprising information about available hardware of the wearable device. Aspects of the above method include wherein the wearable device is incapable of receiving the video content when the available hardware of the wearable device excludes a display device. Aspects of the above method include wherein the call notification message comprises an auditory signal caused to play through a speaker of the wearable device, and wherein the call acceptance input received from the wearable device corresponds to at least one of a push button signal and a spoken output recorded by a microphone of the wearable device.

Embodiments of the present disclosure include a communications system, comprising: a communications server; and a distributed communication controller located across a communication network apart from the enterprise server, the distributed communication controller, comprising: a communications interface; a processor coupled to the communications interface; and a memory coupled to and readable by the processor and storing therein instructions that, when executed by the processor, cause the processor to: receive, via the communications interface, an incoming call for a user comprising audio content and video content; send, via the communications interface, a call notification message to a wearable device that is associated with the user and is in physical proximity to the distributed communication controller; receive, via the communications interface, a call acceptance input from the wearable device; send, via the communications interface in response to receiving the call acceptance input, the audio content of the incoming call over a first communications connection established between the distributed communication controller and the wearable device; determine whether the wearable device is capable of receiving the video content of the incoming call; select, when the wearable device is determined to be incapable of receiving the video content, an alternative device in proximity to the user that is capable of receiving the video content; and send, via the communications interface, the video content to the alternative device selected over a second communications connection while the audio content is being sent to the wearable device over the first communications connection.

Aspects of the above communications system include wherein the communications server, comprises: a server processor; and a memory storage device coupled to and readable by the server processor and storing therein instructions that, when executed by the server processor, cause the server processor to: receive, prior to the distributed communication controller receiving the incoming call for the user, a message from a plurality of distributed communication controllers located throughout an enterprise, wherein the message comprises information about wearable devices in proximity to respective distributed communication controllers of the plurality of distributed communication controllers; determine, based on the message and upon receiving the incoming call for the user from a communication device, the distributed communication controller of the plurality of distributed communication controllers where the wearable device for the user is located; and send the incoming call for the user to the distributed communication controller.

Methods and systems are provided for enhancing communications mobility in an enterprise using distributed communication controllers. The distributed communication controllers provide overlapping communication ranges that are capable of passing off call responsibilities as a user and user device navigates an enterprise ensuring full call coverage throughout the enterprise. As the user device moves outside of the range of a first distributed communication controller into the range of a second distributed communication controller while on a call, the system of distributed communication controllers transfer the call responsibilities provided by the first distributed communication controller to the second distributed communication controller, seamlessly, allowing the user to continue the call without interruption.

Embodiments of the present disclosure include a distributed communication controller, comprising: a communications interface; a processor coupled to the communications interface; and a memory coupled to and readable by the processor and storing therein instructions that, when executed by the processor, cause the processor to: execute application instructions that provide communication services to a wearable device of a user in physical proximity to the distributed communication controller without requiring execution of an application by the wearable device; determine a location of the wearable device relative to the distributed communication controller and an adjacent distributed communication controller, wherein a communications range of the distributed communication controller and the adjacent distributed communication controller overlap; determine, based on the location of the wearable device, that the wearable device is in a handoff zone disposed between the distributed communication controller and the adjacent distributed communication controller; send, via the communications interface, communication information for the communication services and the wearable device to the adjacent distributed communication controller; and cease providing the communication services to the wearable device when a communication connection is established between the adjacent distributed communication controller and the wearable device and the adjacent distributed communication controller executes the application instructions continuing to provide the communication services to the wearable device.

Aspects of the above distributed communication controller include wherein the communication services provided to the wearable device are uninterrupted between the execution of the application instructions by the distributed communication controller and by the adjacent distributed communication controller. Aspects of the above distributed communication controller include wherein, determining the location of the wearable device comprises further instructions that, when executed by the processor, cause the processor to: send, via the communication interface, an inquiry message to the adjacent distributed communication controller requesting information about devices detected in proximity to the adjacent distributed communication controller; and receive, via the communications interface, a response message from the adjacent distributed communication controller comprising an identification of the wearable device being detected in proximity to the adjacent distributed communication controller. Aspects of the above distributed communication controller include wherein the inquiry message is sent to a plurality of distributed communication controllers that are adjacent to the distributed communication controller and that have overlapping communication regions. Aspects of the above distributed communication controller include wherein, in response to receiving the response message, the instructions that, when executed by the processor, further cause the processor to: send, via the communications interface, a status inquiry message to the adjacent distributed communication controller comprising a request for a signal strength measurement between the wearable device and the adjacent distributed communication controller; receive, via the communications interface, a status response message from the adjacent distributed communication controller comprising the signal strength measurement between the wearable device and the adjacent distributed communication controller; and determine, based on a comparison of the signal strength measurement between the wearable device and the adjacent distributed communication controller and a signal strength measurement between the wearable device and the distributed communication controller, the location of the wearable device. Aspects of the above distributed communication controller include wherein, determining that the wearable device is in the handoff zone comprises further instructions that, when executed by the processor, cause the processor to: determine that the signal strength measurement between the wearable device and the adjacent distributed communication controller and the signal strength measurement between the wearable device and the distributed communication controller are within a predetermined measurement range of one another. Aspects of the above distributed communication controller include wherein the communication information comprises an identification of the wearable device and an address of a communication channel used by the distributed communication controller in providing the communication services to the wearable device. Aspects of the above distributed communication controller include wherein, prior to ceasing providing the communication services to the wearable device, the instructions, when executed by the processor, further cause the processor to: determine that the communication connection is established between the adjacent distributed communication controller and the wearable device over the communication channel used by the distributed communication controller. Aspects of the above distributed communication controller include wherein providing the communication services comprises sending, via the communications interface, voice calls to the wearable device, and wherein the voice calls are caused to play, in an audio format, at a speaker of the wearable device. Aspects of the above distributed communication controller include wherein providing the communication services further comprises receiving, via the communications interface from the wearable device, a spoken output recorded via a microphone of the wearable device. Aspects of the above distributed communication controller include wherein.

Embodiments of the present disclosure include a method, comprising: executing, via a processor of a distributed communication controller, application instructions that provide communication services to a wearable device of a user in physical proximity to the distributed communication controller without requiring execution of an application by the wearable device; determining, via the processor, a location of the wearable device relative to the distributed communication controller and an adjacent distributed communication controller, wherein a communications range of the distributed communication controller and the adjacent distributed communication controller overlap; determining, via the processor based on the location of the wearable device, that the wearable device is in a handoff zone disposed between the distributed communication controller and the adjacent distributed communication controller; sending, via the processor, communication information for the communication services and the wearable device to the adjacent distributed communication controller; and ceasing, via the processor, providing the communication services to the wearable device after a communication connection is established between the adjacent distributed communication controller and the wearable device and the adjacent distributed communication controller executes the application instructions continuing to provide the communication services to the wearable device.

Aspects of the above method include wherein the communication services provided to the wearable device are uninterrupted between the execution of the application instructions by the distributed communication controller and by the adjacent distributed communication controller. Aspects of the above method include wherein determining the location of the wearable device further comprises: sending, via the processor, an inquiry message to the adjacent distributed communication controller requesting information about devices detected in proximity to the adjacent distributed communication controller; and receiving, via the processor, a response message from the adjacent distributed communication controller comprising an identification of the wearable device being detected in proximity to the adjacent distributed communication controller. Aspects of the above method include wherein the inquiry message is sent to a plurality of distributed communication controllers that are adjacent to the distributed communication controller and that have overlapping communication regions. Aspects of the above method include wherein, in response to receiving the response message, the method further comprises: sending, via the processor, a status inquiry message to the adjacent distributed communication controller comprising a request for a signal strength measurement between the wearable device and the adjacent distributed communication controller; receiving, via the processor, a status response message from the adjacent distributed communication controller comprising the signal strength measurement between the wearable device and the adjacent distributed communication controller; and determining, via the processor based on a comparison of the signal strength measurement between the wearable device and the adjacent distributed communication controller and a signal strength measurement between the wearable device and the distributed communication controller, the location of the wearable device. Aspects of the above method include wherein, determining that the wearable device is in the handoff zone further comprises: determining, via the processor, that the signal strength measurement between the wearable device and the adjacent distributed communication controller and the signal strength measurement between the wearable device and the distributed communication controller are within a predetermined measurement range of one another. Aspects of the above method include wherein the communication information comprises an identification of the wearable device and an address of a communication channel used by the distributed communication controller in providing the communication services to the wearable device, and wherein, prior to ceasing providing the communication services to the wearable device, the method further comprises: determining, via the processor, that the communication connection is established between the adjacent distributed communication controller and the wearable device over the communication channel used by the distributed communication controller.

Embodiments of the present disclosure include a communication system, comprising: a first distributed communication controller having a first installation location and a first communication range in an enterprise facility; and a second distributed communication controller having a second installation location and a second communication range in the enterprise facility, wherein the first communication range and the second communication range overlap in at least one co-communication region, and wherein the second distributed communication controller comprises: a communications interface; a processor coupled to the communications interface; and a memory coupled to and readable by the processor and storing therein instructions that, when executed by the processor, cause the processor to: execute application instructions that provide communication services to a wearable device of a user in physical proximity to the second distributed communication controller without requiring execution of an application by the wearable device; determine a location of the wearable device relative to the first installation location and the second installation location; determine, based on the location of the wearable device, that the wearable device is in a handoff zone disposed in the at least one co-communication region; send, via the communications interface, communication information for the communication services and the wearable device to the first distributed communication controller; and cease providing the communication services to the wearable device after a communication connection is established between the first distributed communication controller and the wearable device and the first distributed communication controller executes the application instructions continuing to provide the communication services to the wearable device.

Aspects of the above communication system include wherein determining the location of the wearable device comprises instructions that, when executed by the processor, further cause the processor to: determine, at a first time, a first location of the wearable device relative to the first installation location and the second installation location; determine, at a second time subsequent to the first time, a second location of the wearable device relative to the first installation location and the second installation location; and determine a movement of the wearable device in the enterprise facility comprising a direction and a speed. Aspects of the above communication system include wherein, after determining the movement of the wearable device, the instructions, when executed by the processor, further cause the processor to: retrieve, from a computer-readable memory, a historical movement of the wearable device in the enterprise facility; determine that the movement of the wearable device matches the historical movement of the wearable device; and send, via the communications interface and prior to the wearable device reaching the handoff zone, an identification of the wearable device and an address of a communication channel used by the second distributed communication controller in providing the communication services to the wearable device.

Methods and systems are provided for enhancing communications mobility in an enterprise a distributed communication controller. The distributed communication controller integrates user devices and conference equipment and provides the user with directions within an enterprise to an appropriate location to conduct a conference call. The distributed communication controller determines that a conference meeting is about to begin and determines a location of the user device. Based on a capability of the user device and the requirements of the conference meeting, the distributed communication controller sends navigation instructions that direct the user to a location in an enterprise facility to successfully conduct a conference call. The navigation instructions are provided in real time as the user moves throughout the facility.

Embodiments of the present disclosure include a distributed communication controller, comprising: a communications interface; a processor coupled to the communications interface; and a memory coupled to and readable by the processor and storing therein instructions that, when executed by the processor, cause the processor to: determine, based on information stored in an appointment record, that a conference meeting listing a user as an invitee is about to begin; receive, via the communications interface, a wireless message from a wearable device in physical proximity to the distributed communication controller, the wearable device being in an active state and associated with the user; determine, based on data in the wireless message, a location of the wearable device in an enterprise facility; determine, based on information stored in the appointment record, a location of a conferencing device in the enterprise facility; and send, via the communications interface, navigation instructions caused to be output by the wearable device directing the user from the location of the wearable device to the location of the conferencing device in the enterprise facility.

Aspects of the above distributed communication controller include wherein, prior to determining the location of the conferencing device, the instructions, when executed by the processor, further cause the processor to: retrieve capabilities of the wearable device; determine, based on the information stored in the appointment record, a communication capability defined for the conference meeting is absent from the capabilities of the wearable device; and retrieve capabilities of a plurality of conferencing devices in the enterprise facility other than the wearable device. Aspects of the above distributed communication controller include wherein, after retrieving the capabilities of the plurality of conferencing devices, the instructions, when executed by the processor, further cause the processor to: determine multiple conferencing devices of the plurality of conferencing devices comprise the communication capability; determine an availability status of each of the multiple conferencing devices for a time of the conference meeting; and select, based at least partially on the availability status being available at the time of the conference meeting, the conferencing device from the multiple conferencing devices. Aspects of the above distributed communication controller include wherein selecting the conferencing device from the multiple conferencing devices is based at least partially on a distance of the conferencing device from the location of the wearable device. Aspects of the above distributed communication controller include wherein, after selecting the conferencing device from the multiple conferencing devices, the instructions, when executed by the processor, further cause the processor to: update the availability status of the conferencing device from being available to being reserved for the time of the conference meeting, wherein the availability status is stored in a resource data structure of a computer-readable memory associated with the enterprise facility. Aspects of the above distributed communication controller include wherein the capabilities of the wearable device comprise an audio output capability, and wherein the communication capability comprises a video output capability. Aspects of the above distributed communication controller include wherein the instructions, when executed by the processor, further cause the processor to: connect, via the communications interface, the wearable device with an audio communication channel of the conference meeting; and stream, via the communications interface, wireless video of the conference meeting that is caused to be output in real time by a display of the conferencing device. Aspects of the above distributed communication controller include wherein the instructions, when executed by the processor, further cause the processor to: stream, via the communications interface, wireless video of the conference meeting that is caused to be output in real time by a display of the conferencing device; and connect, via the communications interface, the conferencing device with an audio communication channel of the conference meeting causing audio content of the conference meeting to be output in real time by a speaker of the conferencing device. Aspects of the above distributed communication controller include wherein, prior to sending the navigation instructions, the instructions, when executed by the processor, further cause the processor to: determine, based on the location of the conferencing device, a conference room in which the conferencing device is located; and send, via the communications interface, a reservation message to a conferencing server that causes the conferencing server to reserve the conference room for a time of the conference meeting. Aspects of the above distributed communication controller include wherein, when the wearable device is in the location of the conferencing device in the enterprise facility, the instructions, when executed by the processor, further cause the processor to: send, via the communication interface, at least one of audio content and video content from the conference meeting to the conferencing device causing the at least one of the audio content and the video content to be output by hardware of the conferencing device.

Embodiments of the present disclosure include a method, comprising receiving, via a processor, conference meeting information stored in an appointment record for a user; determining, via the processor based on information stored in the appointment record, that a conference meeting listing the user as an invitee is about to begin; receiving, via the processor, a wireless message from a wearable device in physical proximity to the distributed communication controller, the wearable device being in an active state and associated with the user; determining, via the processor based on data in the wireless message, a location of the wearable device in an enterprise facility; determining, via the processor based on information stored in the appointment record, a location of a conferencing device in the enterprise facility; and sending, via the processor across a communication network, navigation instructions caused to be output by the wearable device directing the user from the location of the wearable device to the location of the conferencing device in the enterprise facility.

Aspects of the above method include wherein, prior to determining the location of the conferencing device, the method further comprises: retrieving, via the processor, capabilities of the wearable device; determining, via the processor based on the information stored in the appointment record, a communication capability defined for the conference meeting is absent from the capabilities of the wearable device; and retrieving, via the processor, capabilities of a plurality of conferencing devices in the enterprise facility other than the wearable device. Aspects of the above method include wherein, after retrieving the capabilities of the plurality of conferencing devices, the method further comprises: determining, via the processor, multiple conferencing devices of the plurality of conferencing devices comprise the communication capability; determining, via the processor, an availability status of each of the multiple conferencing devices for a time of the conference meeting; and selecting, via the processor based at least partially on the availability status being available at the time of the conference meeting, the conferencing device from the multiple conferencing devices. Aspects of the above method include wherein selecting the conferencing device from the multiple conferencing devices is based at least partially on a distance of the conferencing device from the location of the wearable device. Aspects of the above method include wherein, after selecting the conferencing device from the multiple conferencing devices, the method further comprises: updating, via the processor, the availability status of the conferencing device from being available to being reserved for the time of the conference meeting; and storing, via the processor, the availability status updated in a resource data structure of a computer-readable memory associated with the enterprise facility. Aspects of the above method include wherein the capabilities of the wearable device comprise an audio output capability, wherein the communication capability comprises a video output capability, and wherein the method further comprises: connecting, via the processor, the wearable device with an audio communication channel of the conference meeting; and streaming, via the processor, wireless video of the conference meeting that is caused to be output in real time by a display of the conferencing device. Aspects of the above method further comprising: streaming, via the processor, wireless video of the conference meeting that is caused to be output in real time by a display of the conferencing device; and connecting, via the processor, the conferencing device with an audio communication channel of the conference meeting causing audio content of the conference meeting to be output in real time by a speaker of the conferencing device. Aspects of the above method include wherein, prior to sending the navigation instructions, the method further comprises: determining, via the processor based on the location of the conferencing device, a conference room in which the conferencing device is located; and sending, via the processor, a reservation message to a conferencing server that causes the conferencing server to reserve the conference room for a time of the conference meeting. Aspects of the above method include wherein, when the wearable device is in the location of the conferencing device in the enterprise facility, the method further comprises: sending, via the processor, at least one of audio content and video content from the conference meeting to the conferencing device causing the at least one of the audio content and the video content to be output by hardware of the conferencing device.

Embodiments of the present disclosure include a communication system, comprising: a conferencing server, comprising: a network communications interface; a server processor coupled to the network communications interface; and a server memory coupled to and readable by the server processor and storing therein instructions that, when executed by the server processor, cause the server processor to: receive, via the network communications interface, an invitation for a conference meeting from a communication device of a meeting organizer; and store, in a computer-readable memory device of the conferencing server, an appointment record comprising information about the conference meeting comprising a start time, invitees, and a communication capability defined for the conference meeting; and a distributed communication controller, comprising: a communications interface; a processor coupled to the communications interface; and a memory coupled to and readable by the processor and storing therein instructions that, when executed by the processor, cause the processor to: determine, based on the information stored in the appointment record, that the conference meeting is about to begin and a user is listed as an invitee; receive, via the communications interface, a wireless message from a wearable device in physical proximity to the distributed communication controller, the wearable device being in an active state and associated with the user; retrieve capabilities of the wearable device; retrieve, via the communications interface, the communication capability stored in the appointment record; determine that the communication capability for the conference meeting is absent from the capabilities of the wearable device; select a conferencing device having the communication capability from among a plurality of conferencing devices distributed throughout an enterprise facility; determine, based on data in the wireless message, a location of the wearable device in an enterprise facility; determine a location of the conferencing device in the enterprise facility; and send, via the communications interface, navigation instructions caused to be output by the wearable device directing the user from the location of the wearable device to the location of the conferencing device in the enterprise facility.

Any one or more of the aspects/embodiments as substantially disclosed herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one or more of the aspects/features/embodiments in combination with any one or more other aspects/features/embodiments as substantially disclosed herein.

Use of any one or more of the aspects or features as disclosed herein.

One or means adapted to perform any one or more of the above aspects/embodiments as substantially disclosed herein.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other selfcontained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer-readable signal" medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

What is claimed is:

1. A distributed communication controller, comprising:
a communications interface;
a processor coupled to the communications interface; and
a memory coupled to and readable by the processor and storing therein instructions that, when executed by the processor, cause the processor to:
receive, via the communications interface, a wireless message from a wearable device in physical proximity to the distributed communication controller;
determine, based on data in the wireless message, identification information for the wearable device;
retrieve, based on the identification information, user information for a user associated with the wearable device;
determine, based on the user information retrieved, whether enterprise communication services are available for the user;
send, via the communications interface when enterprise communication services are available for the user, an enterprise services message to the wearable device comprising information about the enterprise communication services available;
receive, via the communications interface, a confirmation message from the wearable device instructing the distributed communication controller to provide the enterprise communication services; and
execute application instructions that provide the enterprise communication services to the wearable device without requiring execution of an application by the wearable device.

2. The distributed communication controller of claim 1, wherein providing the enterprise communication services comprises executing, via the processor, a client application stored in the memory, and wherein the enterprise communication services are provided to the wearable device in at least one of an audio format and a video format.

3. The distributed communication controller of claim 1, wherein, prior to sending the enterprise services message to the wearable device, the instructions, when executed by the processor, further cause the processor to:
send, via the communications interface, an authentication request message to the wearable device;
receive, via the communications interface, authentication information from the wearable device; and
verify the authentication information with stored authentication credentials for the user.

4. The distributed communication controller of claim 3, wherein verifying the authentication information comprises instructions that, when executed by the processor, further cause the processor to:
send, via the communications interface, the authentication information in a verification request message to an enterprise sever remotely located from the wearable device and the distributed communication controller; and
receive, via the communications interface, a verification response message from the enterprise server indicating that the authentication information matches the stored authentication credentials for the user.

5. The distributed communication controller of claim 3, wherein the authentication request message is provided as part of an auditory message that is caused to play through a speaker of the wearable device, and wherein the authentication information is provided as part of a spoken output recorded via a microphone of the wearable device.

6. The distributed communication controller of claim 1, wherein the wireless message comprises advertising packets sent via a proximity-based communication protocol, and wherein the advertising packets comprise information about the wearable device.

7. The distributed communication controller of claim 1, wherein the wearable device corresponds to a wireless headset of the user.

8. The distributed communication controller of claim 1, wherein the enterprise communication services comprise at least one of call recording, voicemail, call logging, audio calling, video calling, and meeting services, and wherein the enterprise communication services are invoked based on a signal received from the wearable device.

9. The distributed communication controller of claim 8, wherein prior to executing the application instructions that provide the enterprise communication services to the wearable device, the instructions, when executed by the processor, further cause the processor to:
  extract a voice command from the signal received from the wearable device, the voice command identifying at least one of the enterprise communication services; and
  determine the at least one of the enterprise communication services identified in the voice command to be invoked.

10. The distributed communication controller of claim 9, wherein prior to receiving the signal from the wearable device, the instructions, when executed by the processor, further cause the processor to:
  prompt, via an auditory signal caused to play at the wearable device, the user for a selection of a particular enterprise communication service from the enterprise communication services.

11. A method, comprising:
  receiving, via a processor of a distributed communication controller, a wireless message from a wearable device in physical proximity to the distributed communication controller;
  determining, via the processor based on data in the wireless message, identification information for the wearable device;
  retrieving, via the processor based on the identification information, user information for a user associated with the wearable device;
  determining, via the processor based on the user information retrieved, whether enterprise communication services are available for the user;
  sending, via the processor when enterprise communication services are available for the user, an enterprise services message across a wireless communication channel to the wearable device comprising information about the enterprise communication services available;
  receiving, via the processor, a confirmation message from the wearable device instructing the distributed communication controller to provide the enterprise communication services; and
  executing, via the processor, application instructions that provide the enterprise communication services to the wearable device without requiring the wearable device to execute an application.

12. The method of claim 11, wherein providing the enterprise communication services comprises executing, via the processor, a client application stored in memory, and wherein the enterprise communication services are provided to the wearable device in at least one of an audio format and a video format.

13. The method of claim 11, wherein, prior to sending the enterprise services message to the wearable device, the method further comprises:
  sending, via the processor, an authentication request message to the wearable device;
  receiving, via the processor, authentication information from the wearable device; and
  verifying, via the processor, the authentication information with stored authentication credentials for the user.

14. The method of claim 13, wherein verifying the authentication information further comprises:
  sending, via the processor, the authentication information in a verification request message to an enterprise sever remotely located from the wearable device and the distributed communication controller; and
  receiving, via the processor, a verification response message from the enterprise server indicating that the authentication information matches the stored authentication credentials for the user.

15. The method of claim 13, wherein the authentication request message is provided as part of an auditory message that is caused to play through a speaker of the wearable device, and wherein the authentication information is provided as part of a spoken output recorded via a microphone of the wearable device.

16. The method of claim 11, wherein the wireless message comprises advertising packets sent via a proximity-based communication protocol, wherein the advertising packets comprise information about the wearable device, and wherein the wearable device corresponds to wireless headphones of the user.

17. The method of claim 11, wherein the enterprise communication services comprise at least one of call recording, voicemail, call logging, audio calling, video calling, and meeting services, and wherein the enterprise communication services are invoked based on a signal received from the wearable device.

18. The method of claim 17, wherein prior to executing the application instructions that provide the enterprise communication services to the wearable device, the method further comprises:
  extracting, via the processor, a voice command from the signal received from the wearable device, the voice command identifying at least one of the enterprise communication services; and
  determining, via the processor, the at least one of the enterprise communication services identified in the voice command to be invoked.

19. The method of claim 18, wherein prior to receiving the signal from the wearable device, the method further comprises:
  sending, via the processor, a prompt message to the wearable device that causes the wearable device to play an auditory output instructing the user to select a particular enterprise communication service from the enterprise communication services.

20. An enterprise communication system, comprising:
  an enterprise server; and
  a distributed communication controller located across a communication network apart from the enterprise server, the distributed communication controller, comprising:
    a communications interface;
    a processor coupled to the communications interface; and
    a memory coupled to and readable by the processor and storing therein instructions that, when executed by the processor, cause the processor to:
      determine, based on information received from a wearable device in proximity to the distributed communication controller, authentication information associated with a user of the wearable device;

send, via the communications interface, an enterprise communication services inquiry message to the enterprise server on behalf of the wearable device comprising the authentication information;

receive, via the communications interface, an enterprise communication response message from the enterprise server indicating that the wearable device is authenticated and that enterprise communication services are available;

send, via the communications interface, an enterprise services message to the wearable device comprising information about the enterprise communication services available for the user;

receive, via the communications interface, a confirmation message from the wearable device instructing the distributed communication controller to provide the enterprise communication services; and execute application instructions that provide the enterprise communication services to the wearable device in proximity to the distributed communication controller without running an associated application via the wearable device.

* * * * *